US012810266B1

(12) United States Patent
Ethington et al.

(10) Patent No.: US 12,810,266 B1
(45) **Date of Patent: *Nov. 24, 2026**

(54) SYSTEM AND METHOD FOR REMOTE DEPOSIT OF FINANCIAL INSTRUMENTS

(71) Applicant: United Services Automobile Association (USAA), San Antonio, TX (US)

(72) Inventors: Seth E. Ethington, San Antonio, TX (US); Casey Brumbaugh, San Antonio, TX (US); Emily Gray, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,884

(22) Filed: Dec. 9, 2019

Related U.S. Application Data

(63) Continuation of application No. 13/842,112, filed on Mar. 15, 2013, now Pat. No. 10,552,810.
(Continued)

(51) Int. Cl.
*G06Q 20/10* (2012.01)
*G06Q 20/04* (2012.01)

(52) U.S. Cl.
CPC ......... *G06Q 20/108* (2013.01); *G06Q 20/042* (2013.01)

(58) Field of Classification Search
CPC . G06Q 20/108; G06Q 20/042; G06Q 20/3223
(Continued)

(56) References Cited

U.S. PATENT DOCUMENTS

| | | | |
|---|---|---|---|
| 1,748,489 | A | 2/1930 | McCarthy et al. |
| 2,292,825 | A | 8/1942 | Dilks et al. |

(Continued)

FOREIGN PATENT DOCUMENTS

| | | |
|---|---|---|
| CA | 2619884 | 3/2007 |
| CN | 1897644 A | 1/2007 |

(Continued)

OTHER PUBLICATIONS

J. Henkel and J. Zhan, "Remote Deposit Capture in the Consumer's Hands, " 2010 5th International Conference on Future Information Technology, Busan, Korea (South), 2010, pp. 1-5. (Year: 2010).*

(Continued)

*Primary Examiner* — Virpi H Kanervo
(74) *Attorney, Agent, or Firm* — Carmichael IP, PLLC

(57) ABSTRACT

Methods and systems for remote deposit of financial instruments are disclosed. The method may include using a mobile device such as a tablet computer or smart phone to automatically review live video data to determine a location of a check in the video image, and to obtain a still photo of the check image in response to determining that the mobile device is being held at a desired steadiness. The method may include providing a user with visual feedback that the mobile device is actively tracking the check. The method may further include cropping the captured check image and sending only a portion of the image to a remote server to verify a check MICR line has been captured. The method may further include a virtual endorsement module executable by the mobile device to apply endorsement information to a check image. A mobile device with a processor and memory containing instructions to execute the method is also disclosed.

23 Claims, 17 Drawing Sheets

300

Related U.S. Application Data

(60) Provisional application No. 61/771,688, filed on Mar. 1, 2013, provisional application No. 61/739,596, filed on Dec. 19, 2012.

(58) Field of Classification Search
USPC .......................................................... 705/42
See application file for complete search history.

(56) References Cited

U.S. PATENT DOCUMENTS

| | | | |
|---|---|---|---|
| 3,005,282 | A | 10/1961 | Christiansen |
| 3,341,820 | A | 9/1967 | Grillmeier, Jr. et al. |
| 3,576,972 | A | 5/1971 | Wood |
| 3,593,913 | A | 7/1971 | Bremer |
| 3,620,553 | A | 11/1971 | Donovan |
| 3,648,242 | A | 3/1972 | Grosbard |
| 3,800,124 | A | 3/1974 | Walsh |
| 3,816,943 | A | 6/1974 | Henry |
| 4,002,356 | A | 1/1977 | Weidmann |
| 4,027,142 | A | 5/1977 | Paup et al. |
| 4,060,711 | A | 11/1977 | Buros |
| 4,070,649 | A | 1/1978 | Wright, Jr. et al. |
| 4,128,202 | A | 12/1978 | Buros |
| 4,136,471 | A | 1/1979 | Austin |
| 4,205,780 | A | 6/1980 | Burns |
| 4,264,808 | A | 4/1981 | Owens |
| 4,305,216 | A | 12/1981 | Skelton |
| 4,321,672 | A | 3/1982 | Braun |
| 4,346,442 | A | 8/1982 | Musmanno |
| 4,417,136 | A | 11/1983 | Rushby et al. |
| 4,433,436 | A | 2/1984 | Carnes |
| 4,454,610 | A | 6/1984 | Sziklai |
| RE31,692 | E | 10/1984 | Tyburski et al. |
| 4,523,330 | A | 6/1985 | Cain |
| 4,636,099 | A | 1/1987 | Goldston |
| 4,640,413 | A | 2/1987 | Kaplan |
| 4,644,144 | A | 2/1987 | Chandek |
| 4,722,444 | A | 2/1988 | Murphy et al. |
| 4,722,544 | A | 2/1988 | Weber |
| 4,727,435 | A | 2/1988 | Otani et al. |
| 4,737,911 | A | 4/1988 | Freeman |
| 4,739,411 | A | 4/1988 | Bolton |
| 4,774,574 | A | 9/1988 | Daly et al. |
| 4,774,663 | A | 9/1988 | Musmanno |
| 4,790,475 | A | 12/1988 | Griffin |
| 4,806,780 | A | 2/1989 | Yamamoto |
| 4,837,693 | A | 6/1989 | Schotz |
| 4,890,228 | A | 12/1989 | Longfield |
| 4,896,363 | A | 1/1990 | Taylor et al. |
| 4,927,071 | A | 5/1990 | Wood |
| 4,934,587 | A | 6/1990 | McNabb |
| 4,960,981 | A | 10/1990 | Benton |
| 4,975,735 | A | 12/1990 | Bright |
| 5,022,683 | A | 6/1991 | Barbour |
| 5,053,607 | A | 10/1991 | Carlson |
| 5,077,805 | A | 12/1991 | Tan |
| 5,091,968 | A | 2/1992 | Higgins et al. |
| 5,122,950 | A | 6/1992 | Benton et al. |
| 5,134,564 | A | 7/1992 | Dunn et al. |
| 5,146,606 | A | 9/1992 | Grondalski |
| 5,157,620 | A | 10/1992 | Shaar |
| 5,159,548 | A | 10/1992 | Caslavka |
| 5,164,833 | A | 11/1992 | Aoki |
| 5,175,682 | A | 12/1992 | Higashiyama et al. |
| 5,187,750 | A | 2/1993 | Behera |
| 5,191,525 | A | 3/1993 | LeBrun |
| 5,193,121 | A | 3/1993 | Elischer et al. |
| 5,220,501 | A | 6/1993 | Lawlor |
| 5,227,863 | A | 7/1993 | Bilbrey et al. |
| 5,229,589 | A | 7/1993 | Schneider |
| 5,233,547 | A | 8/1993 | Kapp et al. |
| 5,237,158 | A | 8/1993 | Kern et al. |
| 5,237,159 | A | 8/1993 | Stephens |
| 5,237,620 | A | 8/1993 | Deaton et al. |
| 5,257,320 | A | 10/1993 | Etherington et al. |
| 5,265,008 | A | 11/1993 | Benton |
| 5,268,968 | A | 12/1993 | Yoshida |
| 5,283,829 | A | 2/1994 | Anderson |
| 5,321,816 | A | 6/1994 | Rogan |
| 5,345,090 | A | 9/1994 | Hludzinski |
| 5,347,302 | A | 9/1994 | Simonoff |
| 5,350,906 | A | 9/1994 | Brody |
| 5,373,550 | A | 12/1994 | Campbell |
| 5,383,113 | A | 1/1995 | Kight et al. |
| 5,419,588 | A | 5/1995 | Wood |
| 5,422,467 | A | 6/1995 | Graef |
| 5,444,616 | A | 8/1995 | Nair et al. |
| 5,444,794 | A | 8/1995 | Uhland, Sr. |
| 5,455,875 | A | 10/1995 | Chevion et al. |
| 5,475,403 | A | 12/1995 | Havlovick et al. |
| 5,504,538 | A | 4/1996 | Tsujihara |
| 5,504,677 | A | 4/1996 | Pollin |
| 5,528,387 | A | 6/1996 | Kelly et al. |
| 5,530,773 | A | 6/1996 | Thompson |
| 5,577,179 | A | 11/1996 | Blank |
| 5,583,759 | A | 12/1996 | Geer |
| 5,590,196 | A | 12/1996 | Moreau |
| 5,594,225 | A | 1/1997 | Botvin |
| 5,598,969 | A | 2/1997 | Ong |
| 5,602,936 | A | 2/1997 | Green |
| 5,610,726 | A | 3/1997 | Nonoshita |
| 5,611,028 | A | 3/1997 | Shibasaki |
| 5,630,073 | A | 5/1997 | Nolan |
| 5,631,984 | A | 5/1997 | Graf et al. |
| 5,664,027 | A | 9/1997 | Ittner |
| 5,668,897 | A | 9/1997 | Stolfo |
| 5,673,320 | A | 9/1997 | Ray et al. |
| 5,677,955 | A | 10/1997 | Doggett |
| 5,678,046 | A | 10/1997 | Cahill et al. |
| 5,679,938 | A | 10/1997 | Templeton |
| 5,680,611 | A | 10/1997 | Rail |
| 5,691,524 | A | 11/1997 | Josephson |
| 5,699,452 | A | 12/1997 | Vaidyanathan |
| 5,734,747 | A | 3/1998 | Vaidyanathan |
| 5,737,440 | A | 4/1998 | Kunkler |
| 5,748,780 | A | 5/1998 | Stolfo |
| 5,751,842 | A | 5/1998 | Riach |
| 5,761,686 | A | 6/1998 | Bloomberg |
| 5,784,503 | A | 7/1998 | Bleecker, III et al. |
| 5,830,609 | A | 11/1998 | Warner |
| 5,832,463 | A | 11/1998 | Funk |
| 5,838,814 | A | 11/1998 | Moore |
| 5,848,185 | A | 12/1998 | Koga et al. |
| 5,859,935 | A | 1/1999 | Johnson et al. |
| 5,863,075 | A | 1/1999 | Rich |
| 5,870,456 | A | 2/1999 | Rogers |
| 5,870,724 | A | 2/1999 | Lawlor |
| 5,870,725 | A | 2/1999 | Bellinger et al. |
| 5,878,337 | A | 3/1999 | Joao |
| 5,889,884 | A | 3/1999 | Hashimoto et al. |
| 5,890,141 | A | 3/1999 | Carney et al. |
| 5,893,101 | A | 4/1999 | Balogh et al. |
| 5,897,625 | A | 4/1999 | Gustin |
| 5,898,157 | A | 4/1999 | Mangili et al. |
| 5,901,253 | A | 5/1999 | Tretter |
| 5,903,878 | A | 5/1999 | Talati |
| 5,903,881 | A | 5/1999 | Schrader |
| 5,903,904 | A | 5/1999 | Peairs |
| 5,910,988 | A | 6/1999 | Ballard |
| 5,917,931 | A | 6/1999 | Kunkler |
| 5,924,737 | A | 7/1999 | Schrupp |
| 5,926,548 | A | 7/1999 | Okamoto |
| 5,930,501 | A | 7/1999 | Neil |
| 5,930,778 | A | 7/1999 | Geer |
| 5,937,396 | A | 8/1999 | Konya |
| 5,940,844 | A | 8/1999 | Cahill |
| 5,982,918 | A | 11/1999 | Mennie |
| 5,987,439 | A | 11/1999 | Gustin et al. |
| 6,005,623 | A | 12/1999 | Takahashi |
| 6,012,048 | A | 1/2000 | Gustin et al. |
| 6,014,454 | A | 1/2000 | Kunkler |
| 6,021,202 | A | 2/2000 | Anderson |
| 6,021,397 | A | 2/2000 | Jones |
| 6,023,705 | A | 2/2000 | Bellinger et al. |

(56) References Cited

U.S. PATENT DOCUMENTS

| | | | |
|---|---|---|---|
| 6,029,887 | A | 2/2000 | Furuhashi |
| 6,030,000 | A | 2/2000 | Diamond |
| 6,032,137 | A | 2/2000 | Ballard |
| 6,038,553 | A | 3/2000 | Hyde |
| 6,053,405 | A | 4/2000 | Irwin, Jr. et al. |
| 6,059,185 | A | 5/2000 | Funk et al. |
| 6,064,753 | A | 5/2000 | Bolle et al. |
| 6,064,762 | A | 5/2000 | Haenel |
| 6,072,941 | A | 6/2000 | Suzuki et al. |
| 6,073,119 | A | 6/2000 | Borenmisza-Wahr |
| 6,073,121 | A | 6/2000 | Ramzy |
| 6,085,168 | A | 7/2000 | Mori |
| 6,086,708 | A | 7/2000 | Colgate |
| 6,089,450 | A | 7/2000 | Koeple |
| 6,089,610 | A | 7/2000 | Greene |
| 6,092,047 | A | 7/2000 | Hyman et al. |
| 6,097,834 | A | 8/2000 | Krouse |
| 6,097,845 | A | 8/2000 | Ng et al. |
| 6,097,885 | A | 8/2000 | Rayner |
| 6,105,865 | A | 8/2000 | Hardesty |
| 6,128,603 | A | 10/2000 | Dent et al. |
| 6,141,339 | A | 10/2000 | Kaplan et al. |
| 6,145,738 | A | 11/2000 | Stinson et al. |
| 6,148,102 | A | 11/2000 | Stolin |
| 6,149,056 | A | 11/2000 | Stinson et al. |
| 6,151,409 | A | 11/2000 | Chen et al. |
| 6,151,423 | A | 11/2000 | Melen |
| 6,151,426 | A | 11/2000 | Lee |
| 6,159,585 | A | 12/2000 | Rittenhouse |
| 6,170,744 | B1 | 1/2001 | Lee |
| 6,178,270 | B1 | 1/2001 | Taylor et al. |
| 6,178,409 | B1 | 1/2001 | Weber et al. |
| 6,181,837 | B1 | 1/2001 | Cahill et al. |
| 6,188,506 | B1 | 2/2001 | Kaiserman |
| 6,189,785 | B1 | 2/2001 | Lowery |
| 6,192,165 | B1 | 2/2001 | Irons |
| 6,195,452 | B1 | 2/2001 | Royer |
| 6,195,694 | B1 | 2/2001 | Chen et al. |
| 6,199,055 | B1 | 3/2001 | Kara |
| 6,236,009 | B1 | 5/2001 | Emigh et al. |
| 6,243,689 | B1 | 6/2001 | Norton |
| 6,278,983 | B1 | 8/2001 | Ball |
| 6,282,523 | B1 | 8/2001 | Tedesco et al. |
| 6,282,826 | B1 | 9/2001 | Richards |
| 6,293,469 | B1 | 9/2001 | Masson et al. |
| 6,304,860 | B1 | 10/2001 | Martin |
| 6,310,647 | B1 | 10/2001 | Parulski et al. |
| 6,314,452 | B1 | 11/2001 | Dekel |
| 6,315,195 | B1 | 11/2001 | Ramachandran |
| 6,317,727 | B1 | 11/2001 | May |
| 6,328,207 | B1 | 12/2001 | Gregoire et al. |
| 6,330,546 | B1 | 12/2001 | Gopinathan et al. |
| 6,339,658 | B1 | 1/2002 | Moccagatta |
| 6,339,766 | B1 | 1/2002 | Gephart |
| 6,351,553 | B1 | 2/2002 | Hayosh |
| 6,351,735 | B1 | 2/2002 | Deaton et al. |
| 6,354,490 | B1 | 3/2002 | Weiss et al. |
| 6,363,162 | B1 | 3/2002 | Moed et al. |
| 6,363,164 | B1 | 3/2002 | Jones et al. |
| 6,390,362 | B1 | 5/2002 | Martin |
| 6,397,196 | B1 | 5/2002 | Kravetz |
| 6,408,084 | B1 | 6/2002 | Foley |
| 6,411,725 | B1 | 6/2002 | Rhoads |
| 6,411,737 | B2 | 6/2002 | Wesolkowski et al. |
| 6,411,938 | B1 | 6/2002 | Gates et al. |
| 6,413,305 | B1 | 7/2002 | Mehta |
| 6,417,869 | B1 | 7/2002 | Do |
| 6,425,017 | B1 | 7/2002 | Dievendorff |
| 6,429,952 | B1 | 8/2002 | Olbricht |
| 6,439,454 | B1 | 8/2002 | Masson et al. |
| 6,449,397 | B1 | 9/2002 | Che-Chu |
| 6,450,403 | B1 | 9/2002 | Martens et al. |
| 6,463,220 | B1 | 10/2002 | Dance et al. |
| 6,464,134 | B1 | 10/2002 | Page |
| 6,469,745 | B1 | 10/2002 | Yamada et al. |
| 6,470,325 | B1 | 10/2002 | Leemhuis |
| 6,473,519 | B1 | 10/2002 | Pidhirny et al. |
| 6,502,747 | B1 | 1/2003 | Stoutenburg et al. |
| 6,505,178 | B1 | 1/2003 | Flenley |
| 6,546,119 | B2 | 4/2003 | Ciolli et al. |
| 6,564,380 | B1 | 5/2003 | Murphy |
| 6,574,377 | B1 | 6/2003 | Cahill et al. |
| 6,574,609 | B1 | 6/2003 | Downs |
| 6,578,760 | B1 | 6/2003 | Otto |
| 6,587,837 | B1 | 7/2003 | Spagna |
| 6,606,117 | B1 | 8/2003 | Windle |
| 6,609,200 | B2 | 8/2003 | Anderson |
| 6,611,598 | B1 | 8/2003 | Hayosh |
| 6,614,930 | B1 | 9/2003 | Agnihotri et al. |
| 6,643,416 | B1 | 11/2003 | Daniels |
| 6,647,136 | B2 | 11/2003 | Jones et al. |
| 6,654,487 | B1 | 11/2003 | Downs, Jr. |
| 6,661,910 | B2 | 12/2003 | Jones et al. |
| 6,668,372 | B1 | 12/2003 | Wu |
| 6,669,086 | B2 | 12/2003 | Abdi et al. |
| 6,672,452 | B1 | 1/2004 | Alves |
| 6,682,452 | B2 | 1/2004 | Quintus |
| 6,695,204 | B1 | 2/2004 | Stinson |
| 6,697,091 | B1 | 2/2004 | Rzepkowski et al. |
| 6,704,039 | B2 | 3/2004 | Pena |
| 6,711,474 | B1 | 3/2004 | Treyz et al. |
| 6,726,097 | B2 | 4/2004 | Graef |
| 6,728,397 | B2 | 4/2004 | Mcneal |
| 6,738,087 | B2 | 5/2004 | Belkin et al. |
| 6,738,496 | B1 | 5/2004 | Van Hall |
| 6,742,128 | B1 | 5/2004 | Joiner |
| 6,745,186 | B1 | 6/2004 | Testa et al. |
| 6,754,640 | B2 | 6/2004 | Bozeman |
| 6,755,340 | B1 | 6/2004 | Voss et al. |
| 6,760,414 | B1 | 7/2004 | Schurko et al. |
| 6,760,470 | B1 | 7/2004 | Bogosian et al. |
| 6,763,226 | B1 | 7/2004 | McZeal |
| 6,781,962 | B1 | 8/2004 | Williams |
| 6,786,398 | B1 | 9/2004 | Stinson et al. |
| 6,789,054 | B1 | 9/2004 | Makhlouf |
| 6,796,489 | B2 | 9/2004 | Slater et al. |
| 6,796,491 | B2 | 9/2004 | Nakajima |
| 6,806,903 | B1 | 10/2004 | Okisu et al. |
| 6,807,294 | B2 | 10/2004 | Yamazaki |
| 6,813,733 | B1 | 11/2004 | Li |
| 6,829,704 | B2 | 12/2004 | Zhang |
| 6,844,885 | B2 | 1/2005 | Anderson |
| 6,856,965 | B1 | 2/2005 | Stinson |
| 6,863,214 | B2 | 3/2005 | Garner et al. |
| 6,870,947 | B2 | 3/2005 | Kelland |
| 6,873,728 | B2 | 3/2005 | Bernstein et al. |
| 6,883,140 | B1 | 4/2005 | Acker |
| 6,898,314 | B2 | 5/2005 | Kung et al. |
| 6,902,105 | B2 | 6/2005 | Koakutsu |
| 6,910,023 | B1 | 6/2005 | Schibi |
| 6,913,188 | B2 | 7/2005 | Wong |
| 6,922,487 | B2 | 7/2005 | Dance et al. |
| 6,930,718 | B2 | 8/2005 | Parulski et al. |
| 6,931,255 | B2 | 8/2005 | Mekuria |
| 6,931,591 | B1 | 8/2005 | Brown |
| 6,934,719 | B2 | 8/2005 | Nally |
| 6,944,773 | B1 | 9/2005 | Abrahams |
| 6,947,610 | B2 | 9/2005 | Sun |
| 6,957,770 | B1 | 10/2005 | Robinson |
| 6,961,689 | B1 | 11/2005 | Greenberg |
| 6,970,843 | B1 | 11/2005 | Forte |
| 6,973,589 | B2 | 12/2005 | Wright |
| 6,983,886 | B2 | 1/2006 | Natsukari et al. |
| 6,993,507 | B2 | 1/2006 | Meyer |
| 6,996,263 | B2 | 2/2006 | Jones et al. |
| 6,999,943 | B1 | 2/2006 | Johnson |
| 7,003,040 | B2 | 2/2006 | Yi |
| 7,004,382 | B2 | 2/2006 | Sandru |
| 7,010,155 | B2 | 3/2006 | Koakutsu et al. |
| 7,010,507 | B1 | 3/2006 | Anderson |
| 7,016,704 | B2 | 3/2006 | Pallakoff |
| 7,027,171 | B1 | 4/2006 | Watanabe |
| 7,028,886 | B1 | 4/2006 | Maloney |
| 7,039,048 | B1 | 5/2006 | Monta |

(56) References Cited

U.S. PATENT DOCUMENTS

| | | | |
|---|---|---|---|
| 7,046,991 | B2 | 5/2006 | Little |
| 7,051,001 | B1 | 5/2006 | Slater |
| 7,058,036 | B1 | 6/2006 | Yu |
| 7,062,099 | B2 | 6/2006 | Li et al. |
| 7,062,456 | B1 | 6/2006 | Riehl et al. |
| 7,062,768 | B2 | 6/2006 | Kubo |
| 7,072,862 | B1 | 7/2006 | Wilson |
| 7,076,458 | B2 | 7/2006 | Lawlor et al. |
| 7,086,003 | B2 | 8/2006 | Demsky |
| 7,092,561 | B2 | 8/2006 | Downs, Jr. |
| 7,104,443 | B1 | 9/2006 | Paul et al. |
| 7,113,925 | B2 | 9/2006 | Waserstein |
| 7,114,649 | B2 | 10/2006 | Nelson |
| 7,116,446 | B2 | 10/2006 | Maurer |
| 7,117,171 | B1 | 10/2006 | Pollin |
| 7,120,461 | B2 | 10/2006 | Cho |
| 7,131,571 | B2 | 11/2006 | Swift et al. |
| 7,139,594 | B2 | 11/2006 | Nagatomo |
| 7,140,539 | B1 | 11/2006 | Crews |
| 7,156,311 | B2 | 1/2007 | Attia et al. |
| 7,163,347 | B2 | 1/2007 | Lugg |
| 7,178,721 | B2 | 2/2007 | Maloney |
| 7,181,430 | B1 | 2/2007 | Buchanan et al. |
| 7,184,980 | B2 | 2/2007 | Allen-Rouman et al. |
| 7,185,805 | B1 | 3/2007 | McShirley |
| 7,197,173 | B2 | 3/2007 | Jones et al. |
| 7,200,255 | B2 | 4/2007 | Jones |
| 7,204,412 | B2 | 4/2007 | Foss, Jr. |
| 7,207,478 | B1 | 4/2007 | Blackson et al. |
| 7,216,106 | B1 | 5/2007 | Buchanan |
| 7,219,082 | B2 | 5/2007 | Forte |
| 7,219,831 | B2 | 5/2007 | Murata |
| 7,240,336 | B1 | 7/2007 | Baker |
| 7,245,765 | B2 | 7/2007 | Myers et al. |
| 7,249,076 | B1 | 7/2007 | Pendleton |
| 7,252,224 | B2 | 8/2007 | Verma |
| 7,257,246 | B1 | 8/2007 | Brodie et al. |
| 7,266,230 | B2 | 9/2007 | Doran |
| 7,277,191 | B2 | 10/2007 | Metcalfe et al. |
| 7,290,034 | B2 | 10/2007 | Budd |
| 7,296,734 | B2 | 11/2007 | Pliha |
| 7,299,970 | B1 | 11/2007 | Ching |
| 7,299,979 | B2 | 11/2007 | Phillips |
| 7,313,543 | B1 | 12/2007 | Crane |
| 7,314,163 | B1 | 1/2008 | Crews et al. |
| 7,321,874 | B2 | 1/2008 | Dilip |
| 7,321,875 | B2 | 1/2008 | Dilip |
| 7,325,725 | B2 | 2/2008 | Foss, Jr. |
| 7,328,190 | B2 | 2/2008 | Smith et al. |
| 7,330,604 | B2 | 2/2008 | Wu et al. |
| 7,331,523 | B2 | 2/2008 | Meier et al. |
| 7,336,813 | B2 | 2/2008 | Prakash et al. |
| 7,343,320 | B1 | 3/2008 | Treyz |
| 7,349,566 | B2 | 3/2008 | Jones et al. |
| 7,349,585 | B2 | 3/2008 | Li |
| 7,356,505 | B2 | 4/2008 | March |
| 7,369,713 | B2 | 5/2008 | Suino |
| 7,377,425 | B1 | 5/2008 | Ma |
| 7,379,978 | B2 | 5/2008 | Anderson |
| 7,383,227 | B2 | 6/2008 | Weinflash et al. |
| 7,385,631 | B2 | 6/2008 | Maeno |
| 7,386,511 | B2 | 6/2008 | Buchanan |
| 7,388,683 | B2 | 6/2008 | Rodriguez et al. |
| 7,389,912 | B2 | 6/2008 | Starrs |
| 7,391,897 | B2 | 6/2008 | Jones et al. |
| 7,391,934 | B2 | 6/2008 | Goodall et al. |
| 7,392,935 | B2 | 7/2008 | Byrne et al. |
| 7,401,048 | B2 | 7/2008 | Rosedale |
| 7,403,917 | B1 | 7/2008 | Larsen |
| 7,406,198 | B2 | 7/2008 | Aoki et al. |
| 7,419,093 | B1 | 9/2008 | Blackson et al. |
| 7,421,107 | B2 | 9/2008 | Lugg |
| 7,421,410 | B1 | 9/2008 | Schechtman et al. |
| 7,427,016 | B2 | 9/2008 | Chimento |
| 7,433,098 | B2 | 10/2008 | Klein et al. |
| 7,437,327 | B2 | 10/2008 | Lam |
| 7,440,924 | B2 | 10/2008 | Buchanan |
| 7,447,347 | B2 | 11/2008 | Weber |
| 7,455,220 | B2 | 11/2008 | Phillips |
| 7,455,221 | B2 | 11/2008 | Sheaffer |
| 7,460,108 | B2 | 12/2008 | Tamura |
| 7,460,700 | B2 | 12/2008 | Tsunachima et al. |
| 7,461,779 | B2 | 12/2008 | Ramachandran |
| 7,461,780 | B2 | 12/2008 | Potts |
| 7,464,859 | B1 | 12/2008 | Hawkins |
| 7,471,818 | B1 | 12/2008 | Price |
| 7,475,040 | B2 | 1/2009 | Buchanan |
| 7,477,923 | B2 | 1/2009 | Wallmark |
| 7,480,382 | B2 | 1/2009 | Dunbar |
| 7,480,422 | B2 | 1/2009 | Ackley et al. |
| 7,489,953 | B2 | 2/2009 | Griffin |
| 7,490,242 | B2 | 2/2009 | Torres |
| 7,497,429 | B2 | 3/2009 | Reynders |
| 7,503,486 | B2 | 3/2009 | Ahles |
| 7,505,759 | B1 | 3/2009 | Rahman |
| 7,506,261 | B2 | 3/2009 | Statou |
| 7,509,287 | B2 | 3/2009 | Nutahara |
| 7,512,564 | B1 | 3/2009 | Geer |
| 7,519,560 | B2 | 4/2009 | Lam |
| 7,520,420 | B2 | 4/2009 | Phillips |
| 7,520,422 | B1 | 4/2009 | Robinson et al. |
| 7,536,354 | B1 | 5/2009 | deGroeve et al. |
| 7,536,440 | B2 | 5/2009 | Budd |
| 7,539,646 | B2 | 5/2009 | Gilder |
| 7,540,408 | B2 | 6/2009 | Levine |
| 7,542,598 | B2 | 6/2009 | Jones |
| 7,545,529 | B2 | 6/2009 | Borrey et al. |
| 7,548,641 | B2 | 6/2009 | Gilson et al. |
| 7,566,002 | B2 | 7/2009 | Love et al. |
| 7,568,615 | B2 | 8/2009 | Corona et al. |
| 7,571,848 | B2 | 8/2009 | Cohen |
| 7,577,614 | B1 | 8/2009 | Warren et al. |
| 7,587,066 | B2 | 9/2009 | Cordery et al. |
| 7,587,363 | B2 | 9/2009 | Cataline |
| 7,590,275 | B2 | 9/2009 | Clarke et al. |
| 7,599,543 | B2 | 10/2009 | Jones |
| 7,599,888 | B2 | 10/2009 | Manfre |
| 7,602,956 | B2 | 10/2009 | Jones |
| 7,606,762 | B1 | 10/2009 | Heit |
| 7,609,873 | B2 | 10/2009 | Foth et al. |
| 7,609,889 | B2 | 10/2009 | Guo et al. |
| 7,619,721 | B2 | 11/2009 | Jones |
| 7,620,231 | B2 | 11/2009 | Jones |
| 7,620,604 | B1 | 11/2009 | Bueche, Jr. |
| 7,630,518 | B2 | 12/2009 | Frew et al. |
| 7,644,037 | B1 | 1/2010 | Ostrovsky |
| 7,644,043 | B2 | 1/2010 | Minowa |
| 7,647,275 | B2 | 1/2010 | Jones |
| 7,668,363 | B2 | 2/2010 | Price |
| 7,672,022 | B1 | 3/2010 | Fan |
| 7,672,940 | B2 | 3/2010 | Viola |
| 7,676,409 | B1 | 3/2010 | Ahmad |
| 7,680,732 | B1 | 3/2010 | Davies et al. |
| 7,680,735 | B1 | 3/2010 | Loy |
| 7,689,482 | B2 | 3/2010 | Lam |
| 7,697,776 | B2 | 4/2010 | Wu et al. |
| 7,698,222 | B1 | 4/2010 | Bueche, Jr. |
| 7,702,588 | B2 | 4/2010 | Gilder et al. |
| 7,714,778 | B2 | 5/2010 | Dupray |
| 7,720,735 | B2 | 5/2010 | Anderson et al. |
| 7,734,545 | B1 | 6/2010 | Fogliano |
| 7,743,979 | B2 | 6/2010 | Fredman |
| 7,753,268 | B1 | 7/2010 | Robinson et al. |
| 7,761,358 | B2 | 7/2010 | Craig et al. |
| 7,766,223 | B1 | 8/2010 | Mello |
| 7,766,244 | B1 | 8/2010 | Field |
| 7,769,650 | B2 | 8/2010 | Bleunven |
| 7,778,457 | B2 | 8/2010 | Nepomniachtchi et al. |
| 7,792,752 | B1 | 9/2010 | Kay |
| 7,792,753 | B1 | 9/2010 | Slater et al. |
| 7,793,833 | B2 | 9/2010 | Yoon et al. |
| 7,810,714 | B2 | 10/2010 | Murata |
| 7,812,986 | B2 | 10/2010 | Graham et al. |
| 7,818,245 | B2 | 10/2010 | Prakash et al. |

(56) References Cited

U.S. PATENT DOCUMENTS 7,831,458 B2 11/2010 Neumann
7,856,402 B1 12/2010 Kay
7,865,384 B2 1/2011 Anderson et al.
7,865,425 B2 1/2011 Waelbroeck
7,873,200 B1 1/2011 Oakes, III et al.
7,873,556 B1 1/2011 Dolan
7,876,949 B1 1/2011 Oakes, III et al.
7,885,451 B1 2/2011 Walls et al.
7,885,880 B1 2/2011 Prasad et al.
7,894,094 B2 2/2011 Nacman et al.
7,895,054 B2 2/2011 Slen et al.
7,896,232 B1 3/2011 Prasad et al.
7,900,822 B1 3/2011 Prasad et al.
7,903,863 B2 3/2011 Jones et al.
7,904,386 B2 3/2011 Kalra et al.
7,912,785 B1 3/2011 Kay
7,935,441 B2 5/2011 Tononishi
7,949,587 B1 5/2011 Morris et al.
7,950,698 B2 5/2011 Popadic et al.
7,953,441 B2 5/2011 Lors
7,958,053 B2 6/2011 Stone
7,962,411 B1 6/2011 Prasad et al.
7,970,677 B1 6/2011 Oakes, III et al.
7,974,869 B1 7/2011 Sharma
7,974,899 B1 7/2011 Prasad et al.
7,978,900 B2 7/2011 Nepomniachtchi et al.
7,979,326 B2 7/2011 Kurushima
7,987,231 B2 7/2011 Karkanias
7,996,312 B1 8/2011 Beck et al.
7,996,314 B1 8/2011 Smith et al.
7,996,315 B1 8/2011 Smith et al.
7,996,316 B1 8/2011 Smith et al.
8,000,514 B2 8/2011 Nepomniachtchi et al.
8,001,051 B1 8/2011 Smith et al.
8,009,931 B2 8/2011 Li
8,045,784 B2 10/2011 Price et al.
8,046,301 B1 10/2011 Smith et al.
8,051,453 B2 11/2011 Arseneau et al.
8,060,442 B1 11/2011 Hecht et al.
8,064,729 B2 11/2011 Li et al.
8,065,307 B2 11/2011 Haslam et al.
8,091,778 B1 1/2012 Block et al.
8,116,533 B2 2/2012 Kiplinger et al.
8,118,654 B1 2/2012 Nicolas
8,131,636 B1 3/2012 Viera et al.
8,159,520 B1 4/2012 Dhanoa
8,203,640 B2 6/2012 Kim et al.
8,204,293 B2 6/2012 Csulits et al.
8,235,284 B1 8/2012 Prasad et al.
8,266,076 B2 9/2012 Lopez et al.
8,271,385 B2 9/2012 Emerson et al.
8,275,715 B2 9/2012 Caruso
8,290,237 B1 10/2012 Burks et al.
8,320,657 B1 11/2012 Burks et al.
8,332,329 B1 12/2012 Thiele
8,351,677 B1 1/2013 Oakes, III et al.
8,351,678 B1 1/2013 Medina, III
8,358,826 B1 1/2013 Medina et al.
8,364,563 B2 1/2013 Choiniere, Sr.
8,369,650 B2 2/2013 Zanfir et al.
8,374,963 B1 2/2013 Billman
8,391,599 B1 3/2013 Medina, III
8,392,332 B1 3/2013 Oakes, III et al.
8,401,962 B1 3/2013 Bent et al.
8,422,758 B1 4/2013 Bueche, Jr.
8,433,127 B1 4/2013 Harpel et al.
8,433,647 B1 4/2013 Yarbrough
8,452,689 B1 5/2013 Medina, III
RE44,274 E 6/2013 Popadic et al.
8,464,933 B1 6/2013 Prasad et al.
8,483,473 B2 7/2013 Roach
8,531,518 B1 9/2013 Zomet
8,538,124 B1 9/2013 Harpel et al.
8,542,921 B1 9/2013 Medina
8,548,267 B1 10/2013 Yacoub et al.
8,559,766 B2 * 10/2013 Tilt .................... H04N 1/2141
382/254
8,582,862 B2 11/2013 Nepomniachtchi et al.
8,611,635 B1 12/2013 Medina, III
8,660,952 B1 2/2014 Viera et al.
8,699,779 B1 * 4/2014 Prasad ................ G06Q 20/042
382/137
8,708,227 B1 4/2014 Oakes, III et al.
8,725,607 B2 5/2014 Dunn
8,731,321 B2 5/2014 Fujiwara et al.
8,732,081 B1 5/2014 Oakes, III et al.
8,751,345 B1 6/2014 Borzych et al.
8,751,356 B1 6/2014 Garcia
8,751,379 B1 6/2014 Bueche, Jr.
8,768,038 B1 7/2014 Sherman et al.
8,768,836 B1 7/2014 Acharya
8,799,147 B1 8/2014 Walls et al.
8,818,033 B1 8/2014 Liu
8,824,772 B2 9/2014 Viera
8,837,806 B1 9/2014 Ethington et al.
8,843,405 B1 9/2014 Hartman et al.
8,929,640 B1 1/2015 Mennie et al.
8,959,033 B1 2/2015 Oakes, III et al.
8,977,571 B1 * 3/2015 Bueche, Jr. ............ G06Q 40/02
705/45
8,990,862 B1 3/2015 Smith
9,009,071 B1 4/2015 Watson et al.
9,036,040 B1 5/2015 Danko
9,058,512 B1 6/2015 Medina, III
9,064,284 B1 6/2015 Janiszeski et al.
9,129,340 B1 * 9/2015 Medina, III ......... G06Q 20/386
9,148,569 B2 * 9/2015 Resende ............ H04N 23/6812
9,159,101 B1 10/2015 Pollack et al.
9,177,197 B1 11/2015 Prasad et al.
9,177,198 B1 11/2015 Prasad et al.
9,195,986 B2 11/2015 Christy et al.
9,224,136 B1 12/2015 Oakes, III et al.
9,235,860 B1 1/2016 Boucher et al.
9,270,804 B2 2/2016 Dees et al.
9,286,514 B1 3/2016 Newman
9,311,634 B1 4/2016 Hildebrand
9,336,517 B1 5/2016 Prasad et al.
9,384,409 B1 7/2016 Ming
9,390,339 B1 7/2016 Danko
9,401,011 B2 7/2016 Medina, III et al.
9,424,569 B1 8/2016 Sherman et al.
9,569,756 B1 2/2017 Bueche, Jr. et al.
9,613,467 B2 4/2017 Roberts et al.
9,613,469 B2 4/2017 Fish et al.
9,619,872 B1 4/2017 Medina, III et al.
9,626,183 B1 4/2017 Smith et al.
9,626,662 B1 4/2017 Prasad et al.
9,674,396 B1 6/2017 Pashintsev
9,779,392 B1 10/2017 Prasad et al.
9,779,452 B1 10/2017 Medina et al.
9,785,929 B1 10/2017 Watson et al.
9,792,654 B1 10/2017 Limas et al.
9,818,090 B1 11/2017 Bueche, Jr.
9,824,453 B1 11/2017 Collins et al.
9,886,642 B1 2/2018 Danko
9,892,454 B1 2/2018 Pollack et al.
9,898,778 B1 2/2018 Pollack et al.
9,898,808 B1 2/2018 Medina, III et al.
9,904,848 B1 2/2018 Newman
9,946,923 B1 4/2018 Medina
10,013,605 B1 7/2018 Oakes, III et al.
10,013,681 B1 7/2018 Oakes, III et al.
10,157,326 B2 12/2018 Long et al.
10,181,087 B1 1/2019 Danko
10,210,767 B2 2/2019 Johansen
10,217,375 B2 2/2019 Waldron
10,235,660 B1 3/2019 Bueche, Jr. et al.
10,325,420 B1 6/2019 Moon
10,354,235 B1 7/2019 Medina
10,360,448 B1 7/2019 Newman
10,373,136 B1 8/2019 Pollack et al.
10,380,559 B1 8/2019 Oakes, III et al.
10,380,562 B1 * 8/2019 Prasad ................ G06Q 20/204
10,380,565 B1 8/2019 Prasad

(56) References Cited

U.S. PATENT DOCUMENTS

| | | | |
|---|---|---|---|
| 10,380,683 | B1 | 8/2019 | Voutour et al. |
| 10,380,993 | B1 | 8/2019 | Clauer Salyers |
| 10,402,638 | B1 | 9/2019 | Oaks, III et al. |
| 10,402,790 | B1 | 9/2019 | Clark et al. |
| 10,460,295 | B1 | 10/2019 | Charles et al. |
| 10,482,432 | B1 | 11/2019 | Charles et al. |
| 10,574,879 | B1 | 2/2020 | Prasad et al. |
| 10,621,559 | B1 | 4/2020 | Oakes, III et al. |
| 10,621,660 | B1 | 4/2020 | Medina et al. |
| 10,706,466 | B1 | 7/2020 | Ethington et al. |
| 10,713,629 | B1 | 7/2020 | Medina, III |
| 10,719,815 | B1 | 7/2020 | Oakes, III et al. |
| 10,769,598 | B1 | 9/2020 | Oakes, III et al. |
| 10,818,282 | B1 | 10/2020 | Clauer Salyers |
| 10,846,667 | B1 | 11/2020 | Hecht |
| 10,956,879 | B1 | 3/2021 | Eidson |
| 11,030,752 | B1 | 6/2021 | Backlund |
| 11,042,940 | B1 | 6/2021 | Limas |
| 11,042,941 | B1 | 6/2021 | Limas |
| 11,062,130 | B1 | 7/2021 | Medina, III |
| 11,062,131 | B1 | 7/2021 | Medina, III |
| 11,062,283 | B1 | 7/2021 | Prasad |
| 11,064,111 | B1 | 7/2021 | Prasad |
| 11,068,976 | B1 | 7/2021 | Voutour |
| 11,070,868 | B1 | 7/2021 | Mortensen |
| 11,121,989 | B1 | 9/2021 | Castinado |
| 11,182,753 | B1 | 11/2021 | Charles et al. |
| 11,222,315 | B1 | 1/2022 | Prasad et al. |
| 11,232,517 | B1 | 1/2022 | Medina et al. |
| 11,288,898 | B1 | 3/2022 | Moon |
| 11,328,267 | B1 | 5/2022 | Medina, III |
| 11,398,215 | B1 | 7/2022 | Clauer Salyers |
| 2001/0004235 | A1 | 6/2001 | Maloney |
| 2001/0014881 | A1 | 8/2001 | Drummond |
| 2001/0016084 | A1 | 8/2001 | Pollard et al. |
| 2001/0018739 | A1 | 8/2001 | Anderson |
| 2001/0020949 | A1 | 9/2001 | Gong et al. |
| 2001/0027994 | A1 | 10/2001 | Hayashida |
| 2001/0030695 | A1 | 10/2001 | Prabhu et al. |
| 2001/0037299 | A1 | 11/2001 | Nichols et al. |
| 2001/0042171 | A1 | 11/2001 | Vermeulen |
| 2001/0042785 | A1 | 11/2001 | Walker |
| 2001/0043748 | A1 | 11/2001 | Wesolkowski et al. |
| 2001/0047330 | A1 | 11/2001 | Gephart |
| 2001/0051965 | A1 | 12/2001 | Guillevic |
| 2001/0054020 | A1 | 12/2001 | Barth et al. |
| 2002/0001393 | A1 | 1/2002 | Jones |
| 2002/0013767 | A1 | 1/2002 | Katz |
| 2002/0016763 | A1 | 2/2002 | March |
| 2002/0016769 | A1 | 2/2002 | Barbara et al. |
| 2002/0023055 | A1 | 2/2002 | Antognini et al. |
| 2002/0025085 | A1 | 2/2002 | Gustafson et al. |
| 2002/0026418 | A1 | 2/2002 | Koppel et al. |
| 2002/0032656 | A1 | 3/2002 | Chen |
| 2002/0038289 | A1 | 3/2002 | Lawlor et al. |
| 2002/0040340 | A1 | 4/2002 | Yoshida |
| 2002/0052841 | A1 | 5/2002 | Guthrie |
| 2002/0052853 | A1 | 5/2002 | Munoz |
| 2002/0065786 | A1 | 5/2002 | Martens et al. |
| 2002/0072974 | A1 | 6/2002 | Pugliese |
| 2002/0075524 | A1 | 6/2002 | Blair |
| 2002/0084321 | A1 | 7/2002 | Martens |
| 2002/0087467 | A1 | 7/2002 | Mascavage, III et al. |
| 2002/0107767 | A1 | 8/2002 | McClair et al. |
| 2002/0107809 | A1 | 8/2002 | Biddle et al. |
| 2002/0116329 | A1 | 8/2002 | Serbetcioglu |
| 2002/0116335 | A1 | 8/2002 | Star |
| 2002/0118891 | A1 | 8/2002 | Rudd |
| 2002/0120562 | A1 | 8/2002 | Opiela |
| 2002/0120582 | A1 | 8/2002 | Elston et al. |
| 2002/0120846 | A1 | 8/2002 | Stewart et al. |
| 2002/0129249 | A1 | 9/2002 | Maillard et al. |
| 2002/0130868 | A1 | 9/2002 | Smith |
| 2002/0133409 | A1 | 9/2002 | Sawano et al. |
| 2002/0138445 | A1 | 9/2002 | Laage et al. |
| 2002/0138522 | A1 | 9/2002 | Muralidhar |
| 2002/0145035 | A1 | 10/2002 | Jones |
| 2002/0147798 | A1 | 10/2002 | Huang |
| 2002/0150279 | A1 | 10/2002 | Scott |
| 2002/0150311 | A1 | 10/2002 | Lynn |
| 2002/0152160 | A1 | 10/2002 | Allen-Rouman et al. |
| 2002/0152161 | A1 | 10/2002 | Aoike |
| 2002/0152164 | A1 | 10/2002 | Dutta |
| 2002/0152165 | A1 | 10/2002 | Dutta et al. |
| 2002/0152169 | A1 | 10/2002 | Dutta |
| 2002/0152170 | A1 | 10/2002 | Dutta |
| 2002/0153414 | A1 | 10/2002 | Stoutenburg et al. |
| 2002/0154127 | A1 | 10/2002 | Vienneau et al. |
| 2002/0154815 | A1 | 10/2002 | Mizutani |
| 2002/0159648 | A1 | 10/2002 | Alderson et al. |
| 2002/0169715 | A1 | 11/2002 | Ruth et al. |
| 2002/0171820 | A1 | 11/2002 | Okamura |
| 2002/0172516 | A1 | 11/2002 | Aoyama |
| 2002/0178112 | A1 | 11/2002 | Goeller |
| 2002/0186881 | A1 | 12/2002 | Li |
| 2002/0188564 | A1 | 12/2002 | Star |
| 2002/0195485 | A1 | 12/2002 | Pomerleau et al. |
| 2003/0005326 | A1 | 1/2003 | Flemming |
| 2003/0009420 | A1 | 1/2003 | Jones |
| 2003/0015583 | A1 | 1/2003 | Abdi et al. |
| 2003/0018897 | A1 | 1/2003 | Bellis, Jr. et al. |
| 2003/0023557 | A1 | 1/2003 | Moore |
| 2003/0026609 | A1 | 2/2003 | Parulski |
| 2003/0038227 | A1 | 2/2003 | Sesek |
| 2003/0046223 | A1 | 3/2003 | Crawford |
| 2003/0050889 | A1 | 3/2003 | Burke |
| 2003/0051138 | A1 | 3/2003 | Maeda et al. |
| 2003/0053692 | A1 | 3/2003 | Hong et al. |
| 2003/0055756 | A1 | 3/2003 | Allan |
| 2003/0055776 | A1 | 3/2003 | Samuelson |
| 2003/0056104 | A1 | 3/2003 | Carr |
| 2003/0072568 | A1 | 4/2003 | Lin et al. |
| 2003/0074315 | A1 | 4/2003 | Lam |
| 2003/0075596 | A1 | 4/2003 | Koakutsu |
| 2003/0075916 | A1 | 4/2003 | Gorski |
| 2003/0078883 | A1 | 4/2003 | Stewart et al. |
| 2003/0081824 | A1 | 5/2003 | Mennie |
| 2003/0086615 | A1 | 5/2003 | Dance et al. |
| 2003/0093367 | A1 | 5/2003 | Allen-Rouman et al. |
| 2003/0093369 | A1 | 5/2003 | Ljichi et al. |
| 2003/0097592 | A1 | 5/2003 | Adusumilli |
| 2003/0102714 | A1 | 6/2003 | Rhodes et al. |
| 2003/0105688 | A1 | 6/2003 | Brown |
| 2003/0105714 | A1 | 6/2003 | Alarcon-Luther et al. |
| 2003/0119478 | A1 | 6/2003 | Nagy et al. |
| 2003/0126078 | A1 | 7/2003 | Vihinen |
| 2003/0126082 | A1 | 7/2003 | Omura et al. |
| 2003/0130940 | A1 | 7/2003 | Hansen et al. |
| 2003/0132384 | A1 | 7/2003 | Sugiyama et al. |
| 2003/0133608 | A1 | 7/2003 | Bernstein et al. |
| 2003/0133610 | A1 | 7/2003 | Nagarajan et al. |
| 2003/0135457 | A1 | 7/2003 | Stewart et al. |
| 2003/0139999 | A1 | 7/2003 | Rowe |
| 2003/0158811 | A1 | 8/2003 | Sanders |
| 2003/0159046 | A1 | 8/2003 | Choi et al. |
| 2003/0167225 | A1 | 9/2003 | Adams |
| 2003/0177448 | A1 | 9/2003 | Levine et al. |
| 2003/0187790 | A1 | 10/2003 | Swift et al. |
| 2003/0191615 | A1 | 10/2003 | Bailey |
| 2003/0191869 | A1 | 10/2003 | Williams |
| 2003/0200107 | A1 | 10/2003 | Allen et al. |
| 2003/0200174 | A1 | 10/2003 | Star |
| 2003/0202690 | A1 | 10/2003 | Jones et al. |
| 2003/0212904 | A1 | 11/2003 | Randle et al. |
| 2003/0213841 | A1 | 11/2003 | Josephson et al. |
| 2003/0217005 | A1 | 11/2003 | Drummond et al. |
| 2003/0218061 | A1 | 11/2003 | Filatov |
| 2003/0225705 | A1 | 12/2003 | Park et al. |
| 2003/0231285 | A1 | 12/2003 | Ferguson |
| 2003/0233278 | A1 | 12/2003 | Marshall |
| 2003/0233318 | A1 | 12/2003 | King et al. |
| 2004/0010466 | A1 | 1/2004 | Anderson |
| 2004/0010803 | A1 | 1/2004 | Berstis |
| 2004/0012496 | A1 | 1/2004 | De Souza |

(56) References Cited

U.S. PATENT DOCUMENTS

2004/0013284 A1 1/2004 Yu
2004/0017482 A1 1/2004 Weitman
2004/0024626 A1 2/2004 Bruijning
2004/0024708 A1 2/2004 Masuda
2004/0029591 A1 2/2004 Chapman et al.
2004/0030741 A1 2/2004 Wolton et al.
2004/0044606 A1 3/2004 Buttridge et al.
2004/0057697 A1 3/2004 Renzi
2004/0058705 A1 3/2004 Morgan
2004/0061913 A1 4/2004 Takiguchi
2004/0066031 A1 4/2004 Wong
2004/0066419 A1 4/2004 Pyhalammi
2004/0069841 A1 4/2004 Wong
2004/0071333 A1 4/2004 Douglas et al.
2004/0075754 A1 4/2004 Nakajima et al.
2004/0076320 A1 4/2004 Downs, Jr.
2004/0078299 A1 4/2004 Down-Logan
2004/0080795 A1 4/2004 Bean et al.
2004/0089711 A1 5/2004 Sandru
2004/0093303 A1 5/2004 Picciallo
2004/0093305 A1 5/2004 Kight
2004/0103057 A1 5/2004 Melbert et al.
2004/0103296 A1 5/2004 Harp
2004/0109596 A1 6/2004 Doran
2004/0110975 A1 6/2004 Osinski et al.
2004/0111371 A1 6/2004 Friedman
2004/0117302 A1 6/2004 Weichert
2004/0122754 A1 6/2004 Stevens
2004/0133511 A1 7/2004 Smith et al.
2004/0136586 A1 7/2004 Okamura
2004/0138974 A1 7/2004 Shimamura
2004/0148235 A1 7/2004 Craig et al.
2004/0158549 A1 8/2004 Matena
2004/0165096 A1 8/2004 Maeno
2004/0170259 A1 9/2004 Park
2004/0171371 A1 9/2004 Paul
2004/0184766 A1 9/2004 Kim et al.
2004/0193878 A1 9/2004 Dillinger et al.
2004/0201695 A1 10/2004 Inasaka
2004/0201741 A1 10/2004 Ban
2004/0202349 A1 10/2004 Erol et al.
2004/0205459 A1 10/2004 Green
2004/0210515 A1 10/2004 Hughes
2004/0210523 A1 10/2004 Gains et al.
2004/0217170 A1 11/2004 Takiguchi et al.
2004/0225604 A1 11/2004 Foss, Jr. et al.
2004/0228277 A1 11/2004 Williams
2004/0236647 A1 11/2004 Acharya
2004/0236688 A1 11/2004 Bozeman
2004/0238619 A1 12/2004 Nagasaka et al.
2004/0240722 A1 12/2004 Tsuji et al.
2004/0245324 A1 12/2004 Chen
2004/0247199 A1 12/2004 Murai et al.
2004/0248600 A1 12/2004 Kim
2004/0252679 A1 12/2004 Williams
2004/0260636 A1 12/2004 Marceau
2004/0267665 A1 12/2004 Nam et al.
2004/0267666 A1 12/2004 Minami
2005/0001421 A1 1/2005 Luth et al.
2005/0001924 A1 1/2005 Honda
2005/0010108 A1 1/2005 Rahn et al.
2005/0015332 A1 1/2005 Chen
2005/0015341 A1 1/2005 Jackson
2005/0015342 A1 1/2005 Murata et al.
2005/0021466 A1 1/2005 Buchanan et al.
2005/0030388 A1 2/2005 Stavely et al.
2005/0033645 A1 2/2005 Duphily
2005/0033685 A1 2/2005 Reyes
2005/0033690 A1 2/2005 Antognini et al.
2005/0033695 A1 2/2005 Minowa
2005/0034046 A1 2/2005 Berkmann
2005/0035193 A1 2/2005 Gustin et al.
2005/0036665 A1 2/2005 Higuchi
2005/0038746 A1 2/2005 Latimer et al.
2005/0038754 A1 2/2005 Geist
2005/0044042 A1 2/2005 Mendiola
2005/0044577 A1 2/2005 Jerding
2005/0049950 A1 3/2005 Johnson
2005/0071283 A1 3/2005 Randle et al.
2005/0075969 A1 4/2005 Nielson et al.
2005/0075974 A1 4/2005 Turgeon
2005/0077351 A1 4/2005 De Jong
2005/0078192 A1 4/2005 Sakurai et al.
2005/0078336 A1 4/2005 Ferlitsch
2005/0080725 A1 4/2005 Pick
2005/0082364 A1 4/2005 Alvarez et al.
2005/0086140 A1 4/2005 Ireland
2005/0086168 A1 4/2005 Alvarez
2005/0087594 A1 4/2005 Phillips
2005/0089209 A1 4/2005 Stefanuk
2005/0091117 A1 4/2005 Phillips
2005/0091132 A1 4/2005 Phillips
2005/0091161 A1 4/2005 Gustin
2005/0096992 A1 5/2005 Geisel
2005/0097019 A1 5/2005 Jacobs
2005/0097046 A1 5/2005 Singfield
2005/0097050 A1 5/2005 Orcutt
2005/0100216 A1 5/2005 Myers et al.
2005/0102208 A1 5/2005 Gudgeon
2005/0108164 A1 5/2005 Salafia
2005/0108168 A1 5/2005 Halpin
2005/0115110 A1 6/2005 Dinkins
2005/0125337 A1 6/2005 Tidwell
2005/0125338 A1 6/2005 Tidwell et al.
2005/0125360 A1 6/2005 Tidwell et al.
2005/0127160 A1 6/2005 Fujikawa
2005/0128333 A1 6/2005 Park
2005/0131820 A1 6/2005 Rodriguez
2005/0133586 A1 6/2005 Rekeweg et al.
2005/0143136 A1 6/2005 Lev et al.
2005/0144131 A1 6/2005 Aziz
2005/0149436 A1 7/2005 Elterich
2005/0157174 A1 7/2005 Kitamura et al.
2005/0165641 A1 7/2005 Chu
2005/0168566 A1 8/2005 Tada
2005/0171899 A1 8/2005 Dunn
2005/0171907 A1 8/2005 Lewis
2005/0177494 A1 8/2005 Kelly et al.
2005/0177499 A1 8/2005 Thomas
2005/0177510 A1 8/2005 Hilt et al.
2005/0177518 A1 8/2005 Brown
2005/0182710 A1 8/2005 Anderson
2005/0188306 A1 8/2005 Mackenzie
2005/0190269 A1 9/2005 Grignani
2005/0198364 A1 9/2005 Val et al.
2005/0203430 A1 9/2005 Williams et al.
2005/0205660 A1 9/2005 Munte
2005/0205661 A1 9/2005 Taylor
2005/0209961 A1 9/2005 Michelsen
2005/0213805 A1 9/2005 Blake et al.
2005/0216409 A1 9/2005 McMonagle et al.
2005/0216410 A1 9/2005 Davis et al.
2005/0218209 A1 10/2005 Heilper et al.
2005/0220324 A1 10/2005 Klein et al.
2005/0228733 A1 10/2005 Bent
2005/0238257 A1 10/2005 Kaneda et al.
2005/0244035 A1 11/2005 Klein et al.
2005/0252955 A1 11/2005 Sugai
2005/0267843 A1 12/2005 Acharya et al.
2005/0268107 A1 12/2005 Harris et al.
2005/0269412 A1 12/2005 Chiu
2005/0273368 A1 12/2005 Hutten et al.
2005/0273430 A1 12/2005 Pliha
2005/0278250 A1 12/2005 Zair
2005/0281448 A1 12/2005 Lugg
2005/0281450 A1 12/2005 Richardson
2005/0281471 A1 12/2005 LeConte
2005/0281474 A1 12/2005 Huang
2005/0289030 A1 12/2005 Smith
2005/0289059 A1 12/2005 Brewington et al.
2005/0289182 A1 12/2005 Pandian et al.
2006/0002426 A1 1/2006 Madour
2006/0004660 A1 1/2006 Pranger
2006/0010071 A1 1/2006 Jones

(56) References Cited

U.S. PATENT DOCUMENTS

2006/0015450 A1 1/2006 Guck et al.
2006/0015733 A1 1/2006 O'Malley et al.
2006/0017752 A1 1/2006 Kurzweil et al.
2006/0023930 A1 2/2006 Patel
2006/0025697 A1 2/2006 Kurzweil
2006/0026140 A1 2/2006 King et al.
2006/0039628 A1 2/2006 Li et al.
2006/0039629 A1 2/2006 Li et al.
2006/0041506 A1 2/2006 Mason et al.
2006/0045321 A1 3/2006 Yu
2006/0045374 A1 3/2006 Kim et al.
2006/0045379 A1 3/2006 Heaney et al.
2006/0047593 A1 3/2006 Naratil
2006/0049242 A1 3/2006 Mejias et al.
2006/0053056 A1 3/2006 Alspach-Goss
2006/0059085 A1 3/2006 Tucker
2006/0064368 A1 3/2006 Forte
2006/0071950 A1 4/2006 Kurzweil et al.
2006/0077941 A1 4/2006 Alagappan et al.
2006/0080245 A1 4/2006 Bahl
2006/0085357 A1 4/2006 Pizarro
2006/0085516 A1 4/2006 Farr et al.
2006/0102704 A1 5/2006 Reynders
2006/0103893 A1 5/2006 Azimi et al.
2006/0106691 A1 5/2006 Sheaffer
2006/0106717 A1 5/2006 Randle et al.
2006/0108168 A1 5/2006 Fischer et al.
2006/0110063 A1 5/2006 Weiss
2006/0112013 A1 5/2006 Maloney
2006/0115110 A1 6/2006 Rodriguez
2006/0115141 A1 6/2006 Koakutsu et al.
2006/0118613 A1 6/2006 McMann
2006/0124728 A1 6/2006 Kotovich et al.
2006/0124730 A1 6/2006 Maloney
2006/0144924 A1 7/2006 Stover
2006/0144937 A1 7/2006 Heilper et al.
2006/0144950 A1 7/2006 Johnson
2006/0152576 A1 7/2006 Kiessling et al.
2006/0159367 A1 7/2006 Zeineh et al.
2006/0161499 A1 7/2006 Rich et al.
2006/0161501 A1 7/2006 Waserstein
2006/0164682 A1 7/2006 Lev
2006/0166178 A1 7/2006 Driedijk
2006/0167818 A1 7/2006 Wentker et al.
2006/0171697 A1 8/2006 Nojima
2006/0181614 A1 8/2006 Yen et al.
2006/0182331 A1 8/2006 Gilson et al.
2006/0182332 A1 8/2006 Weber
2006/0186194 A1 8/2006 Richardson
2006/0202014 A1 9/2006 VanKirk et al.
2006/0202468 A1 9/2006 Phillips
2006/0206506 A1 9/2006 Fitzpatrick
2006/0208059 A1 9/2006 Cable et al.
2006/0210138 A1 9/2006 Hilton et al.
2006/0212391 A1 9/2006 Norman et al.
2006/0212393 A1 9/2006 Brown
2006/0214940 A1 9/2006 Kinoshita
2006/0215204 A1 9/2006 Miyamoto et al.
2006/0215230 A1 9/2006 Borrey et al.
2006/0221198 A1 10/2006 Fry et al.
2006/0222260 A1 10/2006 Sambongi et al.
2006/0229976 A1 10/2006 Jung
2006/0229986 A1 10/2006 Corder
2006/0229987 A1 10/2006 Leekley
2006/0238503 A1 10/2006 Smith
2006/0242062 A1 10/2006 Peterson et al.
2006/0242063 A1 10/2006 Peterson
2006/0248009 A1 11/2006 Hicks et al.
2006/0249567 A1 11/2006 Byrne et al.
2006/0255124 A1 11/2006 Hoch
2006/0270421 A1 11/2006 Phillips
2006/0274164 A1 12/2006 Kimura et al.
2006/0279628 A1 12/2006 Fleming
2006/0280360 A1 12/2006 Holub
2006/0282383 A1 12/2006 Doran
2006/0291744 A1 12/2006 Ikeda et al.
2007/0002157 A1 1/2007 Shintani et al.
2007/0005467 A1 1/2007 Haigh et al.
2007/0013721 A1 1/2007 Vau et al.
2007/0016796 A1 1/2007 Singhal
2007/0019243 A1 1/2007 Sato
2007/0022053 A1 1/2007 Waserstein
2007/0027802 A1 2/2007 VanDeburg et al.
2007/0030357 A1 2/2007 Levien et al.
2007/0030363 A1 2/2007 Cheatle et al.
2007/0031022 A1 2/2007 Frew
2007/0038561 A1 2/2007 Vancini et al.
2007/0041629 A1 2/2007 Prakash et al.
2007/0050292 A1 3/2007 Yarbrough
2007/0053574 A1 3/2007 Verma et al.
2007/0058851 A1 3/2007 Quine
2007/0058874 A1 3/2007 Tabata et al.
2007/0062284 A1 * 3/2007 Machida ................ G01P 15/18
73/513
2007/0063016 A1 3/2007 Myatt
2007/0064991 A1 3/2007 Douglas et al.
2007/0065143 A1 3/2007 Didow et al.
2007/0075772 A1 4/2007 Kokubo
2007/0076940 A1 4/2007 Goodall et al.
2007/0076941 A1 4/2007 Carreon et al.
2007/0077921 A1 4/2007 Hayashi
2007/0080207 A1 4/2007 Williams
2007/0082700 A1 4/2007 Landschaft
2007/0084911 A1 4/2007 Crowell
2007/0086642 A1 4/2007 Foth et al.
2007/0086643 A1 4/2007 Spier
2007/0094088 A1 4/2007 Mastie
2007/0094140 A1 4/2007 Riney et al.
2007/0095909 A1 5/2007 Chaum
2007/0100748 A1 5/2007 Dheer
2007/0110277 A1 5/2007 Hayduchok et al.
2007/0116364 A1 5/2007 Kleihorst et al.
2007/0118472 A1 5/2007 Allen-Rouman et al.
2007/0118747 A1 5/2007 Pintsov et al.
2007/0122024 A1 5/2007 Haas et al.
2007/0124241 A1 5/2007 Newton
2007/0127805 A1 6/2007 Foth et al.
2007/0129955 A1 6/2007 Dalmia
2007/0130063 A1 6/2007 Jindia
2007/0131758 A1 6/2007 Mejias et al.
2007/0136198 A1 6/2007 Foth et al.
2007/0138255 A1 6/2007 Carreon et al.
2007/0140545 A1 6/2007 Rossignoli
2007/0140594 A1 6/2007 Franklin
2007/0143208 A1 6/2007 Varga
2007/0150337 A1 6/2007 Hawkins et al.
2007/0154098 A1 7/2007 Geva et al.
2007/0156438 A1 7/2007 Popadic et al.
2007/0168265 A1 7/2007 Rosenberger
2007/0168283 A1 7/2007 Alvarez et al.
2007/0171288 A1 7/2007 Inoue
2007/0172107 A1 7/2007 Jones et al.
2007/0172148 A1 7/2007 Hawley
2007/0175977 A1 8/2007 Bauer et al.
2007/0179883 A1 8/2007 Questembert
2007/0183000 A1 8/2007 Eisen et al.
2007/0183652 A1 8/2007 Backstrom et al.
2007/0183741 A1 8/2007 Lerman et al.
2007/0194102 A1 8/2007 Cohen et al.
2007/0198432 A1 8/2007 Pitroda et al.
2007/0203708 A1 8/2007 Polycn et al.
2007/0206877 A1 9/2007 Wu et al.
2007/0208816 A1 9/2007 Baldwin et al.
2007/0214086 A1 9/2007 Homoki
2007/0217669 A1 9/2007 Swift et al.
2007/0233525 A1 10/2007 Boyle
2007/0233585 A1 10/2007 Ben Simon et al.
2007/0235518 A1 10/2007 Mueller et al.
2007/0235520 A1 10/2007 Smith et al.
2007/0241179 A1 10/2007 Davis
2007/0244782 A1 10/2007 Chimento
2007/0244811 A1 10/2007 Tumminaro
2007/0246525 A1 10/2007 Smith et al.
2007/0251992 A1 11/2007 Sharma et al.

(56) References Cited

U.S. PATENT DOCUMENTS

| | | | |
|---|---|---|---|
| 2007/0255652 | A1 | 11/2007 | Tumminaro |
| 2007/0255653 | A1 | 11/2007 | Tumminaro |
| 2007/0255662 | A1 | 11/2007 | Tumminaro |
| 2007/0258634 | A1 | 11/2007 | Simonoff |
| 2007/0262137 | A1 | 11/2007 | Brown |
| 2007/0262148 | A1 | 11/2007 | Yoon et al. |
| 2007/0268540 | A1 | 11/2007 | Gaspardo et al. |
| 2007/0269124 | A1 | 11/2007 | Li et al. |
| 2007/0271182 | A1 | 11/2007 | Prakash et al. |
| 2007/0278286 | A1 | 12/2007 | Crowell et al. |
| 2007/0288380 | A1 | 12/2007 | Starrs |
| 2007/0288382 | A1 | 12/2007 | Narayanan et al. |
| 2007/0295803 | A1 | 12/2007 | Levine et al. |
| 2007/0299928 | A1 | 12/2007 | Kohli et al. |
| 2008/0002911 | A1 | 1/2008 | Eisen |
| 2008/0010204 | A1 | 1/2008 | Rackley Iii et al. |
| 2008/0013831 | A1 | 1/2008 | Aoki |
| 2008/0021802 | A1 | 1/2008 | Pendelton |
| 2008/0040280 | A1 | 2/2008 | Davis |
| 2008/0046362 | A1 | 2/2008 | Easterly |
| 2008/0052182 | A1 | 2/2008 | Marshall |
| 2008/0059376 | A1 | 3/2008 | Davis |
| 2008/0063253 | A1 | 3/2008 | Wood |
| 2008/0065524 | A1 | 3/2008 | Matthews et al. |
| 2008/0068674 | A1 | 3/2008 | McIntyre |
| 2008/0069427 | A1 | 3/2008 | Liu |
| 2008/0071679 | A1 | 3/2008 | Foley |
| 2008/0071721 | A1 | 3/2008 | Wang |
| 2008/0073423 | A1 | 3/2008 | Heit et al. |
| 2008/0080760 | A1 | 4/2008 | Ronca |
| 2008/0086420 | A1* | 4/2008 | Gilder .................... G06Q 20/04 705/35 |
| 2008/0086421 | A1 | 4/2008 | Gilder |
| 2008/0086770 | A1 | 4/2008 | Kulkarni et al. |
| 2008/0091599 | A1 | 4/2008 | Foss, Jr. |
| 2008/0097899 | A1 | 4/2008 | Jackson et al. |
| 2008/0097907 | A1 | 4/2008 | Till et al. |
| 2008/0103790 | A1 | 5/2008 | Abernethy |
| 2008/0103967 | A1 | 5/2008 | Ackert et al. |
| 2008/0113674 | A1 | 5/2008 | Baig |
| 2008/0114739 | A1 | 5/2008 | Hayes |
| 2008/0115066 | A1 | 5/2008 | Pavley et al. |
| 2008/0116257 | A1 | 5/2008 | Fickling |
| 2008/0117991 | A1 | 5/2008 | Peddireddy |
| 2008/0119178 | A1 | 5/2008 | Peddireddy |
| 2008/0133411 | A1 | 6/2008 | Jones et al. |
| 2008/0140552 | A1 | 6/2008 | Blaikie |
| 2008/0140579 | A1 | 6/2008 | Sanjiv |
| 2008/0141117 | A1 | 6/2008 | King |
| 2008/0147549 | A1 | 6/2008 | Ruthbun |
| 2008/0155672 | A1 | 6/2008 | Sharma |
| 2008/0156438 | A1 | 7/2008 | Stumphauzer et al. |
| 2008/0162319 | A1 | 7/2008 | Breeden et al. |
| 2008/0162320 | A1 | 7/2008 | Mueller et al. |
| 2008/0162350 | A1 | 7/2008 | Allen-Rouman et al. |
| 2008/0162371 | A1 | 7/2008 | Rampell et al. |
| 2008/0177659 | A1 | 7/2008 | Lacey et al. |
| 2008/0180750 | A1 | 7/2008 | Feldman |
| 2008/0192129 | A1 | 8/2008 | Walker |
| 2008/0205751 | A1 | 8/2008 | Mischler |
| 2008/0208727 | A1 | 8/2008 | McLaughlin et al. |
| 2008/0214180 | A1 | 9/2008 | Cunningham et al. |
| 2008/0219543 | A1 | 9/2008 | Csulits |
| 2008/0245869 | A1 | 10/2008 | Berkun et al. |
| 2008/0247629 | A1 | 10/2008 | Gilder |
| 2008/0247655 | A1 | 10/2008 | Yano |
| 2008/0249931 | A1 | 10/2008 | Gilder et al. |
| 2008/0249951 | A1 | 10/2008 | Gilder et al. |
| 2008/0250196 | A1 | 10/2008 | Mori |
| 2008/0262950 | A1 | 10/2008 | Christensen et al. |
| 2008/0262953 | A1 | 10/2008 | Anderson |
| 2008/0270295 | A1 | 10/2008 | Lent |
| 2008/0275821 | A1 | 11/2008 | Bishop et al. |
| 2008/0301441 | A1 | 12/2008 | Calman et al. |
| 2008/0304769 | A1 | 12/2008 | Hollander et al. |
| 2008/0316542 | A1 | 12/2008 | Mindrum et al. |
| 2009/0024520 | A1 | 1/2009 | Drory et al. |
| 2009/0046938 | A1 | 2/2009 | Yoder |
| 2009/0060396 | A1 | 3/2009 | Blessan et al. |
| 2009/0066987 | A1 | 3/2009 | Inokuchi |
| 2009/0076921 | A1 | 3/2009 | Nelson et al. |
| 2009/0092287 | A1 | 4/2009 | Moraleda |
| 2009/0092309 | A1 | 4/2009 | Calman et al. |
| 2009/0094148 | A1 | 4/2009 | Gilder et al. |
| 2009/0108080 | A1 | 4/2009 | Meyer |
| 2009/0110281 | A1 | 4/2009 | Hirabayashi |
| 2009/0114716 | A1 | 5/2009 | Ramachandran |
| 2009/0132813 | A1 | 5/2009 | Schibuk |
| 2009/0141962 | A1 | 6/2009 | Borgia et al. |
| 2009/0164350 | A1 | 6/2009 | Sorbe et al. |
| 2009/0164370 | A1 | 6/2009 | Sorbe et al. |
| 2009/0166406 | A1 | 7/2009 | Pigg et al. |
| 2009/0167870 | A1 | 7/2009 | Caleca et al. |
| 2009/0171723 | A1 | 7/2009 | Jenkins |
| 2009/0171795 | A1 | 7/2009 | Clouthier et al. |
| 2009/0171819 | A1 | 7/2009 | Emde et al. |
| 2009/0171825 | A1 | 7/2009 | Roman |
| 2009/0173781 | A1* | 7/2009 | Ramachandran .... G06Q 20/042 235/379 |
| 2009/0176511 | A1 | 7/2009 | Morrison |
| 2009/0185241 | A1 | 7/2009 | Nepomniachtchi |
| 2009/0185737 | A1 | 7/2009 | Nepomniachtchi |
| 2009/0185738 | A1 | 7/2009 | Nepomniachtchi |
| 2009/0190823 | A1 | 7/2009 | Walters |
| 2009/0192938 | A1 | 7/2009 | Amos |
| 2009/0212929 | A1 | 8/2009 | Drory et al. |
| 2009/0222347 | A1 | 9/2009 | Whitten |
| 2009/0236201 | A1 | 9/2009 | Blake |
| 2009/0236413 | A1 | 9/2009 | Mueller et al. |
| 2009/0240574 | A1 | 9/2009 | Carpenter |
| 2009/0240620 | A1 | 9/2009 | Kendrick et al. |
| 2009/0242626 | A1 | 10/2009 | Jones |
| 2009/0252437 | A1 | 10/2009 | Li |
| 2009/0254447 | A1 | 10/2009 | Blades |
| 2009/0257641 | A1 | 10/2009 | Liu et al. |
| 2009/0263019 | A1 | 10/2009 | Tzadok et al. |
| 2009/0271287 | A1 | 10/2009 | Halpern |
| 2009/0281904 | A1 | 11/2009 | Pharris |
| 2009/0284637 | A1 | 11/2009 | Parulski et al. |
| 2009/0290751 | A1 | 11/2009 | Ferman et al. |
| 2009/0292628 | A1 | 11/2009 | Dryer et al. |
| 2009/0313167 | A1* | 12/2009 | Dujari .................... G06Q 40/06 705/42 |
| 2009/0319425 | A1 | 12/2009 | Tumminaro et al. |
| 2009/0327129 | A1 | 12/2009 | Collas et al. |
| 2010/0007899 | A1 | 1/2010 | Lay |
| 2010/0008579 | A1 | 1/2010 | Smimov |
| 2010/0016016 | A1 | 1/2010 | Brundage et al. |
| 2010/0027679 | A1 | 2/2010 | Sunahara et al. |
| 2010/0030687 | A1 | 2/2010 | Panthaki et al. |
| 2010/0038839 | A1 | 2/2010 | DeWitt et al. |
| 2010/0047000 | A1 | 2/2010 | Park et al. |
| 2010/0057578 | A1 | 3/2010 | Blair et al. |
| 2010/0061446 | A1 | 3/2010 | Hands et al. |
| 2010/0069093 | A1 | 3/2010 | Morrison |
| 2010/0069155 | A1 | 3/2010 | Schwartz |
| 2010/0076890 | A1 | 3/2010 | Low |
| 2010/0078471 | A1 | 4/2010 | Lin et al. |
| 2010/0078472 | A1 | 4/2010 | Lin et al. |
| 2010/0082468 | A1 | 4/2010 | Low et al. |
| 2010/0082470 | A1 | 4/2010 | Walach |
| 2010/0112975 | A1 | 5/2010 | Sennett |
| 2010/0128131 | A1 | 5/2010 | Tenchio et al. |
| 2010/0150424 | A1 | 6/2010 | Nepomniachtchi et al. |
| 2010/0161408 | A1 | 6/2010 | Karson |
| 2010/0165015 | A1 | 7/2010 | Barkley et al. |
| 2010/0198733 | A1 | 8/2010 | Gantman et al. |
| 2010/0201711 | A1 | 8/2010 | Fillion et al. |
| 2010/0225773 | A1 | 9/2010 | Lee |
| 2010/0226559 | A1 | 9/2010 | Najari et al. |
| 2010/0260408 | A1 | 10/2010 | Prakash et al. |
| 2010/0262522 | A1 | 10/2010 | Anderson et al. |
| 2010/0262607 | A1 | 10/2010 | Vassilvitskii |
| 2010/0274693 | A1 | 10/2010 | Bause et al. |

(56) References Cited

U.S. PATENT DOCUMENTS

| | | | |
|---|---|---|---|
| 2010/0287250 | A1 | 11/2010 | Carlson |
| 2010/0312705 | A1 | 12/2010 | Caruso et al. |
| 2011/0015963 | A1 | 1/2011 | Chafle |
| 2011/0016084 | A1 | 1/2011 | Mundy et al. |
| 2011/0016109 | A1 | 1/2011 | Vassilvitskii |
| 2011/0054780 | A1 | 3/2011 | Dhanani |
| 2011/0069180 | A1 | 3/2011 | Nijemcevic et al. |
| 2011/0082747 | A1 | 4/2011 | Khan |
| 2011/0083101 | A1 | 4/2011 | Sharon |
| 2011/0105092 | A1 | 5/2011 | Felt |
| 2011/0106675 | A1 | 5/2011 | Perlman |
| 2011/0112967 | A1 | 5/2011 | Anderson et al. |
| 2011/0112985 | A1 | 5/2011 | Kocmond |
| 2011/0166976 | A1 | 7/2011 | Krein |
| 2011/0170740 | A1 | 7/2011 | Coleman |
| 2011/0191161 | A1 | 8/2011 | Dai |
| 2011/0251956 | A1 | 10/2011 | Cantley et al. |
| 2011/0276483 | A1 | 11/2011 | Saegert et al. |
| 2011/0280450 | A1 | 11/2011 | Nepomniachtchi et al. |
| 2011/0285874 | A1 | 11/2011 | Showering et al. |
| 2011/0310442 | A1 | 12/2011 | Popadic et al. |
| 2012/0036014 | A1 | 2/2012 | Sunkada |
| 2012/0045112 | A1 | 2/2012 | Lundblad et al. |
| 2012/0047070 | A1 | 2/2012 | Pharris |
| 2012/0052874 | A1 | 3/2012 | Kumar |
| 2012/0062732 | A1 | 3/2012 | Marman |
| 2012/0089514 | A1 | 4/2012 | Kraemling et al. |
| 2012/0098705 | A1 | 4/2012 | Yost |
| 2012/0099792 | A1 | 4/2012 | Chevion et al. |
| 2012/0109793 | A1 | 5/2012 | Abeles |
| 2012/0113489 | A1 | 5/2012 | Heit et al. |
| 2012/0150767 | A1 | 6/2012 | Chacko |
| 2012/0185383 | A1 | 7/2012 | Atsmon |
| 2012/0185388 | A1 | 7/2012 | Pranger |
| 2012/0229872 | A1 | 9/2012 | Dolev |
| 2012/0230577 | A1 | 9/2012 | Calman et al. |
| 2012/0296768 | A1 | 11/2012 | Fremont-Smith |
| 2013/0021651 | A9 | 1/2013 | Popadic et al. |
| 2013/0097076 | A1 | 4/2013 | Love |
| 2013/0120595 | A1 * | 5/2013 | Roach ...................... G06K 9/38 348/207.1 |
| 2013/0155474 | A1 | 6/2013 | Roach et al. |
| 2013/0191261 | A1 | 7/2013 | Chandler |
| 2013/0198071 | A1 | 8/2013 | Jurss |
| 2013/0201534 | A1 | 8/2013 | Carlen |
| 2013/0223721 | A1 | 8/2013 | Nepomniachtchi et al. |
| 2013/0297353 | A1 | 11/2013 | Strange |
| 2013/0324160 | A1 | 12/2013 | Sabatellil |
| 2013/0332219 | A1 | 12/2013 | Clark |
| 2013/0346306 | A1 | 12/2013 | Kopp |
| 2013/0346307 | A1 | 12/2013 | Kopp |
| 2014/0010467 | A1 | 1/2014 | Mochizuki et al. |
| 2014/0032406 | A1 | 1/2014 | Roach et al. |
| 2014/0037183 | A1 | 2/2014 | Gorski et al. |
| 2014/0067661 | A1 | 3/2014 | Elischer |
| 2014/0156501 | A1 | 6/2014 | Howe |
| 2014/0197922 | A1 | 7/2014 | Stanwood et al. |
| 2014/0203508 | A1 | 7/2014 | Pedde |
| 2014/0207673 | A1 | 7/2014 | Jeffries |
| 2014/0207674 | A1 | 7/2014 | Schroeder |
| 2014/0236820 | A1 | 8/2014 | Carlton et al. |
| 2014/0244476 | A1 | 8/2014 | Shvarts |
| 2014/0258169 | A1 | 9/2014 | Wong et al. |
| 2014/0279453 | A1 | 9/2014 | Belchee et al. |
| 2014/0351137 | A1 | 11/2014 | Chisholm |
| 2014/0374486 | A1 | 12/2014 | Collins, Jr. |
| 2015/0039528 | A1 | 2/2015 | Minogue et al. |
| 2015/0090782 | A1 | 4/2015 | Dent |
| 2015/0134517 | A1 | 5/2015 | Cosgray |
| 2015/0244994 | A1 | 8/2015 | Jang et al. |
| 2015/0294523 | A1 | 10/2015 | Smith |
| 2015/0348591 | A1 | 12/2015 | Kaps et al. |
| 2016/0026866 | A1 | 1/2016 | Sundaresan |
| 2016/0034590 | A1 | 2/2016 | Endras et al. |
| 2016/0142625 | A1 | 5/2016 | Weksler et al. |
| 2016/0335816 | A1 | 11/2016 | Thoppae et al. |
| 2017/0039637 | A1 | 2/2017 | Wandelmer |
| 2017/0068421 | A1 | 3/2017 | Carlson |
| 2017/0132583 | A1 | 5/2017 | Nair |
| 2017/0146602 | A1 | 5/2017 | Samp et al. |
| 2017/0229149 | A1 | 8/2017 | Rothschild et al. |
| 2017/0337610 | A1 | 11/2017 | Beguesse |
| 2018/0025251 | A1 | 1/2018 | Welinder et al. |
| 2018/0197118 | A1 | 7/2018 | McLaughlin |
| 2019/0026577 | A1 | 1/2019 | Hall et al. |
| 2019/0122222 | A1 | 4/2019 | Uechi |
| 2019/0311227 | A1 | 10/2019 | Kriegman et al. |
| 2020/0311844 | A1 | 10/2020 | Luo et al. |
| 2021/0097615 | A1 | 4/2021 | Gunn, Jr. |

FOREIGN PATENT DOCUMENTS

| | | | | |
|---|---|---|---|---|
| CN | 1967565 | A | 5/2007 | |
| EP | 0984410 | | 3/2000 | |
| EP | 0984410 | A1 | 3/2000 | |
| EP | 1571634 | A1 * | 9/2005 | ........... A61B 5/1117 |
| EP | 1 855 459 | A2 | 5/2007 | |
| IN | 200902748 13 | | 10/2014 | |
| IN | 202141007247 | A | 3/2021 | |
| JP | 2004-23158 | | 1/2004 | |
| JP | 2004-23158 | A | 1/2004 | |
| JP | 2004023158 | A | 1/2004 | |
| JP | 3708807 | | 10/2005 | |
| JP | 2005326902 | A | 11/2005 | |
| JP | 2006174105 | A | 6/2006 | |
| KR | 20040076131 | A | 8/2004 | |
| WO | WO 96/14707 | A1 | 5/1996 | |
| WO | WO 98/37655 | A1 | 8/1998 | |
| WO | 0161436 | A2 | 8/2001 | |
| WO | WO 01/61436 | | 8/2001 | |
| WO | WO 2004/008350 | A1 | 1/2004 | |
| WO | 2005043857 | A1 | 5/2005 | |
| WO | WO 2005/043857 | | 5/2005 | |
| WO | 2005124657 | A1 | 12/2005 | |
| WO | WO 2006/075967 | A1 | 7/2006 | |
| WO | 2006086768 | A2 | 8/2006 | |
| WO | WO 2006/136958 | A2 | 12/2006 | |
| WO | WO 2007/024889 | | 3/2007 | |

OTHER PUBLICATIONS

Oliveira, Pedro, and Eric Von Hippel. "Users as service innovators: The case of banking services." Research policy 40.6 (2011): 806-818. (Year: 2011).*

"Accept "Customer Not Present"Checks," Accept Check Online, http://checksoftware.com, Cited in U.S. Pat. No. 7,900,822, as dated 2007 (1 pg).

"Adjusting Brightness and Contrast", www.eaglesoftware.com/adjustin.htm, retrieved on May 4, 2009 (4 pgs).

"Best practices for producing quality digital image files," Digital Images Guidelines, http://deepblue.lib.umich.edu/bitstream/2027.42/40247/1/Images-Best_Practice.pdf, downloaded 2007 (2 pgs).

"Chapter 7 Payroll Programs," Uniform Staff Payroll System, http://www2.oecn.k12.oh.us/www/ssdt/usps/usps_user_guide_005.html, Cited in U.S. Pat. No. 7,900,822, as dated 2007 (9 pgs).

"Check 21—The check is not in the post", RedTitan Technology 2004 http://www.redtitan.com/check21/htm (3 pgs).

"Check 21 Solutions," Columbia Financial International, Inc. http://www.columbiafinancial.us/check2l/solutions.htm, Cited in U.S. Pat. No. 7,900,822, as dated 2007 (8 pgs).

"Check Fraud: A Guide to Avoiding Losses", All Net, http://all.net/books/audit/checkfraud/security.htm, Cited in U.S. Pat. No. 7,900,822, as dated 2007 (1 pg).

"Compliance with Regulation CC", http./www/federalreserve.gov/Pubs/regcc/regcc.htm, Jan. 24, 2006 (6 pgs).

"Customer Personalized Bank Checks and Address Labels" Checks Your Way Inc., http://www.checksyourway.com/htm/web_pages/faq.htm, Cited in U.S. Pat. No. 7,900,822, as dated 2007 (6 pgs).

"Direct Deposit Application for Payroll", Purdue University, Business Office Form 0003, http://purdue.edu/payroll/pdf/directdepositapplication.pdf, Jul. 2007 (2 pgs).

(56) References Cited

OTHER PUBLICATIONS

"Direct Deposit Authorization Form", www.umass.edu/humres/library/DDForm.pdf, May 2003 (3 pgs).
"Direct Deposit," University of Washington, http://www.washington.edu/admin/payroll/directdeposit.html, Cited in U.S. Pat. No. 7,900,822, as dated 2007 (3 pgs).
"Electronic Billing Problem: The E-check is in the mail" American Banker—vol. 168, No. 95, May 19, 2003 (4 pgs).
"Frequently Asked Questions" Bank of America, http://www/bankofamerica.com/deposits/checksave/index.cfm?template-lc_faq_bymail, Cited in U.S. Pat. No. 7,900,822, as dated 2007 (2 pgs).
"Full Service Direct Deposit", www.nonprofitstaffing.com/images/upload/dirdepform.pdf. Cited in U.S. Pat. No. 7,900,822, as dated 2001, (2 pgs).
"How to Digitally Deposit a Check Image", Smart Money Daily, Copyright 2008 (5 pgs).
"ImageNet Mobile Deposit Provides Convenient Check Deposit and Bill Pay to Mobile Consumers," Miteksystems, 2008 (2 pgs).
"It's the easiest way to Switch banks", LNB, http://www.inbky.com/pdf/LNBswitch-kit10-07.pdf Cited in U.S. Pat. No. 7,996,316, as dated 2007 (7 pgs).
"Lesson 38—More Bank Transactions", Turtle Soft, http://www.turtlesoft.com/goldenseal-software-manual.lesson38.htm, Cited in U.S. Pat. No. 7,900,822, as dated 2007 (8 pgs).
"Middleware", David E. Bakken, Encyclopedia of Distributed Computing, Kluwer Academic Press, 2001 (6 pgs).
"Mitek Systems Announces Mobile Deposit Application for Apple iPhone," http://prnewswire.com/cgi-bin/stories/pl?ACCT=104&STORY=/www/story/10-01- . . . , Nov. 25, 2008 (2 pgs).
"Personal Finance", PNC, http://www.pnc.com/webapp/unsec/productsandservice.do?sitearea=/PNC/home/personal/account+services/quick+switch/quick+switch+faqs, Cited in U.S. Pat. No. 7,900,822, as dated 2007 (12 pgs).
"Refractive index" Wikipedia, the free encyclopedia; http://en.wikipedia.org./wiki/refractiveindex.com Oct. 16, 2007 (4 pgs).
"Remote check deposit is the answer to a company's banking problem," Daily Breeze, Torrance, CA, Nov. 17, 2006, 2 pgs.
"Remote Deposit Capture", Plante & Moran, http://plantemoran.com/industries/fincial/institutions/bank/resources/community+bank+advisor/2007+summer+issue/remote+deposit+capture.htm, Cited in U.S. Pat. No. 7,900,822, as dated 2007 (3 pgs).
"Remote Deposit" National City, http://www.nationalcity.com/smallbusiness/cashmanagement/remotedeposit/default.asp; Cited in U.S. Pat. No. 7,900,822, as dated 2007 (1 pg).
"Save on ATM Fees", RedEye Edition, Chicago Tribune, Chicago, IL Jun. 30, 2007 (2 pgs).
"SNB Check Capture: SmartClient User's Guide," Nov. 2006, 21 pgs.
"Switching Made Easy," Bank of North Georgia, http://www.banknorthgeorgia.com/cmsmaster/documents/286/documents616.pdf, 2007 (7 pgs).
"Two Words Every Business Should Know: Remote Deposit," Canon, http://www.rpsolutions.com/rpweb/pdfs/canon_rdc.pdf, 2005 (7 pgs).
"Virtual Bank Checks", Morebusiness.com, http://www.morebusiness.com/running_yourbusiness/businessbits/d908484987.brc, Cited in U.S. Pat. No. 7,900,822, as dated 2007 (3 pgs).
"WallStreetGrapevine.com" Stocks on the Rise: JADG, BKYI, MITK; Mar. 3, 2008 (4 pgs).
"What is check Fraud", National Check Fraud Center, http://www.ckfraud.org/ckfraud.html , Cited in U.S. Pat. No. 7,900,822, as dated 2007 (12 pgs).
Affinity Federal Credit Union, "Affinity Announces Online Deposit," Aug. 4, 2005 (1 pg).
Albrecht, W. Steve, "Check Kiting: Detection, Prosecution and Prevention," The FBI Law Enforcement Bulletin, Nov. 1, 1993 (6 pgs).
Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).
Amber Avalona-Butler / Paraglide, "At Your Service: Best iPhone Apps for Military Lifestyle," Jul. 9, 2010 (2 pgs).
Anderson, Milton M. "FSML and Echeck", Financial Services Technology Consortium, 1999 (17 pgs).
Archive Index Systems; Panini My Vision X-30 or VX30 or X30 © 1994-2008 Archive Systems, Inc. P./O. Box 40135 Bellevue, WA USA 98015 (2 pgs).
Associate of German Banks, SEPA 2008: Uniform Payment Instruments for Europe, Berlin, Cited in U.S. Pat. No. 7,900,822, as dated Jul. 2007, Bundesverbankd deutscher banker ev (42 pgs).
Automated Merchant Systems, Inc., "Electronic Check Conversion," http://www.automatedmerchant.com/electronic_check_conversion.cfm, 2006, downloaded Oct. 18, 2006 (3 pgs).
Bank Systems & Technology, Untitled Article, May 1, 2006, http://www.banktech.com/showarticle.jhtml? articleID=187003126, "Are you Winning in the Payment World?" (4 pgs).
BankServ, "DepositNow: What's the difference?" Cited in U.S. Pat. No. 7,970,677, as dated 2006, (4 pgs).
BankServ, Product Overview, http://www.bankserv.com/products/remotedeposit.htm, Cited in U.S. Pat. No. 7,970,677, as dated 2006, (3 pgs).
Blafore, Bonnie "Lower Commissions, Fewer Amenities", Better Investing, Madison Heights: Feb. 2003, vol. 52, Iss 6, (4 pgs).
BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).
Blue Mountain Consulting, from URL: www.bluemontainconsulting.com, Cited in U.S. Pat. No. 7,900,822, as dated Apr. 26, 2006 (3 pgs).
Board of Governors of the federal reserve system, "Report to the Congress on the Check Clearing for the 21$^{st}$ Century Act of 2003" Apr. 2007, Submitted to Congress pursuant to section 16 of the Check Clearing for the 21st Century Act of 2003, (59 pgs).
Bruene, Jim; "Check Free to Enable In-Home Remote Check Deposit for Consumers and Small Business", NetBanker. Com, Financial Insite, Inc., http://www.netbanker.com/2008/02/checkfree_to_enableinhome_rem.html, Feb. 5, 2008 (3 pgs).
Bruene, Jim; "Digital Federal Credit Union and Four Others Offer Consumer Remote Deposit Capture Through EasCorp", NetBanker—Tracking Online Finance, www.netbanker.com/2008/04/digital_federal_credit_union_a.html, Apr. 13, 2008 (3 pgs).
Bruno, M., "Instant Messaging," Bank Technology News, Dec. 2002 (3 pgs).
Burnett, J. "Depository Bank Endorsement Requirements," BankersOnline.com, http://www.bankersonline.com/cgi-bin/printview/printview.pl, Jan. 6, 2003 (3 pgs).
Canon, ImageFormula CR-25/CR-55, "Improve Your Bottom Line with Front-Line Efficiencies", 0117W117, 1207-55/25-1 OM-BSP, Cited in U.S. Pat. No. 7,949,587 as dated 2007. (4 pgs).
Carrubba, P. et al., "Remote Deposit Capture: A White Paper Addressing Regulatory, Operational and Risk Issues," NetDeposit Inc., 2006 (11 pgs).
Century Remote Deposit High-Speed Scanner User's Manual Release 2006, (Century Manual), Century Bank, 2006, (32 pgs).
Chiang, Chuck, The Bulletin, "Remote banking offered", http://bendbulletin.com/apps/pbcs.dll/article?AID=/20060201/BIZ0102/602010327&templ . . . , May 23, 2008 (2 pgs).
CNN.com/technology, "Scan, deposit checks from home", www.cnn.com/2008ITECH/biztech/02/07/check.scanning.ap/index.html, Feb. 7, 2008 (3 pgs).
Constanzo, Chris, "Remote Check Deposit: Wells Captures a New Checking Twist", Bank Technology News Article—May 2005, www.americanbanker.com/btn_article.html?id=20050502YQ50FSYG (2 pgs).
Craig, Ben, "Resisting Electronic Payment Systems: Burning Down the House?", Federal Reserve Bank of Cleveland, Jul. 1999 (4 pgs).
Creativepaymentsolutions.com, "Creative Payment Solutions—Websolution," www.creativepaymentsolution.com/cps/financialservices/websolution/default.html, Copyright 2008, Creative Payment Solutions, Inc. (1 pg).

(56) References Cited

OTHER PUBLICATIONS

Credit Union Journal, "The Ramifications of Remote Deposit Capture Success", www.cuiournal.com/orintthis.html?id=20080411 EODZT57G, Apr. 14, 2008 (1 pg).
Credit Union Journal, "AFCU Averaging 80 DepositHome Transactions Per Day", Credit Union Journal, Aug. 15, 2005 (1 pg).
Credit Union Management, "When You wish Upon an Imaging System . . . the Right Selection Process can be the Shining Star," Credit Union Management, Aug. 1993, printed from the internet at , on Oct. 19, 2013 (11 pgs).
DCU Member's Monthly—Jan. 2008, "PC Deposit—Deposit Checks from Home!", http://www.mycreditunionnewsletter.com/dcu/01 08/page1. html, Copyright 2008 Digital Federal Credit Union (2 pgs).
De Jesus, A. et al., "Distributed Check Processing in a Check 21 Environment: An educational overview of the opportunities and challenges associated with implementing distributed check imaging and processing solutions," Panini, 2004, pp. 1-22.
De Queiroz, Ricardo et al., "Mixed Raster Content (MRC) Model for Compound Image Compression", 1998 (14 pgs).
Debello, James et al., "RDM and Mitek Systems to Provide Mobile Check Deposit," Mitek Systems, Inc., San Diego, California and Waterloo, Ontario, (Feb. 24, 2009), 2 pgs.
DeYoung, Robert; "The Financial Performance of Pure Play Internet Banks"; Federal Reserve Bank of Chicago Economic Perspectives; 2001; pp. 60-75; vol. 25, No. 1 (16pgs).
Dias, Danilo et al., "A Model for the Electronic Representation of Bank Checks", Brasilia Univ. Oct. 2006 (5 pgs).
Digital Transactions News, "An ACH-Image Proposal for Check Roils Banks and Networks" May 26, 2006 (3 pgs).
Dinan, R.F. et al., "Image Plus High Performance Transaction System", IBM Systems Journal, 1990 vol. 29, No. 3 (14 pgs).
Doermann, David et al., "Progress in Camera-Based Document Image Analysis," Proceedings of the Seventh International Conference on Document Analysis and Recognition (ICDAR 2003) 0-7695-1960-1/03, 2003 IEEE (11 pages).
Duvall, Mel, "Remote Deposit Capture," Baseline, vol. 1, Issue 70, Mar. 2007, 2 pgs.
eCU Technologies, "Upost Remote Deposit Solution," Retrieved from the internet https://www.eutechnologies.com/products/upost.html, downloaded 2009 (1 pg).
EFT Network Unveils FAXTellerPlus, EFT Network, Inc., www.eftnetwork.com, Jan. 13, 2009 (2 pgs).
ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).
Federal Check 21 Act, "New Check 21 Act effective Oct. 28, 2004: Bank No Longer Will Return Original Cancelled Checks," Consumer Union's FAQ's and Congressional Testimony on Check 21, www.consumerlaw.org.initiatives/content/check21_content.html, Cited in U.S. Pat. No. 7,873,200, as dated Dec. 2005 (20 pgs).
Federal Reserve Board, "Check Clearing for the 21st Century Act", FRB, http://www.federalreserve.gov/paymentsystems/truncation/, Mar. 1, 2006 (1 pg).
Federal Reserve System, "12 CFR, Part 229 [Regulation CC; Docket No. R-0926]: Availability of Funds and Collection of Checks," Federal Registrar, Apr. 28, 1997, pp. 1-50.
Federal Reserve System, "Part IV, 12 CFR Part 229 [Regulation CC; Docket No. R-1176]: Availability of Funds and Collection of Checks; Final Rule," Federal Registrar, vol. 69, No. 149, Aug. 4, 2004, pp. 47290-47328.
Fest, Glen., "Patently Unaware" Bank Technology News, Apr. 2006, Retrieved from the internet at URL:http://banktechnews.com/article.html?id=2006403T7612618 (5 pgs).
Fidelity Information Services, "Strategic Vision Embraces Major Changes in Financial Services Solutions: Fidelity's long-term product strategy ushers in new era of application design and processing," Insight, 2004, pp. 1-14.
Fisher, Dan M., "Home Banking in the 21st Century: Remote Capture Has Gone Retail", May 2008 (4 pgs).
Furst, Karen et al., "Internet Banking: Developments and Prospects", Economic and Policy Analysis Working Paper Sep. 2000, Sep. 2000 (60 pgs).
Garry, M., "Checking Options: Retailers face an evolving landscape for electronic check processing that will require them to choose among several scenarios," Supermarket News, vol. 53, No. 49, 2005 (3 pgs).
German Shegalov, Diplom-Informatiker, "Integrated Data, Message, and Process Recovery for Failure Masking in Web Services", Dissertation Jul. 2005 (146 pgs).
Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).
Gupta, Maya R. et al., "OCR binarization and image pre-processing for searching historical documents," Pattern Recognition, vol. 40, No. 2, Feb. 2007, pp. 389-397.
Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).
Hartly, Thomas, "Banks Check Out New Image", Business First, Buffalo: Jul. 19, 2004, vol. 20, Issue 43, (3 pgs).
Heckenberg, D. "Using Mac OS X for Real-Time Image Processing" Oct. 8, 2003 (15 pgs).
Hildebrand, C. et al., "Electronic Money," Oracle, http://www.oracle.com/oramag/profit/05-feb/p15financial.html, 2005, downloaded Oct. 18, 2006 (5 pgs).
Hillebrand, G., "Questions and Answers About the Check Clearing for the 21st Century Act, Check 21," ConsumersUnion.org, http://www.consumersunion.org/finance/ckclear1002.htm, Jul. 27, 2004, downloaded Oct. 18, 2006 (6 pgs).
Iida, Jeanne, "The Back Office: Systems—Image Processing Rolls on as Banks ReapBenefits," American Banker, Jul. 19, 1993, printed from the internet at , on Oct. 19, 2013 (3 pgs).
Image Master, "Photo Restoration: We specialize in digital photo restoration and photograph repair of family pictures", http://www.imphotorepair.com, Cited in U.S. Pat. No. 7,900,822, as downloaded Apr. 2007 (1 pg).
Investment Systems Company, "Portfolio Accounting System," 2000, pp. 1-32.
JBC, "What is a MICR Line?," eHow.com, retrieved from http://www.ehow.com/about_4684793_what-micr-line.html on May 4, 2009 (2 pgs).
Johnson, Jennifer J., Secretary of the Board; Federal Reserve System, 12 CFR Part 229, Regulation CC; Docket No. R 1176, "Availability of Funds and Collection of Checks". Cited in U.S. Pat. No. 7,900,822, as dated 2009, (89 pgs).
Kendrick, Kevin B., "Check Kiting, Float for Purposes of Profit," Bank Security & Fraud Prevention, vol. 1, No. 2, 1994 (3 pgs).
Kiser, Elizabeth K.; "Modeling the Whole Firm: The Effect of Multiple Inputs and Financial Intermediation on Bank Deposit Rates;" FEDS Working Paper No. Jul. 2004; Jun. 3, 2003; pp. 1-46 (46 pgs).
Knestout, Brian P. et al., "Banking Made Easy" Kiplinger's Personal Finance Washington, Jul. 2003, vol. 57, Iss 7 (5 pgs).
Kornai Andras et al., "Recognition of Cursive Writing on Personal Checks", Proceedings of International Workshop on the Frontiers in Handwriting Recognition, Cited in U.S. Pat. No. 7,900,822, as dated Sep. 1996, (6 pgs).
Levitin, Adam J., Remote Deposit Capture: A Legal and Transactional Overview, Banking Law Journal, p. 115, 2009 (RDC).
Masonson, L., "Check Truncation and ACH Trends—Automated Clearing Houses", healthcare financial management associate, http://www.findarticles.com/p/articles/mLm3276/is_n7_v47/ai_14466034/print, 1993 (2 pgs).
Matthews, Deborah, "Advanced Technology Makes Remote Deposit Capture Less Risky," Indiana Bankers Association, Apr. 2008 (2 pgs).
Metro 1 Credit Union, "Remote Banking Services," hltp://ww544\metro1cu.org/metro1cu/remote.html, downloaded Apr. 17, 2007 (4 pgs).

(56) References Cited

OTHER PUBLICATIONS

Mitek systems, "Imagenet Mobile Deposit", San Diego, CA, downloaded 2009 (2 pgs).
Mitek Systems: Mitek Systems Launches First Mobile Check Deposit and Bill Pay Application, San Diego, CA, Jan. 22, 2008 (3 pgs).
Mohl, Bruce, "Banks Reimbursing ATM Fee to Compete With Larger Rivals", Boston Globe, Boston, MA, Sep. 19, 2004 (3 pgs).
Moreau, T., "Payment by Authenticated Facsimile Transmission: a Check Replacement Technology for Small and Medium Enterprises," Connotech Experts-conseils, Inc., Apr. 1995 (31 pgs).
Nelson, B. et al., "Remote deposit capture changes the retail landscape," Northwestern Financial Review, http://findarticles.com/p/articles/mi qa3799/is200607/ai_n16537250, 2006 (3 pgs).
NetBank, Inc., "Branch Out: Annual Report 2004," 2004 (150 pgs).
NetBank, Inc., "Quick Post: Deposit and Payment Forwarding Service," 2005 (1 pg).
NetDeposit Awarded Two Patents for Electronic Check Process, NetDeposit, Jun. 18, 2007, (1 pg).
Nixon, Julie et al., "Fisery Research Finds Banks are Interested in Offering Mobile Deposit Capture as an," Fiserv, Inc. Brookfield, Wis., (Business Wire), (Feb. 20, 2009), 2 pgs.
Online Deposit: Frequently Asked Questions, http://www.depositnow.com/faq.html, Copyright 2008 (1 pg).
Onlinecheck.com/Merchant Advisors, "Real-Time Check Debit", Merchant Advisors: Retail Check Processing Check Conversion, http://www.onlinecheck/wach/rcareal.htm, Cited in U.S. Pat. No. 7,900,822, as dated 2006 (3 pgs).
Oxley, Michael G., from committee on Financial Services; "Check Clearing for the 21st Century Act", $108^{th}$ Congress, $1^{st}$ Session House of Representatives report 108-132, Jun. 2003 (20 pgs).
Oxley, Michael G., from the committee of conference; "Check Clearing for the 21st Century Act" $108^{th}$ Congress, $1^{st}$ Session Senate report 108-291, Oct. 1, 2003 (27 pgs).
Palacios, Rafael et al., "Automatic Processing of Brazilian Bank Checks". Cited in U.S. Pat. No. 7,900,822, as dated 2002 (28 pgs).
Patterson, Scott "USAA Deposit@Home—Another WOW moment for Net Banking", NextCU.com, Jan. 26, 2007 (5 pgs).
Public Law 108-100, 108 Congress; "An Act Check Clearing for the 21st Century Act", Oct. 28, 2003, 117 Stat. 1177 (18 pgs).
Rao, Bharat; "The Internet and the Revolution in Distribution: A Cross-Industry Examination"; Technology in Society; 1999; pp. 287-306; vol. 21, No. 3 (20 pgs).
Remotedepositcapture, URL:www.remotedepositcapture.com, Cited in U.S. Pat. No. 7,900,822, as dated 2006 (5 pgs).
RemoteDepositCapture.com, "PNC Bank to Offer Ease of Online Deposit Service Integrated with QuickBooks to Small Businesses", Remote Deposit Capture News Articles from Jul. 24, 2006, (2 pgs).
RemoteDepositCapture.com, Remote Deposit Capture News Articles from Jul. 6, 2006, "BankServ Announces New Remote Deposit Product Integrated with QuickBooks" (3 pgs).
Remotedepsitcapture.com, LLC, "Remote Deposit Capture Overview," ROC Overview, http://remotedepositcapture.com/overview/RDC_overview.htm, Cited in U.S. Pat. No. 7,900,822, as dated Mar. 12, 2007 (4 pgs).
Richey, J. C. et al., "EE 4530 Check Imaging," Nov. 18, 2008 (10 pgs).
Ritzer, J.R. "Hinky Dinky helped spearhead POS, remote banking movement", Bank Systems and Equipment, vol. 21, No. 12, Dec. 1984 (1 pg).
Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998 (41 pgs).
Rose, Sarah et al., "Best of the We: The Top 50 Financial Websites", Money, New York, Dec. 1999, vol. 28, Iss. 12 (8 pgs).
Shelby, Hon. Richard C. (Committee on Banking, Housing and Urban Affairs); "Check Truncation Act of 2003", calendar No. 168, 108th Congress, 1st Session Senate report 108-79, Jun. 2003 (27 pgs).
SoyBank Anywhere, "Consumer Internet Banking Service Agreement," Dec. 6, 2004 (6 pgs).
Teixeira, D., "Comment: Time to Overhaul Deposit Processing Systems," American Banker, Dec. 10, 1998, vol. 163, No. 235, p. 15 (3 pgs).
Thailandguru.com: How and where to Pay Bills @ www.thailandguru.com/paying-bills.html, © 1999-2007 (2 pgs).
The Automated Clearinghouse, "Retail Payment Systems; Payment Instruments Clearing and Settlement: The Automated Clearinghouse (ACH)", www.ffiec.gov/ffiecinfobase/booklets/retailretail_02d.html, Cited in U.S. Pat. No. 7,900,822, as dated Dec. 2005 (3 pgs).
The Green Sheet 2.0: Newswire, "Co-Op adds home deposit capabilities to suite of check imaging products", www.greensheet.com/newswire.php?newswire_id=8799, Mar. 5, 2008 (2 pgs).
Tygar, J.D., Atomicity in Electronic Commerce, in ACM Networker, 2:2, Apr./May 1998 (12 pgs).
Valentine, Lisa, "Remote Deposit Capture Hot Just Got Hotter," ABA Banking Journal, Mar. 2006, p. 1-9.
Wade, Will, "Early Notes: Updating Consumers on Check 21" American Banker Aug. 10, 2004 (3 pgs).
Wallison, Peter J., "Wal-Mart Case Exposes Flaws in Banking-Commerce Split", American Banker, vol. 167. No. 8, Jan. 11, 2002 (3 pgs).
Wells Fargo 2005 News Releases, "The New Wells Fargo Electronic Deposit Services Break Through Banking Boundaries in the Age of Check 21", San Francisco Mar. 28, 2005, www.wellsfargo.com/press/3282005_check21Year=2005 (1 pg).
Wells Fargo Commercial, "Remote Deposit", www.wellsfargo.com/com/treasurymgmtlreceivables/electronic/remote deposit, Copyright 2008 (1 pg).
White, J.M. et al., "Image Thresholding for Optical Character Recognition and Other Applications Requiring Character Image Extraction", IBM J. Res. Development, Jul. 1983, vol. 27, No. 4 (12 pgs).
Whitney et al., "Reserve Banks to Adopt DSTU X9.37/2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pages).
Wikipedia®, "Remote Deposit," http://en.wikipedia.org/wiki/Remote_deposit, 2007 (3 pgs).
Windowsfordevices.com, "Software lets camera phone users deposit checks, pay bills", www.windowsfordevices.com/news/NS3934956670.html, Jan. 29, 2008 (3 pgs).
Wolfe, Daniel, "Check Image Group Outlines Agenda," American Banker, New York, N.Y.: Feb 13, 2009, vol. 174, Iss. 30, p. 12. (2 pgs).
Woody Baird Associated Press, "Pastor's Wife got Scammed—She Apparently Fell for Overseas Money Scheme," The Commercial Appeal, Jul. 1, 2006, p. A.1.
Zhang, C.Y., "Robust Estimation and Image Combining" Astronomical Data Analysis Software and Systems IV, ASP Conference Series, 1995 (5 pgs).
Zions Bancorporation, "Moneytech, the technology of money in our world: Remote Deposit," http://www.bankjunior.com/pground/moneytech/remote_deposit.jsp, 2007 (2 pgs).
Application as filed Apr. 3, 2008 for U.S. Appl. No. 12/062,143 (27 pgs).
Application as filed Aug. 19, 2010 for U.S. Appl. No. 12/859,741 (235 pgs).
Application as filed Aug. 21, 2008 for U.S. Appl. No. 12/195,723 (38 pgs).
Application as filed on Aug. 21, 2009 for U.S. Appl. No. 12/545,127 (45 pgs).
Application as filed on Aug. 28, 2009 for U.S. Appl. No. 12/549,443 (41 pgs).
Application as filed on Dec. 20, 2006 for U.S. Appl. No. 11/613,656 (21 pgs).
Application as filed on Dec. 29, 2005 for U.S. Appl. No. 11/321,025 (19 pgs).
Application as filed on Dec. 30, 2010 for U.S. Appl. No. 12/982,494 (280 pgs).

(56) References Cited

OTHER PUBLICATIONS

Application as filed on Dec. 30, 2010 for U.S. Appl. No. 12/982,561 (275 pgs).
Application as filed on Dec. 30, 2010 for U.S. Appl. No. 12/982,578 (274 pgs).
Application as filed on Dec. 30, 2010 for U.S. Appl. No. 12/982,594 (275 pgs).
Application as filed on Feb. 15, 2012 for U.S. Appl. No. 13/397,405 (19 pgs).
Application as filed on Feb. 18, 2009 for U.S. Appl. No. 12/388,005 (37 pgs).
Application as filed on Jan. 7, 2013 for U.S. Appl. No. 13/735,678 (30 pgs).
Application as filed on Jul. 13, 2006 for U.S. Appl. No. 11/487,537 (23 pgs).
Application as filed on Jul. 27, 2009 for U.S. Appl. No. 12/509,613 (48 pgs).
Application as filed on Jul. 27, 2009 for U.S. Appl. No. 12/509,680 (41 pgs).
Application as filed on Jun. 11, 2008 for U.S. Appl. No. 12/137,051 (29 pgs).
Application as filed on Jun. 8, 2011 for U.S. Appl. No. 13/155,976 (352 pgs).
Application as filed on Jun. 8, 2011 for U.S. Appl. No. 13/156,007 (356 pgs).
Application as filed on Jun. 8, 2011 for U.S. Appl. No. 13/156,018 (353 pgs).
Application as filed on Mar. 15, 2007 for U.S. Appl. No. 11/686,924 (34 pgs).
Application as filed on Mar. 15, 2007 for U.S. Appl. No. 11/686,928 (36 pgs).
Application as filed on Mar. 15, 2013 for U.S. Appl. No. 13/842,112 (62 pgs).
Application as filed on Mar. 4, 2009 for U.S. Appl. No. 12/397,671 (40 pgs).
Application as filed on Mar. 4, 2009 for U.S. Appl. No. 12/397,930 (37 pgs).
Application as filed on May 10, 2007 for U.S. Appl. No. 11/747,222 (35 pgs).
Application as filed on Oct. 17, 2008 for U.S. Appl. No. 12/253,278 (42 pgs).
Application as filed on Oct. 17, 2013 for U.S. Appl. No. 14/056,565 (53 pgs).
Application as filed on Oct. 23, 2007 for U.S. Appl. No. 11/876,925 (36 pgs).
Application as filed on Oct. 23, 2007 for U.S. Appl. No. 11/877,335 (29 pgs).
Application as filed on Oct. 25, 2007 for U.S. Appl. No. 11/923,839 (22 pgs).
Application as filed on Oct. 29, 2007 for U.S. Appl. No. 11/926,388 (23 pgs).
Application as filed on Oct. 30, 2007 for U.S. Appl. No. 11/928,297 (26 pgs).
Application as filed on Oct. 31, 2006 for U.S. Appl. No. 11/590,974 (31 pgs).
Application as filed on Oct. 31, 2006 for U.S. Appl. No. 11/591,008 (27 pgs).
Application as filed on Oct. 31, 2006 for U.S. Appl. No. 11/591,227 (58 pgs).
Application as filed on Oct. 31, 2006 for U.S. Appl. No. 11/591,273 (56 pgs).
Application as filed Oct. 31, 2007 for U.S. Appl. No. 11/930,537 (27 pgs).
Application as filed Oct. 31, 2007 for U.S. Appl. No. 11/931,670 (47 pgs).
Application as filed Oct. 8, 2007 for U.S. Appl. No. 11/868,878 (30 pgs).
Application as filed Oct. 8, 2007 for U.S. Appl. No. 11/868,884 (30 pgs).
Application as filed Sep. 28, 2007 for U.S. Appl. No. 11/864,569 (35 pgs).
Application as filed Sep. 8, 2008 for U.S. Appl. No. 12/205,996 (30 pgs).
Claims as filed on Apr. 1, 2013 for U.S. Appl. No. 13/854,521 (5 pgs).
Claims as filed on Apr. 3, 2008 for U.S. Appl. No. 12/062,163 (3 pgs).
Claims as filed on Apr. 3, 2008 for U.S. Appl. No. 12/062,175 (3 pgs).
Claims as filed on Apr. 30, 2013 for U.S. Appl. No. 13/874,145 (5 pgs).
Claims as filed on Aug. 19, 2010 for U.S. Appl. No. 12/859,752 (5 pgs).
Claims as filed on Aug. 21, 2009 for U.S. Appl. No. 12/545,127 (5 pgs).
Claims as filed on Dec. 15, 2011 for U.S. Appl. No. 13/327,478 (4 pgs).
Claims as filed on Dec. 20, 2006 for U.S. Appl. No. 11/613,671 (3 pgs).
Claims as filed on Dec. 20, 2012 for U.S. Appl. No. 13/722,576 (4 pgs).
Claims as filed on Dec. 29, 2005 for U.S. Appl. No. 11/320,998 (3 pgs).
Claims as filed on Dec. 29, 2005 for U.S. Appl. No. 11/321,027 (3 pgs).
Claims as filed on Dec. 8, 2010 for U.S. Appl. No. 12/963,513 (7 pgs).
Claims as filed on Feb. 12, 2013 for U.S. Appl. No. 13/765,412 (1 pg).
Claims as filed on Feb. 15, 2012 for U.S. Appl. No. 13/397,437 (6 pgs).
Claims as filed on Feb. 16, 2011 for U.S. Appl. No. 13/028,477 (3 pgs).
Claims as filed on Feb. 16, 2015 for U.S. Appl. No. 14/623,179 (10 pgs).
Claims as filed on Feb. 19, 2013 for U.S. Appl. No. 13/770,048 (4 pgs).
Claims as filed on Jan. 20, 2011 for U.S. Appl. No. 13/010,644 (9 pgs).
Claims as filed on Jan. 31, 2011 for U.S. Appl. No. 13/017,865 (11 pgs).
Claims as filed on Jun. 13, 2012 for U.S. Appl. No. 13/495,971 (36 pgs).
Claims as filed on Jun. 20, 2013 for U.S. Appl. No. 13/922,686 (7 pgs).
Claims as filed on Jun. 9, 2014 for U.S. Appl. No. 14/299,456 (36 pgs).
Claims as filed on Mar. 15, 2007 for U.S. Appl. No. 11/686,925 (5 pgs).
Claims as filed on Mar. 25, 2014 for U.S. Appl. No. 14/220,799 (1 pg).
Claims as filed on Mar. 25, 2014 for U.S. Appl. No. 14/224,944 (4 pgs).
Claims as filed on Mar. 25, 2014 for U.S. Appl. No. 14/225,090 (1 pg).
Claims as filed on Mar. 3, 2014 for U.S. Appl. No. 14/195,482 (4 pgs).
Claims as filed on May 10, 2007 for U.S. Appl. No. 11/747,223 (4 pgs).
Claims as filed on May 18, 2011 for U.S. Appl. No. 13/110,077 (9 pgs).
Claims as filed on May 2, 2011 for U.S. Appl. No. 13/098,566 (10 pgs).
Claims as filed on Nov. 20, 2012 for U.S. Appl. No. 13/682,268 (4 pgs).
Claims as filed on Oct. 16, 2014 for U.S. Appl. No. 14/516,335 (4 pgs).
Claims as filed on Oct. 16, 2014 for U.S. Appl. No. 14/516,350 (4 pgs).
Claims as filed on Oct. 16, 2014 for U.S. Appl. No. 14/516,364 (4 pgs).

(56) References Cited

OTHER PUBLICATIONS

Claims as filed on Oct. 23, 2007 for U.S. Appl. No. 11/877,382 (6 pgs).
Claims as filed on Oct. 24, 2008 for U.S. Appl. No. 12/257,471 (4 pgs).
Claims as filed on Oct. 31, 2006 for U.S. Appl. No. 11/590,963 (3 pgs).
Claims as filed on Oct. 31, 2006 for U.S. Appl. No. 11/590,995 (3 pgs).
Claims as filed on Oct. 31, 2006 for U.S. Appl. No. 11/590,998 (4 pgs).
Claims as filed on Oct. 31, 2006 for U.S. Appl. No. 11/591,131 (4 pgs).
Claims as filed on Oct. 31, 2007 for U.S. Appl. No. 11/931,804 (4 pgs).
Claims as filed on Oct. 8, 2007 for U.S. Appl. No. 11/868,878 (4 pgs).
Claims as filed on Sep. 14, 2012 for U.S. Appl. No. 13/619,026 (3 pgs).
Claims as filed on Sep. 2, 2008 for U.S. Appl. No. 12/202,781 (4 pgs).
Claims as filed on Sep. 8, 2008 for U.S. Appl. No. 12/206,001 (3 pgs).
Claims as filed on Sep. 8, 2008 for U.S. Appl. No. 12/206,007 (3 pgs).
"Clearing House Electronic Check Clearing System (CHECCS) Operating Rules," An IP.com Prior Art Database Technical Disclosure, Jul. 29, 2015 (35 pgs).
"Deposit Now: Quick Start User Guide," BankServ, 2007, 29 pages.
"First Wireless Handheld Check and Credit Card Processing Solution Launched by Commericant®, MobileScape® 5000 Eliminates Bounced Checks, Enables Payments Everywhere," Business Wire, Mar. 13, 2016, 3 pages.
"NOVA Enhances Electronic Check Service to Benefit Multi-Lane Retailers," Business Wire, Nov. 28, 2006, 2 pages.
"Exchangeable image file format for digital still cameras: Exif Version 2.2," Standard of Electronics and Information Technology Industries Associate, JEITA CP-3451, Technical Standardization Committee on AV & IT Storage Systems and Equipments, Japan Electronics and Information Technology Industries Association, Apr. 2002 (154 pgs). (retrieved from: http://www.exif.org/Exif2-2.PDF).
Aradhye, Hrishikesh B., "A Generic Method for Determining Up/Down Orientation of Text in Roman and Non-Roman Scripts," Pattern Recognition Society, Dec. 13, 2014, 18 pages.
Bills, Steve, "Automated Amount Scanning Is Trend in Remote-Deposit," American Banker, New York, NY, Aug. 30, 2005, (3 pgs).
Braun, Tim, "Camdesk—Towards Portable and Easy Document Capture," Image Understanding and Pattern Recognition Research Group, Department of Computer Science, University of Kaiserslautern, Technical Report, Mar. 29, 2005 (64 pgs). (Retrieved from: https://pdfs.semanticscholar.org/93b2/ea0d12f24c91f3c46fa1c0d58a76bb132bd2.pdf).
Herley, Cormac, "Efficient Inscribing of Noisy Rectangular Objects in Scanned Images," 2004 International Conference on Image Processing, 4 pages.
Lampert, Christoph et al., "Oblivious Document Capture and Real-Time Retrieval," International Workshop on Camera Based Document Analysis and Recognition (CBDAR), 2005 (8 pgs). (Retrieved from: http://www-cs.ccny.cuny.edu/~wolberg/capstone/bookwarp/LampertCBDAR05.pdf).
Liang, Jian et al., Camera-Based Analysis of Text and Documents: A Survey, International Journal on Document Analysis and Recognition, Jun. 21, 2005, 21 pages.
Luo, Xi-Peng et al., "Design and Implementation of a Card Reader Based on Build-In Camera," Proceedings of the 17th International Conference on Pattern Recognition, 2004, 4 pages.
Vaream, Craig, "Image Deposit Solutions: Emerging Solutions for More Efficient Check Processing," JP Morgan Chase, Nov. 2005 (16 pgs).
Wade, Will, "Early Debate on Remote-Capture Risk," American Banker, New York, NY, May 26, 2004 (3 pgs).
Zandifar, A., "A Video-Based Framework for the Analysis of Presentations/Posters," International Journal on Document Analysis and Recognition, Feb. 2, 2005, 10 pages.
"Quicken Bill Pay", Retrieved from the Internet on Nov. 27, 2007 at: <URL:htt://quicken intuit.com/quicken-bill-pay-jhtml>, 2 pgs.
"Start to Simplify with Check Imaging a Smarter Way to Bank", Retrieved from the Internet on Nov. 27, 2007, at: <URL: htt://www.midnatbank.com/Internet%20Banking/internet_Banking.html>, 3 pgs.
Application as filed Jun. 26, 2018 for U.S. Appl. No. 16/018,868, 39 pgs.
Defendant Wells Fargo Bank, N.A.'s Answer, Affirmative Defenses, and Counterclaims to Plaintiff's Complaint, dated Aug. 14, 2018, 64 pgs.
Leica Digilux 2 Instructions located on the Internet: http://www.overgaard.dk/pdf/d2_manual.pdf (attached as Exhibit 2 from the Defendant Wells Fargo Bank N.A.'s Answer dated Aug. 14, 2018), 95 pgs.
Sony Digital Camera User's Guide/ Trouble Shooting Operating Instructions, copyright 2005, located on the Internet at: https://www.sony.co.uk/electronics/support/res/manuals/2654/26544941M.pdf (attached as Exhibit 3 from the Defendant Wells Fargo Bank N.A.'s Answer dated Aug. 14, 2018), 136 pgs.
Panasonic Operating Instructions for Digital Camera/Lens Kit Model No. DMC-L1K, https://www.panasonic.com/content/dam/Panasonic/support_manual/Digital_Still_Camera/English_01-vqt0-vqt2/vqt0w95_L1_oi.pdf (attached as Exhibit 4 from the Defendant Wells Fargo Back N.A.'s Answer dated Aug. 14, 2018), 129 pgs.
Nikon Digital Camera D300 User's Manual, located on the Internet at: http://download.nikonimglib.com/archive2/iBuJv00Aj97i01y8BrK49XX0Ts69/D300_ EU(En)04.pdf (attached as Exhibit 5 from the Defendant Wells Fargo Bank, N.A.'s Answer dated Aug. 14, 2018), 195 pgs.
Canon EOS 40D Digital Camera Instruction Manual, located on the Internet at: http://gdlp01.c-wss.com/gds/6/0900008236/01/EOS40D_HG_EN.pdf (attached as Exhibit 6 from the Defendant Wells Fargo Bank, N.A.'s Answer dated Aug. 14, 2018), 38 pgs.
Motorola Razr Maxx V6 User Manual, located on the Internet at: https://www.phonearena.com/phones/Motorola-RAZR-MAXX-V6_id1680, (attached as Exhibit 7 from the Defendant Wells Fargo Bank, N.A.'s Answer dated Aug. 14, 2018), 36 pgs.
Motomanual for Motorazr, located on the Internet at: https://www.cellphones.ca/downloads/phones/manuals/motorola-razr-v3xx-manual.pdf (excerpts attached as Exhibit 8 from the Defendant Wells Fargo Bank, N.A.'s Answer dated Aug. 14, 2018), 34 pgs.
Nokia N95 8GB User Guide, copyright 2009, located on the Internet at: https://www.nokia.com/en_int/phones/sites/default/files/user-guides/Nokia_N95_8GB_Extended_UG_en.pdf (excerpts attached as Exhibit 9 from the Defendant Wells Fargo Bank, N.A.'s Answer dated Aug. 14, 2018), 77 pgs.
Helio Ocean User Manual, located on the Internet at: https://standupwireless.com/wp-content/uploads/2017/04/Manual_PANTECH_OCEAN.pdf (excerpts attached as Exhibit 10 from the Defendant Wells Fargo Bank, N.A.'s Answer dated Aug. 14, 2018), 76 pgs.
HTC Touch Diamond Manual, copyright 2008, (attached as Exhibit 11 from the Defendant Wells Fargo Bank, N.A.'s Answer dated Aug. 14, 2018), 257 pgs.
Automated Clearing Houses (ACHs), Federal Reserve Bank of New York (May 2000) available at: https://www.newyorkfed.org/aboutthefed/fedpoint/fed31.html, (attached as Exhibit 12 from the Defendant Wells Fargo Bank, N.A.'s Answer dated Aug. 14, 2018), 4 pgs.
Pop, Arc and BOC—A Comparison, Federal Reserve Banks, at 1 (Jan. 7, 2009), available on the Internet at: https://web.archive.org/web/20090107101808/https://www.frbservices.org/files/eventseducation/ pdf/pop_arc_boc_comparison.pdf (attached as Exhibit 13 from the Defendant Wells Fargo Bank, N.A.'s Answer dated Aug. 14, 2018), 3 pgs.
David B. Humphrey & Robert Hunt, Getting Rid of Paper: Savings From Check 21, Working Paper No. 12-12, Research Department, Federal Reserve Bank of Philadelphia, (May 2012), available on the Internet at: https://philadelphiafed.org/-/media/research-and-data/

(56) References Cited

OTHER PUBLICATIONS publications/working-papers/2012/wp12-12.pdf, (attached as Exhibit 14 from the Defendant Wells Fargo Bank, N.A.'s Answer dated Aug. 14, 2018), 29 pgs.
Jeffrey M. Lacker, Payment System Disruptions and the Federal Reserve Following Sep. 11, 2001, The Federal Reserve Bank of Richmond, (Dec. 23, 2003) (attached as Exhibit 19 from the Defendant Wells Fargo Bank, N.A.'s Answer dated Aug. 14, 2018), 55 pgs.
Check Clearing for the 21st Century Act Foundation for Check 21 Compliance Training, Federal Financial Institutions Examination Council, (Oct. 16, 2004), available on the Internet at: https://web.archive.org/web/20041016100648/https://www.ffiec.gov/exam/check21/check21foundationdoc.htm, (excerpts attached as Exhibit 20 from the Defendant Wells Fargo Bank, N.A.'s Answer dated Aug. 14, 2018), 11 pgs.
Big Red Book, Adobe Systems Incorporated, copyright 2000, (attached as Exhibit 27 from the Defendant Wells Fargo Bank, N.A.'s Answer dated Aug. 14, 2018), 45 pgs.
Petition filed by Wells Fargo Bank, N.A. for Covered Business Method Review of Claims 1-20 of U.S. Pat. No. 9,818,090, dated Nov. 8, 2018, 90 pgs.
Petition filed by Wells Fargo Bank, N.A. for Covered Business Method Review of Claims 1-20 of U.S. Pat. No. 9,336,517, dated Nov. 8, 2018, 98 pgs.
Petition filed by Wells Fargo Bank, N.A. for Covered Business Method Review of Claims 1-20 of U.S. Pat. No. 8,977,571, dated Nov. 8, 2018, 95 pgs.
Petition filed by Wells Fargo Bank, N.A. for Covered Business Method Review of Claims 1-23 of U.S. Pat. No. 8,699,779, dated Nov. 8, 2018, 101 pgs.
Declaration of Peter Alexander, Ph.D., CBM2019-0004, Nov. 8, 2018, 180 pgs.
"Machine Accepts Bank Deposits", New York Times, Apr. 12, 1961, 1 pg.
Shah, Moore's Law, Continuous Everywhere But Differentiable Nowhere, Feb. 12, 2009, located on the Internet at: http://samishah.com/2009/02/24/morres-law/, 5 pgs.
Rockwell, The Megapixel Myth, KenRickwell.com, 2008, located on the Internet at: http://kewrockwell.com.tech/mpmyth.htm, 6 pgs.
Gates, A History of Wireless Standards, Wi-Fi Back to Basics, Aerohive Blog, Jul. 2015, located on the Internet at: http://blog.aerohive.com/a-history-of-wireless-standards, 5 pgs.
Apple Reinvents the Phone with iPhone, Jan. 2007, located on the Internet at: https:/www.apple.com/newsroom/2007/01/09Apple-Reinvents-the-Phone- with-iPhone/, 4 pgs.
Chen, Brian et al., iPhone 3GS Trounces Predecessors, Rivals in Web Browser Speed Test, Wired, Jun. 24, 2009, located on the Internet at: www.wired.com/2009.3gs-speed/, 10 pgs.
Berman, How Hitchcock Turned a Small Budget Into a Great Triumph, Time.com, Apr. 29, 2015, located on the Internet at: http://time.com/3823112/alfred-hitchcock-shadow-of-a-doubt, 1 pg.
Askey, Leica Digilux 2 Review (pts. 1,3,7), Digital Photography Review, May 20, 2004, located on the Internet at: https://www.dpreview.com/reviews/leicadigilux2, 20 pgs.
Askey, Sony Cyber-shot DSC-R1 Review (pts, 1,3,7), Digital Photography Review, Dec. 6, 2005, located on the Internet at: http://www.dpreview.com.reviews/sonydscr1, 24 pgs.
Askey, Panasonic Lumix DMC-L1 Review (pts. 1,3,7), Digital Photography Review, Apr. 11, 2007, located on the Internet at: https://www.dpreview.com/reviews/panasonicdmc11, 24 pgs.
Askey, Nikon D300 In-depth Review (pts.1,3,9), Digital Photography Review, Mar. 12, 2008, located on the Internet at: https://www.preview.com/reviews/nikond300, 24 pgs.
Askey, Canon Eos 40D Review (pts. 1,4, 10), Digital Photography Review, located on the Internet at:http: www.dpreview.com/reviews/canoneos40d, 24 pgs.
Joinson et al., Olympus E-30 Review (pts. 1,4,8), Digital Photography Review, Mar. 24, 2009, located on the Internet at: www.dpreview.com/reviews/olympus30, 6 pgs.
Quinn and Roberds, The Evolution of the Check as a Means of Payment: A Historical Survey, Federal Reserve Bank of Atlanta, Economic Review, 2008, 30 pgs.
Wausau Financial Systems, Understanding Image Quality & Usability Within a New Environment, 2006, 22 pgs,.
IPhone Store Downloads Top 10 Million in First Weekend, Jul. 14, 2008, located on the Internet at: http://www.apple.com/newsroom/2008/07/14iPhone-App-Stire-Downloads-Top-10_Million-in-First-Weekend, 3 pgs.
Knerr et al., The A2iA Intercheque System: Courtesy Amount and Legal Amount Recognition for French Checks in Automated Bankcheck Processing 43-86, Impedove et al. eds., 1997, 50 pgs.
149 Cong. Rec. H9289, Oct. 8, 2003, 6 pgs.
Check Clearing for the 21st Century Act, H. R. Rep. No. 108-132, Jun. 2, 2003, 20 pgs.
ITU-R-M.1225, Guides for Evaluation of Radio Transmission Technologies for IMT-2000, dated 1997, located on the Internet at: https://www.itu.int/dms-pubrec/itu-r/rec/m/R-REC-M, 1225-0-199702-I !!PDF-E.pdf, 60 pgs.
E. Mackenzie, Photography Made Easy, copyright 1845, 80 pgs.
12 CFR § 229.51 and Appendix D to Part 229 (Jan. 1, 2005 edition), 3 pgs.
Excerpts from American National Standard for Financial Services, ANS, X9.100-140-2004-Specifications for an Image Replacement Document—IRD, Oct. 1, 2004, 16 pgs.
Sumits, Major Mobile Milestones—The Last 15 Years, and the Next Five, Cisco Blogs, Feb. 3, 2016, located on the Internet at: https://blogs.cisco.com/sp/mobile-vni-major-mobile-milesrones-the-last15-years- and-the-next-five, 12 pgs.
Apple Announces the New iPhone 3GS - The Fastest, Most Powerful iPhone Yet, Jun. 8, 2009, located on the Internet at: http://www.apple.com.rensroom/2009/06/08Apple-Annpounces-the-New-iPhone- 3GS-The Fastest-Most-Powerful-iPhone-Yet, 4 pgs.
Motorola, Motomanual, MOTOROKR-E6-GSM-English for wireless phone, copyright 2006, 144 pgs.
Patent Disclaimer for U.S. Pat. No. 8,699,779, filed on Mar. 4, 2019, 2 pgs.
Patent Disclaimer for U.S. Pat. No. 8,977,571, filed on Feb. 20, 2019, 2 pgs.
Patent Disclaimer for U.S. Pat. No. 9,336,517, filed on Mar. 4, 2019, 2 pgs.
Patent Disclaimer for U.S. Pat. No. 9,818,090, filed on Feb. 20, 2019, 2 pgs.
CBM2019-00002 U.S. Pat. No. 9,818,090, United Services Autornobile Association (USAA)'s Patent Owner Preliminary Response, dated Feb. 20, 2019, 75 pgs.
CBM2019-00002 U.S. Pat. No. 9,818,090, Declaration of Tim Crews in Support of Patent Owner Preliminary Response, dated Feb. 20, 2019, 8 pgs.
CBM2019-00002 U.S. Pat. No. 9,818,090, Declaration of Matthew Calman in Support of Patent Owner Preliminary Response, dated Feb. 20, 2019, 14 pgs.
CBM2019-00002 U.S. Pat. No. 9,818,090, Katie Knight Videotape Deposition Transcript, dated Feb. 8, 2019, 27 pgs.
CBM2019-00002 U.S. Pat. No. 9,818,090, Peter Alexander, PhD., Oral and Videotaped Deposition, dated Jan. 23, 2019, 27 pgs.
CBM2019-00002 U.S. Pat. No. 9,818,090, United Services Automobile Association (USAA)'s Updated Exhibit List, dated Mar. 19, 2019,8 pgs.
CBM2019-00003 U.S. Pat. No. 9,336,517, United Services Automobile Association (USAA)'s Patent Owner Preliminary Response, dated Mar. 4, 2019, 91 pgs.
CBM2019-00003 U.S. Pat. No. 8,699,779, Declaration of Matthew Calman in Support of Patent Owner Preliminary Response, dated Mar. 4, 2019, 15 pgs.
CBM2019-00003 U.S. Pat. No. 9,336,517, Katie Knight Videotape Deposition Transcript, dated Feb. 8, 2019, 27 pgs.
CBM2019-00003 U.S. Pat. No. 9,336,517, Peter Alexander, Ph.D., Oral and Videotaped Deposition, dated Jan. 23, 2019, 27 pgs.
CBM2019-00003 U.S. Pat. No. 9,336,517, United Services Automobile Association (USAA)'s Updated Exhibit List Pursuant to 37 CFR 42.63(e), dated Mar. 19, 2019, 8 pgs.

(56) References Cited

OTHER PUBLICATIONS

CBM2019-00003 U.S. Pat. No. 9,336,517, Petitioner's Reply Brief to Patent Owner Preliminary Response Pursuant to Authorization Provided in Paper No. 14, dated Apr. 10, 2019, 10 pgs.
CBM2019-00004 U.S. Pat. No. 8,977,571, Declaration of Tim Crews in Support of Patent Owner Preliminary Response, dated Feb. 20, 2019, 8 pgs.
CBM2019-00004 U.S. Pat. No. 8,977,571, United Services Automobile Association (USAA)'s Patent Owner Preliminary Response, dated Feb. 20, 2019, 99 pgs.
CBM2019-00004 U.S. Pat. No. 8,977,571, Declaration of Matthew Calmam in Support of Patent Owner Preliminary Response, dated Feb. 20, 2019, 14 pgs.
CBM2019-00004 U.S. Pat. No. 8,977,571, United Services Automobile Association (USAA)'s Updated Exhibit List Pursuant to 37 CFR 43.63(e), dated Mar. 19, 2019, 8 pgs.
CBM2019-00005 U.S. Pat. No. 8,699,779, United Services Automobile Association's (USAA)'s Patent Owner Preliminary Response, dated Mar. 4, 2019, 103 pgs.
CBM2019-00005 U.S. Pat. No. 8,699,779, Katie Knight Videotape Deposition Transcript, dated Feb. 8, 2019, 27 pgs.
CBM2019-00005 Patent No. 8,699,779 Matthew A. Calman Declaration, dated Mar. 4, 2019, 15 pgs.
CBM2019-00005 Patent No. 8,699,779 Peter Alexander, Ph.D., Oral and Videotaped Deposition, dated Jan. 23, 2019, 27 pgs.
CBM2019-00027 Patent No. 9,224, 136 Declaration of Peter Alexander, Ph.D., dated Mar. 28, 2019, 147 pgs.
CBM2019-00027 Patent No. 9,224, 136 Petition For Covered Business Method Review of Claims 1-3, 5-9, 11-16 and 18 of US Patent No., 9,224, 136, dated Mar. 28, 2019, 93 pgs.
CBM2019-00027 Patent No. 9,224, 136 Notice of Filing Date Accorded to Petition and Time for Filing Patent Owner Preliminary Response, dated Apr. 8, 2019, 3 pgs.
CBM2019-00028 Patent No. 10,013,681, Plaintiff United Services Automobile Association (USAA) Preliminary Claim Constructions And Extrinsic Evidence, dated Mar. 15, 2019, 74 pgs.
CBM2019-00028 Patent No. 10,013,681, Declaration of Peter Alexander, Ph.D., dated Mar. 28, 2019, 94 pgs.
CBM2019-00028 Patent No. 10,013,681, Petition For Covered Business Method Review of Claims 1-30 of US Patent No., 10,013,681, dated Mar. 28, 2019, 99 pgs.
CBM2019-00028 Patent No. 10,013,681, Petitioner's Updated Exhibit List (as of Apr. 1, 2019) for US Patent No., 10,013,681, dated Apr. 1, 2019, 5 pgs.
CBM2019-00028 Patent No. 10,013,681, Notice of Filing Date Accorded To Petition and Time For Filing Patent owner Preliminary Response for US Patent No., 10,013,681, dated Apr. 8, 2019, 3 pgs.
CBM2019-00029 Patent No. 10,013,605, Declaration of Peter Alexander, Ph.D., dated Mar. 28, 2019, 76 pgs.
CBM2019-00029 Patent No. 10,013,605, Petition For Covered Business Method Review of Claims 1-3, 5-14, 16-29 of US Patent No., 10,013,605, dated Mar. 28, 2019, 88 pgs.
CBM2019-00029 Patent No. 10,013,605, Plaintiff United Services Automobile Association (USAA) Preliminary Claim Constructions And Extrinsic Evidence, dated Mar. 15, 2019, 74 pgs.
IPR2019-00815 Patent No. 9,818,090, Petition For Inter Parties Review of Claims 109 of U.S. Pat. No. 9,818,090, dated Mar. 20, 2019, 56 pgs.
IPR2019-00815 Patent No. 9,818,090, Declaration of Peter Alexander, PhD. as filed in the IPR on Mar. 20, 2019, 99 pgs.
IPR2019-00815 Patent No. 9,818,090, Notice of Filing Date Accorded to Petition and Time for Filing Patent Owner Preliminary Response, dated Mar. 27, 2019, 5 pgs.
IPR2019-00815 Patent No. 9,818,090, Exhibit B Proposed Claim Constructions for the '571, '090, '779 and '517 Patents, filed on Feb. 28, 19, 10 pgs,.
ABA Routing System Transit No., Wikipedia, dated Sep. 27, 2006, 3pgs.
Accredited Standards Committee Technical Report TR 33-2006, dated Aug. 28, 2006, 75 pgs.
Ans X9.100-140-2004, "Specification for an Image Replacement document - IRD", American Standard for Financial Services, Oct. 1, 2004, 15 pgs.
ANSI News, Check 21 Goes Into Effect Oct. 28, 2004, dated Oct. 25, 2004, 1 pg.
ANSI, "Return Reasons for Check Image Exchange of IRDS", dated May 6, 2016, 23 pgs.
ANSI, "Specifications for Electronic Exchange of Check and Image Data", dated Jul. 11, 2006, 230 pgs.
ANSI X9.7-1999(R2007), Bank Check Background and Convenience Amount Field Specification, dated Jul. 11, 2007, 86 pgs.
ASCX9, "Specification for Electronic Exchange of Check and Image Data", date Mar. 31, 2003. 156 pgs.
Bankers' "Hotline,Training Page: Learning the Bank Numbering System", Copyright 2004, 2 pgs.
BrainJar Validation Algorithms, archived on Mar. 16, 2016 from BrainJar.com, 2 pgs.
Canon White Paper, "Two Words Every Business Should Know—Remote Deposit", dated 2005, 7 pgs.
CBR online, "Diebold launches ATM depository technology", Oct. 4, 2007, 5 pgs.
Cheq Information Technology White Paper, "Teller Scanner Performance and Scanner Design: Camera Position Relative to the Feeder", dated 2005, 7 pgs.
De Jesus, Angie et al., "Distributed Check Processing in a Check 21 Environment", dated Nov. 2004, 22 pgs.
Federal Reserve Adoption of DSTU X9.37-2003, Image Cash Letter Customer Documentation Version 1.8, dated Oct. 1, 2008, 48 pgs.
Fielding, R. et al. "RFC-2616—Hypertext Transfer Protocol", Network Working Group, The Internet Society copyright 1999, 177 pgs.
Hill, Simon, "From J-Phone to Lumina 1020: A Complete History of the Camera Phone", dated Aug. 11, 2013, 19 pgs.
Instrument—Definition from the Merriam-Webster Online Dictionary, dated Mar. 2, 2019, 1 pg.
Instrument—Definition of instrument from the Oxford Dictionaries (British & World English), dated Jul. 2, 2017, 44 pgs.
iPhone Application Programming Guide Device Support, dated Apr. 26, 2009, 7 pgs.
iPhone Announces the New Phone 3gs—the Fastest, Most Powerful Phone Yet, Press Release dated Jun. 8, 2009, 4 pgs.
Klein, Robert, Financial Services Technology, "Image Quality and Usability Assurance: Phase 1 Project", dated Jul. 23, 2004, 67 pgs.
Lange, Bill, "Combining Remote Capture and IRD Printing, a Check 21 Strategy for Community and Regional Banks", dated 2005, 25 pgs.
Lee, Jeanne, "Mobile Check Deposits: Pro Tips to Ensure They Go Smoothly", dated Feb. 19, 2016, 6 pgs.
Meara, Bob, "State of Remote Deposit Capture 2015: Mobile is the New Scanner", Dated May 26, 2015, obtained from the Internet at: https://www.celent.com/insights/57842967, 3 pgs.
Meara, Bob, "State of Remote Deposit Capture 2015 Mobile is the New Scanner", dated May 2015, 56 pgs.
Meara, Bob, "USAA's Mobile Remote Deposit Capture", Dated Jun. 26, 2009, 2 pgs.
Mitek's Mobile Deposit Processes More Than Two Billion Checks, $1.5 Trillion in Cumulative Check Value, dated Mar. 18, 2018, 2 pgs.
Mitek, "Video Release—Mitek MiSnap™ Mobile Auto Capture Improves Mobile Deposit® User Experience at Ten Financial Institutions", dated Jul. 15, 2014, 2 pgs.
NCR, Mobile Remote Deposit Capture (RDC), copyright 2011, 8 pgs.
Nokia N90 Review Digital Trends, dated Feb. 11, 2019, obtained from the Internet at https://www.digitaltrends.com/cell-phone-reviews/nokia-n90-review/, 11 pgs.
Nokia N95 8GB User Guide, copyright 2009, (from the Wells Fargo Bank, N.A. IPR2019-00815, filed on Mar. 20, 2019), Part 1 of 3, 67 pgs.
Nokia N95 8GB User Guide, copyright 2009, (from the Wells Fargo Bank, N.A. IPR2019-00815, filed on Mar. 20, 2019), Part 2 of 3, 60gs.

(56) References Cited

OTHER PUBLICATIONS

Nokia N95 8GB User Guide, copyright 2009, (from the Wells Fargo Bank, N.A. IPR2019-00815, filed on Mar. 20, 2019), Part 3 of 3, 53 pgs.
Patel, Kunur, Ad Age, "How Mobile Technology is Changing Banking's Future", dated Sep. 21, 2009, 3 pgs.
Remote Deposit Capture Basic Requirements, dated Aug. 22, 2009, 1 pg.
Remote Deposit Capture.com Scanner Matrix, dated Oct. 21, 2011, 3 pgs.
*Rowles, Tony, USAA*-v. *Wells Fargo* No. 2:16-cv-245-JRGL e-mail correspondence dated Jan. 24, 2019, 2 pgs.
Sechrest, Stuart et al., "Windows XP Performance", Microsoft, dated Jun. 1, 2001, 20 pgs.
Spenser, Harvey, "White Paper Check 21 Controlling, Image Quality at the Point of Capture", dated 2004, 7 pgs.
Timothy R. Crews list of Patents, printed from the United States Patent and Trademark Office on Feb. 13, 2019, 7 pgs.
Van Dyke, Jim, "2017 Mitek Mobile Deposit Benchmark Report", copyright 2017, 50 pgs.
Wausau, "Understanding Image Quality & Usability Within a New Environment", copyright 2019, 1 pg.
Whitney, Steve et al., "A Framework for Exchanging Image Returns", dated Jul. 2001, 129 pgs.
Defendant Wells Fargo Bank, N. A.'s Second Amended Answer, Affirmative Defenses, and Counterclaims to Plaintiff's Amended Complaint, *United Services Automobile Association* v. *Wells Fargo Bank, N.A.*, Civil Action No. 2:18-cv-245, dated Aug. 1, 2019, 72 pgs.
Claim Construction Memorandum Opinion and Order, *United Services Automobile Association* v. *Wells Fargo Bank, N.A.*, Civil Action No. 2:18-cv-366, dated Jul. 29, 2019, 36 pgs.
Wells Fargo's Objections to Magistrate Judge Payne's Claim Construction Memorandum Opinion and Order, *United Services Automobile Association* v. *Wells Fargo Bank, N.A.*, Civil Action No. 2:18-cv-366, dated Aug. 12, 2019, 7 pgs.
USAA's Objections to Magistrate Judge Payne's Claim Construction Memorandum Opinion and Order, *United Services Automobile Association* v. *Wells Fargo Sank, N.A.*, Civil Action No, 2:18-cv-366, dated Aug. 12, 2019, 10 pgs.
IPR2019-00815 U.S. Pat. No, 9,818,090, Petitioner's Reply Brief to Patent Owner Preliminary Response Pursuant to Authorization Provided in Paper No. 13, dated Aug. 1, 2019, 9 pgs.
IPP2019-00815 U.S. Pat. No. 9,818,090, Petitioner's Supplemental Exhibit List, dated Aug. 1, 2019, 5 pgs.
IPR2019-00815 Patent No. 9,818,090, United Services Automobile Association ("USAA")'s Sur-Reply In Support of Patent Owner Preliminary Response, dated Aug. 8, 2019, 8 pgs.
IPR2019-00815 Patent No. 9,818,090, Decision Denying Institution of Inter Parties Review, dated Aug. 26, 2019, 28 pgs.
Mitek Video titled "Mobile Deposit Tour", Published on Jul. 2, 2009 by Mitek Systems, duration 2 minutes and 13 seconds, located on the Internet at: https://www.youtube.com/watch?v=sGD49ybxS2Q, 25 pgs.
Provisional patent application filed by Wells Fargo Bank, dated Jan. 29, 2008, 134 pgs.
SCH0i910 Portable Dualmode Smartphone User Guide by Samsung, Copyright 2009 Samsung Electronics Canada, downloadable from www.manualslib.com, 168 pgs.
U.S. Appl. No. 61/022,279, dated Jan. 18, 2008, (cited in IPR2020-00090, U.S. Pat. No. 9,177,197), 35 pgs.
Herley, Cormac, "Recursive Method To Extract Rectangular Objects From Scans", Microsoft Research, Oct. 2003, 4 pgs.
Panini My Vision X Operator Manual, Panini, 2004, (cited in IPR2020-00093, U.S. Pat. No. 9,892,454), 51 pgs.
Tochip, E. et al., "Camera Phone Color Appearance Utility", Matlab at Stanford University, 2007, 25 pgs.
Yeo, L.H. et al., "Submission of transaction from mobile workstations in a cooperative multidatabase environment", IEEE, 1994, (cited in IPR2020-00097, U.S. Pat. No. 7,885,880), 10 pgs.
CBM2019-00005 U.S. Pat. No. 8,699,779, Patent Owner's Sur-Reply Brief to Petitioner's Reply Brief to Patent Owner Preliminary Response Pursuant to Authorization Provided in Paper No. 15, dated May 1, 2019, 7 pgs.
CBM2019-00004 U.S. Pat. No. 8,977,571, Defendant's Claim Construction Brief, *United Services Automobile Association* v. *Wells Fargo Bank, N.A.*, Civil Action No. 2:18-cv-245, dated Apr. 25, 2019, 36 pgs.
CBM2019-00004 U.S. Pat. No. 8,977,571, Patent Owner's Sur-Reply Brief to Petitioner's Reply Brief to Patent Owner Preliminary Response Pursuant to Authorization Provided in Paper 14, dated Apr. 30, 2019, 7 pgs.
USAA's Reply to Claim Construction Brief, *United Services Automobile Association* v. *Wells Fargo Bank, N.A.*, Civil Action No. 2:18-cv-245, dated May 2, 2019, 15 pgs.
Plaintiff and Counterclaim Defendant's Answer to Defendant and Counterclaims Plaintiff's Amended Answer, Affirmative Defenses, & Counterclaims, *United Services Automobile Association* v. *Wells Fargo Bank, N.A.*, Civil Action No. 2:18-cv-366, dated Apr. 26, 2019, 18 pgs.
USAA's Reply Claim Construction Brief, *United Services Automobile Association* v. *Wells Fargo Bank, N.A.*, Civil Action No. 2:18-cv-245, dated May 2, 2019, 227 pgs.
Parties' P.R. 4-5(D) Joint Claim Construction Chart, *United Services Automobile Association* v. *Wells Fargo Bank, N.A.*, Civil Action No. 2:18-cv-245, dated May 9, 2019, 25 pgs.
CBM2019-00002 U.S. Pat. No. 9,818,090, Decision Denying Institution of Covered Business Method Patent Review 37 C.F.R. § 42.208, dated Apr. 26, 2019, 5 pgs.
CBM2019-00003 U.S. Pat. No. 9,336,517, Decision Denying Institution of Covered Business Method Patent Review 37 C.F.R. § 42.208, dated Jun. 3, 2019, 28 pgs.
CBM2019-00004 U.S. Pat. No. 8,977,571, Decision Denying institution of Covered Business Method Patent Review 37 C.F.R. § 42.208, dated May 15, 2019, 33 pgs.
CBM2019-00005 U.S. Pat. No. 8,699,779, Decision Denying Institution of Covered Business Method Patent Review 37 C.F.R. § 42.208, dated Jun. 3, 2019, 27 pgs.
USAA's Opening Claim Construction Brief, filed in Civil Action No. 2:18-CV-366, dated May 17, 2019, 32 pgs.
Defendant's Claim Construction Brief, filed in Civil Action No. 2:18-CV-366, dated May 31, 2019, 111 pgs.
Plaintiff's Notice of Filing Claim Construction Presentation, filed in Civil Action No. 2:18-CV-245, dated May 23, 2019, 106 pgs.
IPR2019-01081 U.S. Pat. No. 9,336,517, Petition for Inter Partes Review of Ciaims 1, 5-10, 12-14, 17-20 of U.S. Pat. No. 9,336,517, dated Jun. 5, 2019, 78 pgs.
IPR2019-01082 U.S. Pat. No. 8,977,571, Petition for Inter Partes Review of Claims 1-13 U.S. Pat. No. 9,336,517, dated Jun. 5, 2019, 75 pgs.
IPR2019-01083 U.S. Pat. No. 8,699,779, Petition for Inter Partes Review of Claims 1-18 U.S. Pat. No. 9,336,517, dated Jun. 5, 2019, 74 pgs.
Plaintiff's Notice of Decisions Denying Institution of Covered Business Method Patent Review, filed in Civil Action No. 2:18-CV-245, dated Jun. 6, 2019, 61 pgs.
Claim Construction Memorandum Opinion and Order, flied in Civil Action No. 2:18-CV-245, dated Jun. 13, 2019, 48 pgs.
Parties' P.R.4-5(D) Joint Claim Construction Chart, filed in Civil Action No. 2:18-CV-245, dated Jun. 14, 2019, 28 pgs.
Defendant's Claim Construction Brief, filed in Civil Action No. 2:18-CV-366, dated May 31, 2019, 28 pgs.
USAA's Reply Claim Construction Brief, filed in Civil Action No. 2:18-CV-366, dated Jun. 7, 2019, 14 pgs.
Wells Fargo's Objections to Magistrate Judge Payne's Claim Construction Memorandum Opinion and Order, filed in Civil Action No. 2:18-CV-245, dated Jun. 27, 2019, 7 pgs.
USAA's Objections to Magistrate Judge Payne's Claim Construction Memorandum Opinion and Order, filed in Civil Action No. 2:18-CV-245, dated Jun. 27, 2019, 6 pgs.
Parties' P.R. 4-5(D) Joint Claim Construction Chart, filed in Civil Action No. 2:18-CV-366, dated Jun. 18, 2019, 27 pgs.

(56) References Cited

OTHER PUBLICATIONS

IPR2019-00815, Invalidity Chart, uploaded on Jun. 27, 2019, 94 pgs.
IPR2019-00815, United Services Automobile Association ("USAA")'s Patent Owner Preliminary Response, dated Jun. 27, 2019, 66 pgs.
IPR2019-00815, Supplemental Invalidity Chart, dated on Jun. 27, 2019, 16 pgs.
IPR2019-00815, Declaration of Matthew A. Caiman in Support of Patent Owner Preliminary Response, dated Jun. 27, 2019, 25 pgs.
CBM 2019-00027, Declaration of Bharat Prasad, dated Jul. 8, 2019, 32 pgs.
CBM 2019-00027, Patent Owner Preliminary Response and Exhibits 2001-1042, dated Jul. 8, 2019, 91 pgs.
CBM 2019-00028, United Services Automobile Association ("USAA")'s Patent Owner Preliminary Response, dated Jul. 8, 2019, 73 pgs.
CBM2019-00028, Declaration of Matthew A. Caiman in Support of Patent Owner Preliminary Response, dated Jul. 8, 28 pgs.
CBM2019-00028, Malykhina, Elena "Get Smart", Copyright 2006 by ProQuest Information and Learning Company, 6 pgs.
CBM2019-00028, Palm Treo 700W Smartphone manual, Copyright 2005 by Palm, Inc., 96 pgs.
CBM2019-00028, 00000 C720w User Manual for Wndows Mobile Smart Phone, Copyright 2006, 200 pgs.
CBM2019-00028, "Smarter Than Your Average Phone", Copyright 2006 by Factiva, 4 pgs.
CBM2019-00028, "64 Million Smart Phones Shipped Worldwide in 2006", Canalys Newsroom, 2006, 3 pgs.
CBM2019-00028, Nokia 9500 Communicator user Guide, Copyright 2006 by Nokia Corporation, 112 pgs.
CBM2019-00028, Robinson, Daniel, "Client Week—Handsets advance at 3GSM", Copyright 2004 by VNU Business Publications Ltd., 2 pgs.
CBM2019-00028, Burney, Brett "MacBook Pro with Intel processor is fast, innovative", Copyright 2006 by Plain Dealer Publishing Co., 2 pgs.
CBM2019-00028, 17-inch MacBook Pro User=s Guide, Copyright 2006 by App Computer, Inc., 144 pgs.
CBM2019-00028, Wong, May "HP unveils new mobile computers", Copyright 2006 by the Buffalo News, 2 pgs.
CBM2019-00028, Jewell, Mark "Cell Phone Shipments Reach Record 208M", Copyright 2005 by Associated Press, 1 pg.
CBM 2019-00028, Lawler, Ryan "Apple shows Intel-based Macs, surge in revenue", Copyright 2006 by the Yomiuri Shimbun, 2 pgs.
CBM 2019-00028, Aspire 9800 Series User Guide, Copyright 2006 by Acer International, 122 pgs.
CBM 2019-00028, Dell XPS M1210 Owner's Manual, Copyright 2006 by Dell Inc., 192 pgs.
CBM 2019-00028, Estridge, Bonnie "Isyour phone smart enough?: The series that cuts through the technobabble to bring you the best advice on the latest gadgets", Coyright 2006 by Xpress—A1 NSR Media, 3 pgs.
CBM 2019-00028, "Motorola, Palm collaborate on smart phone", Copyright 2000 by Crain Communications, Inc., 1 pg.
CBM 2019-00028, Nasaw, Daniel "Viruses Pose threat to 'Smart'Cellphones—Computer Programs Could Cripple Devices and Shut Down Wireiess Networks", Copyright 2004 by Factiva, 2 pgs.
CBM 2019-00028, Seitz, Patrick "Multifunction Trend Shaking Up the Handheld Device industry, Solid Sales Expected in 2004; FDA, handset, camera—one single, small product can fill a variety of roles", Copyright 2004 Investor's Business Daily, Inc., 3 pgs.
Microsoft Mobile Devices Buyer's Guide, 2002, 4 pgs.
Microsoft Mobile Devices Smartphone, 2003, 2 pgs.
Plaintiff's Notice of Decision Denying Institution of Covered Business Method Patent Review, filed in Civil Action No. 2:18-CV-245, dated May 15, 2019, 36 pgs.
Defendant's Claim Construction Brief, filed in Civil Action No. 2:18-CV-366, dated Jun. 24, 2019, 28 pgs.
CBM2019-00029, United Services Automobile Association (USAA)'s Patent Owner Preliminary Response, dated Jul. 17, 2019, 76 pgs.
CBM2019-00029, Declaration of Matthew A. Calman in Support of Patent Owner Preliminary Response, dated Jul. 17, 2019, 29 pgs.
CBM2019-00029, Defendant's Claim Construction Brief, filed in Civil Action No. 2:18-CV-366, dated May 31, 2019, 28 pgs.
CBM2019-00029, Palenchar, Joseph, "PDA Phone Adds WiFi VoIP, Turn-By-Turn GPS Navigation", Copyright 2006 by Reed Business Information, 2 pgs.
CBM2019-00029, HP User Guide, Additional Product Information, Copyright 2006 by Hewlett-Packard Development Company, L.P., 204 pgs.
CBM2019-00029, Pocket PC User Manual, Version 1, dated May 2006 by Microsoft, 225 pgs.
CBM2019-00029, "Dynamism.com: Take tomorrow's tech home today with Dynamism.com: Latest gadgets merge next generation technology with high style design", Copyright 2006 Normans Media Limited, 2 pgs.
IPR2019-00815, Federal Reserve Financial Services Retired: DSTU X9.37-2003, Specifications for Electronic Exchange of Check and Image Data, Copyright 2006 by Accredited Standards Committee X9, Inc., dated Mar. 31, 2003, 157 pgs.
IPR2019-01081, Declaration of Peter Alexander, Ph.D, dated Jun. 5, 2019, 135 pgs.
USAA's Opening Claim Construction Brief, *United Services Automobile Association* v. *Wells Fargo Bank, N.A.*, Civil Action No. 2.18-cv-245, dated Apr. 11, 2019, 32 pgs.
P.R. 4-3 Joint Claim Construction and Pre-Hearing Statement, *United Services Automobile Association* v. *Wells Fargo Bank, N.A.*, Civil Action No. 2:18-cv-366, dated Apr. 5, 2019, 190 pgs.
Defendant Wells Fargo Bank, N.A.'s Amended Answer, Affirmative Defenses, and Counterclaims to Plaintiff's Complaint, *United Services Automobile Association* v. *Wells Fargo Bank, N.A.*, Civil Action No. 2:18-cv-366, dated Apr. 12, 2019, 32 pgs.
Plaintiff and Counterclaim Defendant's Answer to Defendant and Counterclaims Plaintiff's Amended Answer, Affirmative Defenses, & Counterclaims, *United Services Automobile Association* v. *Wells Fargo Bank, N.A.*, Civil Action No. 2:18-cv-245, dated Mar. 21, 2019, 36 pgs.
Higgins, Ray et al., "Working With Image Cash Letters (ISLs) X937, 180 or 187 files", *All My Papers*, 2009, 36 pgs.
X9.100-180, "The New ICL Standard is Published", *All My Papers*, 2006, 3 pgs.
X9.37 Specifications | X9Ware LLC, dated 2018, 3 pages.
"Getting Started with ICLS aka X9.37 Files", *All MK Pagers*, May 2, 2006, 39 pages.
Federal Reserve Banks Plan Black-and-White Image Standard and Quality Checks, May 2004, 2 pgs.
Caplan, J. et al., Most Influential Gadgets and Gizmos 2002: Sanyo SCP-5300, 2002, 1 pg.
Hill, S., "From J-Phone to Lumina 1020: A complete history of the camera phone", *Digital Trends*, 2020, 9 pgs.
Hoffman, J., "Before there Were Smanghones, There was I-Mode", 1999, 5 pgs.
"Vodafane calls on mobiles to go live!", 2002, 8 pgs.
"Sprint PCS Vision Guide", 2005, 86 pgs.
FDIC—Remote Capture: A Primer, 2009, 3 pgs.
Callaham, J., "The first camera phone was sold 20 years ago, and it's not what you expect", *Android Authority*, 2019, 5 pgs.
Fujisawa, H. et al., "Information Capturing Camera and Developmental Issues", *IEEE Xplore*, downloaded on Aug. 18, 2020, 4 pgs.
Rohs, M. et al., "A Conceptual Framework for Camera Phone-based Interaction Technigues", in Pervasive Computing, Berlin Heidelberg, 2005, pp. 171-189.
Koga, M. et al., Camera-based Kanji OCR for Mobile-phones: Practical Issues, *IEEE*, 2005, 5 pgs.
Parikh, T. "Using Mobile Phones for Secure, Distributed Document Processing in the Developing World", *IEE Persuasive Comguting*, vol. 4, No. 2, 2005, 9 pgs.
Parikh, T., "Mobile Phones and Paper Documents: Evaluating a New Approach for Cagturing Microfinance Data in Rural India", *CHI 2006 Proceedings*, 2006, 10 pgs.

(56) References Cited

OTHER PUBLICATIONS

Magid, L., "A baby girl and the camera phone were born 20 years ago", *Mercum News*, 2017, 3 pgs.
Liang, J. et al., "Camera-based analysis of text and documents: a survey", *IJDAR*, vol. 7, 2005, pp. 84-104, 21, pgs.
Gutierrez, L., "Innovation: From Campus to Staltup", *Business Watch*, 2008, 2 pgs.
Doermann, D. et al., "The function of documents", *Image and Vision Computing*, vol. 16, 1998, pp. 799-814.
Mirmehdi, M. et al., "Towards Optimal Zoom for Automatic Target Recognition", in Proceedings of the Scandinavian Conference on Image Analysis, 1:447-454, 1997, 7 pgs.
Mirmehdi, M. et al., "Extracting Low Resolution Text with an Active Camera for OCR", in Proccedings of the IX Spanish Symposium on Pattern Recognition and Image Processing (pp. 43-48), 2001, 6 pgs.
Zandifar, A. et al., "A Video Based Interface To Textual Information For The Visually Impaired", *IEEE 17th International Symposium on Personal, Indoor and Mobile Radio Communications*, 1-5, 2002, 6 pgs.
Laine, M. et al., "A Standalone OCR System For Mobile Cameraphones", *IEEE*, 2006, 5 pgs.
Federal Reserve Banks to Adopt DSTU X9.37-2003 Format for Check 21 Image Services, 2004, 2 pgs.
Dhandra, B.V. et al., "Skew Detection in Binary Image Documents Based on Image Dilation and Region labeling Approach", *IEEE*, The 18th International Conference on Battern Recognition (ICPR'06), 2006, 4 pgs.
PNC Bankto Offer Ease of Online Deposit Service Integrated with QuickBooks to Small Business, RemoteDepositCapture.com, Jul. 24, 2006, 2 pgs.
Andrew S. Tanenbaum, Modern Ogerating Systems, Second Edition (2001).
Arnold et al, The Java Programming Language, Fourth Edition (2005).
Consumer Assistance & Information—Check 21 https://www.fdic.gov/consumers/assistance/protection/check21.html (FDIC).
Halonen et al., GSM, GPRS, and EDGE Performance: Evolution Towards 3G/UMTS, Second Edition (2003).
Heron, Advanced Encrygtion Standard (AES), 12 Network Security 8 (2009).
Immich et al., Performance Analylsis of Five Interprocess CommunicAtion Mechanisms Across UNIX Operating Systems, 68 J. Syss. & Software 27 (2003).
Leach, et al., A Universally Unique Identifier (UUID) URN Namespace, (Jul. 2005) retrieved from https://www.ietf.org/rfc/rfc4122.txt.
N. Ritter & M. Ruth, The Geo Tiff Data InterchAnge Standard for Raster Geographic Images, 18 Int. J. Remote Sensing 1637 (1997).
Pbmplus—image file format conversion package, retrieved from https://web.archive.org/web/20040202224728/https:/www.acme.com/software/pbmplus/.
Petition filed by PNC Bank N.A. for Inter Partes Review of Claims 1-23 of U.S. Pat. No. 10,482,432, dated Jul. 14, 2021, IPR2021-01071, 106 pages.
Petition filed by PNC Bank N.A. for Inter Partes Review of Claims 1-7, 10-21 and 23 of U.S. Pat. No. 10,482,432, dated Jul. 14, 2021, IPR2021-01074.
Petition filed by PNC Bank N.A. for Inter Partes Review of Claims 1-18 of U.S. Pat. No. 10,621,559, dated Jul. 21, 2021, IPR2021-01076, 111 pages.
Petition filed by PNC Bank N.A. for Inter Partes Review of Claims 1-18 of U.S. Pat. No. 10,621,559, dated Jul. 21, 2021, IPR2021-01077, 100 pages.
Petition filed by PNC Bank N.A. for Inter Partes Review of Claims 1-30 of U.S. Pat. No. 10,013,681, dated Aug. 27, 2021, IPR2021-01381, 127 pages.
Petition filed by PNC Bank N.A. for Inter Partes Review of Claims 1-30 of U.S. Pat. No. 10,013,605, dated Aug. 27, 2021, IPR2021-01399, 113 pages.
Readdle, Why Scanner Pro is Way Better Than Your Camera? (Jun. 27, 2016) retrieved from https://readdle.com/blog/why-scanner-gro-is-way-better-than-your-camera.
Santomero, The Evolution of Payments in the U.S.: Paper vs. Electronic (2005) retrieved from https://web.archive.org/web/20051210185509/https://www.philadelphiafed.org/publicaffairs/sgeeches/2005_santomer09.html.
Schindler, Scanner Pro Review (Dec. 27, 2016) retrieved from https://www.pcmag.com/reviews/scAnner-pro.
Sing Li & Jonathan Knudsen, Beginning J2ME: From Novice to Professional, Third Edition (2005), ISBN (pbk): 1-59059-479-7, 468 pages.
Wang, Ching-Lin et al. "Chinese document image retrieval system based on proportion of black pixel area in a character image", the 6th International Conference on Advanced Communication Technology, 2004, vol. 1, IEEE, 2004.
Zaw, Kyi Pyar and Zin Mar Kyu, "Character Extraction and Recognition for Myanmar Script Signboard Images using Block based Pixel Count and Chain Codes" 2018 IEEE/ACIS 17th International Conference on Computer and Information Science (CS), IEEE, 2018.
Jung et al, "Rectangle Detection based on a Windowed Hough Transform", IEEE Xplore, 2004, 8 pgs.
Craig Vaream, "Image Deposit Solutions" Emerging Solutions for More Efficient Check Processing, Nov. 2005, 16 pages.
Certificate of Accuracy related to Article entitled, "Deposit checks by mobile" on webpage: https://www.elmundo.es/navegante/2005/07/21/empresas/1121957427.html signed by Christian Paul Scrogum (translator) on Sep. 9, 2021.
Fietcher, Lioyd A, and Rangachar Kasturi, "A robust algorithm for text string separation from mixed text/graphics images", IEEE transaction on pattern analysis and machine intelligence 10.6 (1988), 910-918 (1988).
IPR 2022-00076 filed Nov. 17, 2021 on behalf of PNC Bank N.A., 98 pages
IPR 2022-00075 filed Nov. 5, 2021 on behalf of PNC Bank N.A., 90 pages.
IPR 2022-00050 filed Oct. 22, 2021 on behalf of PNC Bank N.A., 126 pages.
IPR 2022-00049 filed Oct. 22, 2021 on behalf of PNC Bank N.A., 70 pages.
*About Network Servers*, GlobalSpec (retrieved from https://web.archive.org/web/20051019130842/http://globalspec.com80/LearnMore/Networking_Communication_Equipment/Networking_Equipment/Network_Servers ("GlobalSpec").
FDIC: Check Clearing forthe 21st Century act (Check21), FED. Deposit Ins. Corp., Apr. 25, 2016 (retrieved from https://web.archive.org/web/20161005124304/https://www.fdic.gov/consumers/assistance/protection/check21.html ("FDIC").
Tiwari, Rajnish et al., "Mobile Banking as Business Strategy", IEEE Xplore, Jul. 2006.
Lyn C. Thomas, "A survey of credit and behavioural scoring: forecasting financial risk of lending to consumers", International Journal of Forecasting, (Risk) (2000).
Non-Final Office Action issued on U.S. Appl. No. 14/293,159 on Aug. 11, 2022.
Non-Final Office Action issued on U.S. Appl. No. 16/455,024 on Sep. 7, 2022.
Non-Final Office Action issued on U.S. Appl. No. 17/071,678 on Sep. 14, 2022.
Non-Final Office Action issued on U.S. Appl. No. 17/180,075 on Oct. 4, 2022.
Non-Final Office Action issue on U.S. Appl. No. 17/511,822 on Sep. 16, 2022.
Non-Final Office Action issued on U.S. Appl. No. 17/568,849 on Oct. 4, 2022.
Yong Gu Ji et al., "A Usability Checklist for the Usability Evaluation of Mobile Phone User Interface", International Journal of Human-Computer Interaction, 20(3), 207-231 (2006).
Printout of news article dated Feb. 13, 2008, announcing a Nokia phone providing audio cues for capturing a document image.
IPR Petition 2022-01593, *Truist Bank* v. *United Services Automobile Association* filed Oct. 11, 2022.

(56) References Cited

OTHER PUBLICATIONS

ANS X9.100-160-1-2004, Part 1: Placement and Location of Magnetic Ink Printing (MICR), American National Standard for Financial Services, approved Oct. 15, 2004.
Clancy, Heather, "Turning cellphones into scanners", The New York Times, Feb. 12, 2005, https://www.nytimes.com/2005/02/12/busienss/worldbusiness/turning-cellphones-into-scanners.html.
Consumer Guide to Check 21 and Substitute Checks, The Federal Reserve Board, The Wayback Machine, Oct. 28, 2004 https://web.archive.org/web/20041102233724/http://www.federalreserve.gov.
Curtin, Denis P., A Short Course in Digital Photography Chapter 7 Graphic File Formats, 1998.
Dance, Christopher, "Mobile Document Imaging", Xerox, Research Centre Europe, XRCE Image Processing Area, Nov. 2004.
Digital Photography Now, Nokia N73 Review, Oct. 28, 2006.
Federal Reserve System, 12 CFR Part 229, Regulation CC: Docket No. R-1176, Availability of Funds and Collection of Checks, Board of Governors of the Federal Reserve System Final rule, Jul. 27, 2004.
Financial Services Policy Committee, Federal Reserve Banks Plan Black-and- White Image Standard and Quality Checks, May 18, 2004.
MICR-Line Issues Associated With The Check 21 Act and the Board's Proposed Rule, Prepared by Federal Reserve Board Staff, Apr. 27, 2004.
Microsoft Computer Dictionary Fifth Edition, Copyright 2002.
HTTP Over TLS, Network Working Group, May 2000, Memo.
Nokia N73—Full phone specifications.
Ranjan, Amit, "Using a Camera with Windows Mobile 5", Jul. 21, 2006.
Reed, John, "FT.com site: Mobile users branch out", ProQuest, Trade Journal, Oct. 6, 2005.
Weiqui Luo et al., "Robust Detection of Region-Duplication Forgery in Digital Image" Guoping Qui, School of Computer Science, University of Nottingham, NG8 1BB, UK, Jan. 2006.
Final Written Decision relating to U.S. Pat. No. 8,699,779, IPR2021-01070, Jan. 19, 2023.
Final Written Decision relating to U.S. Pat. No. 8,977,571, IPR2021-01073, Jan. 19, 2023.
Final Written Decision relating to U.S. Pat. No. 10,621,559, IPR2021-01077, Jan. 20, 2023.
IPR2023-00829 filed Apr. 13, 2023, *Truist Bank* vs. *United Services Automobile Association*, 97 pages.
"Reserve Banks to Adopt DSTU X9.37-2003 Format for Check 21 Image Services," Fed. Reserve Bank of Minneapolis Fin. Serv. Policy Comm., May 18, 2004.
"Camera Phone Shoot-Out", Phone Scoop, Dec. 18, 2002.
Shirai, K. et al., "Removal of Background Patterns and Signatures for Magnetic Ink Character Recognition of Checks," 2012 $10^{th}$ IAPR International Workshop on Document Analysis Systems, Gold Coast, QLD. Australia, 2012, pp. 190-194.
Ding, Y. et al., "Background removal for check processing using morphology in Two-and Three-Dimensional Vision Systems for Inspection, Control, and Metrology". vol. 5606, pp. 19-26, SPIE 2004.
Haskell, B.G. et al, "Image and video coding-emerging standards and beyond," in IEEE Transactions on Circuits and Systems for Video Technology, vol. 8 No. 7, pp. 814-837, Nov. 1998.
Bruno-Britz, Maria "Mitek Launches Mobile Phone Check Capture Solution," Bank Systems and Technolo ies Information Week (Jan. 24, 2008).
V User Guide, https://www.lg.com/us/support/manualsdocuments?customerModelCode=%20LGVX9800&csSalesCode=LGVX9800, select"Verison(USA) en"; The V_UG_051125.pdf.
Ming Phone User Manual, 2006.
Patel, Kunur, "How Mobile Technology is Changing Banking's Future" AdAge, Sep. 21, 2009, 4 pages.
Spencer, Harvey, "Controlling Image Quality at the Point of Capture" Check 21, Digital Check Corporation & HSA 2004.
Moseik, Celeste K., "Customer Adoption of Online Restaurant Services: A Multi-Channel Approach", Order No. 1444649 University of Delaware, 2007, Ann Arbor: ProQuest., Web. Jan. 10, 2022 (Year: 2007).
Henkel, Joseph et al., "Remote Deposit Capture in the Consumer's Hands", Downloaded on Jun. 19, 2010 at 18:46: UTC from IEEE Xplore.
"Image Scanner having Image Quality diagnostics capability with No. operator intervention", an IP.com Prior Art Database Technical Disclosure, Mar. 26, 2003.
A. Adams, N. Felfand, and K. Pulli, "Viewfinder Alignment," Computer Graphics Forum (Eurographics 2008), vol. 27, No. 2, pp. 597-606 (Apr. 2008).
CBM2019-00002, Dismissal and Termination (Apr. 26, 2019).
CBM2019-00002, Petition (Nov. 8, 2018).
CBM2019-00003, Decision Denying Institution (Jun. 3, 2019).
CBM2019-00004, Decision Denying Institution (May 15, 2019).
CBM2019-00005, Decision Denying Institution (Jun. 3, 2019).
CBM2019-00027, Decision Denying Institution (Oct. 1, 2019).
CBM2019-00029, Decision Denying Institution (Oct. 1, 2019).
DCT, *Mitek Systems, Inc.* v. *United Services Automobile Association*, No. 21-1989 (Fed. Cir. 2022) (slip op.).
DCT, *Mitek Systems, Inc.* v. *United Services Automobile Association*, No. 23-1687 (Fed. Cir. 2025) (slip op.).
DCT, *United Services Automobile Association* v. *PNC Bank N.A.*, No. 23-1639 (Fed. Cir. 2025) (slip op.).
DCT, *United Services Automobile Association* v. *PNC Bank N.A.*, No. 23-1778 (Fed. Cir. 2025) (slip op.).
De Jesus et al., Distributed Check Processing in a Check 21 Environment: An educational overview of the opportunities and challenges associated with implementing distributed check imaging and processing solutions, 2004 Panini North America, Nov. 2004 ("Panini").
IPR2019-00815, Decision Denying Institution (Aug. 26, 2019).
IPR2019-01081, Final Written Decision (Jan. 11, 2021).
IPR2019-01082, Final Written Decision (Nov. 24, 2020).
IPR2019-01083, Final Written Decision (Nov. 24, 2021).
IPR2020-00090, Institution Decision (May 11, 2020).
IPR2020-00090, Termination Settlement (Feb. 12, 2021).
IPR2020-00091, Institution Decision (May 11, 2020).
IPR2020-00091, Termination Settlement (Feb. 12, 2021).
IPR2020-00092, Institution Decision (May 11, 2020).
IPR2020-00092, Termination-Settlement (Feb. 12, 2021).
IPR2020-00093, Decision Denying Institution (May 13, 2020).
IPR2020-00094, Decision Denying Institution (May 13, 2020).
IPR2020-00095, Institution Decision (Jun. 2, 2020).
IPR2020-00095, Termination-Settlement (Feb. 12, 2021).
IPR2020-00096, Institution Decision (Jun. 2, 2020).
IPR2020-00096, Termination-Settlement (Feb. 12, 2021).
IPR2020-00097, Institution Decision (Jun. 2, 2020).
IPR2020-00097, Termination-Settlement (Feb. 12, 2021).
IPR2020-00882, Decision Denying Institution (Nov. 6, 2020).
IPR2020-00975, Decision Denying Institution (Nov. 17, 2020).
IPR2020-00976, Decision Denying Institution (Nov. 24, 2000).
IPR2020-01101, Decision Denying Institution (Jan. 26, 2021).
IPR2020-01516, Petition (Aug. 25, 2020).
IPR2020-01516, Termination Settlement Pre-Institution (Feb. 12, 2021).
IPR2020-01650, Decision Denying Institution (Mar. 9, 2021).
IPR2020-01742, Decision Denying Institution (Mar. 22, 2021).
IPR2021-01070, Final Written Decision (Jan. 19, 2023).
IPR2021-01070, *USAA* v. *PNC*, Nos. 2023-2124, 2023-2125 (Fed. Cir. 2025) (slip op.).
IPR2021-01071, Decision Denying Institution (Jan. 20, 2022).
IPR2021-01073, Final Written Decision (Jan. 19, 2023).
IPR2021-01073, *USAA* v. *PNC*, Nos. 2023-2124, 2023-2125 (Fed. Cir. 2025) (slip op.).
IPR2021-01074, Decision Denying Institution (Jan. 20, 2022).
IPR2021-01076, Decision Denying Institution (Jan. 24, 2022).
IPR2021-01077, Final Written Decision (Jan. 20, 2023).
IPR2021-01077, *USAA* v. *PNC*, No. 2023-1920 (Fed. Cir. 2025) (slip op.).
IPR2021-01381, Decision Denying Institution (Mar. 2, 2022).

(56) References Cited

OTHER PUBLICATIONS

IPR2021-01399, Decision Denying Institution (Mar. 7, 2022).
IPR2025-01326, Institution Decision (Feburary 10, 2026).
IPR2025-01326, Termination Settlement (Mar. 25, 2026).
IPR2025-01356, Institution Decision (Feb. 10, 2026).
IPR2025-01356, Termination Settlement (Mar. 25, 2026).
IPR2026-00277, Petition (Feb. 27, 2026).
IPR2026-00279, Petition (Feb. 27, 2026).
IPR2026-00450, Petition (Aug. 7, 2026).
Juergen Gausemeier et al., "Development of a Real Time Image Based Object Recognition Method for Mobile AR-Devices," Procs. of the 2D International Conference On Computer Graphics, Virtual Reality, Visualization and Interaction in Africa 133-39 (Feb. 3, 2003).
Richard Harrison & Mark Shackman, Symbian OS C++ for Mobile Phones, vol. 3, Wiley & Sons (2007).
IPR2022-00049, Decision Denying Institution (Apr. 27, 2022).
IPR2022-00050, Decision Denying Institution (May 11, 2022).
IPR2022-00075, Final Written Decision (Jun. 9, 2023).
IPR2022-00075, *USAA* v. *PNC*, No. 2023-2244 (Fed. Cir. 2025) (slip op.).
Ipr2022-00076, Final Written Decision (May 10, 2023).
IPR2022-00076, *USAA* v. *PNC*, Nos. 2023-2171, 2023-2172 (Fed. Cir. 2025) (slip op.).
IPR2022-01593, Institution Decision (Jun. 14, 2023).
IPR2022-01593, Termination-Settlement (Oct. 11, 2023).
IPR2023-00143, Decision Denying Institution (May 16, 2023).
IPR2023-00144, Decision Denying Institution (May 16, 2023).
IPR2023-00183, Institution Decision (May 18, 2023).
IPR2023-00183, Termination-Settlement (Oct. 13, 2023).
IPR2023-00184, Decision Denying Institution (May 18, 2023).
IPR2023-00829, Petition (Apr. 13, 2023).
IPR2023-00829, Termination Settlement Pre-Institution (Oct. 12, 2023).
IPR2023-01326, Petition (Aug. 16, 2023).
IPR2023-01326, Terminated Settlement Pre-Institution (Oct. 13, 2023).
IPR2025-01326, Petition (Jul. 30, 2025).
IPR2025-01356, Petition (Aug. 5, 2025).
L. H. Yeo & A. Zaslavsky, Submission of Transactions from Mobile Workstations in a Cooperative Multidatabase Processing Environment, 14th International Conference on Distributed Computing Systems, 372-379 (1994).
Patel, Kunur, "How Mobile Technology is Changing Banking's Future", AdAge (Sep. 21, 2009).
Reto Meier, Professional AndroidTM Application Development, Wiley Publishing (Jun. 25, 2008).
Specifications for Electronic Exchange of Check and Image Data, Dstu X9.37 (Mar. 31, 2003).
Stellin, Susan, "Bank Will Allow Customers to Deposit Checks by iPhone", New York Times (Aug. 9, 2009).
Vikram Goyal, Pro Java Me Mmapi: Mobile Media API for Java Micro Edition, Apress (Jun. 14, 2006).
IPR2026-00488, Petition (Sep. 21, 2026) .

* cited by examiner

SYSTEM AND METHOD FOR REMOTE DEPOSIT OF FINANCIAL INSTRUMENTS

CROSS-REFERENCE TO RELATED APPLICATION

This application is a continuation of U.S. application Ser. No. 13/842,112, filed Mar. 15, 2013, pending, which claims the benefit of U.S. Provisional Application No. 61/771,688, filed Mar. 1, 2013, and also claims the benefit of U.S. Provisional Application No. 61/739,596, filed Dec. 19, 2012, wherein the entirety of each of these applications is hereby incorporated herein by reference.

TECHNICAL FIELD

The disclosed embodiments relate to remote deposit of financial instruments. More particularly, the disclosed embodiments relate to remote deposit of financial instruments such as checks using mobile devices.

BACKGROUND

Remote deposit of financial instruments such as checks, where depositors need not physically visit their respective financial institutions, has become a popular service that financial institutions may provide. The advantages to depositors of being able to deposit checks from home can be readily recognized. These advantages are even greater when the remote deposit can be executed outside the home from virtually anywhere using a mobile device.

Problems can arise when utilizing mobile devices for remote deposits because of the difficulties in obtaining accurate images. Systems and methods for assisting in the accuracy and efficiency of the image capture process, along with further features to enhance the user experience, are still needed.

SUMMARY

In order to address the needs for improved remote deposit capabilities when using mobile devices, a system and method for implementing remote deposit is disclosed. According to one aspect a method of remote deposit of financial instruments may include, in a mobile computing device, such as a tablet computer or mobile phone, having a display and a processor in communication with the display, the processor instructing a depositor via the display to hold a camera of the mobile computing device over a check or other financial instrument within visual guides provided on the display. The processor may analyze multiple frames of live video captured by the camera while the user holds the mobile computing device over the check to determine a location of the check. The processor may then automatically capture an image of the check upon determining that the user is holding the mobile computing device at a desired steadiness, when the processor determines that the image is in focus, such as through a manual or autofocus process, or any other method that assists with the capture of a clear or in-focus image. The processor may then transmit the captured image of the check to a financial institution for deposit.

In one implementation, determining if the user is holding the mobile computing device at a desired steadiness may include sampling accelerometer information within the tablet computer over a predetermined period of time while receiving the multiple frames of live video, measuring change in acceleration of the mobile computing device via differences in sampled accelerometer information for each sample, and comparing the measured change to a predetermined steadiness threshold.

Additional features are contemplated, for use with or independently of the above features, such as the processor applying a virtual endorsement to the captured image of the check, in response to receiving user input on the mobile computing device, prior to transmitting the captured image. The virtual endorsement may include associating metadata regarding a depositor signature with the captured image without changing the captured image.

DETAILED DESCRIPTION

Figure 1:
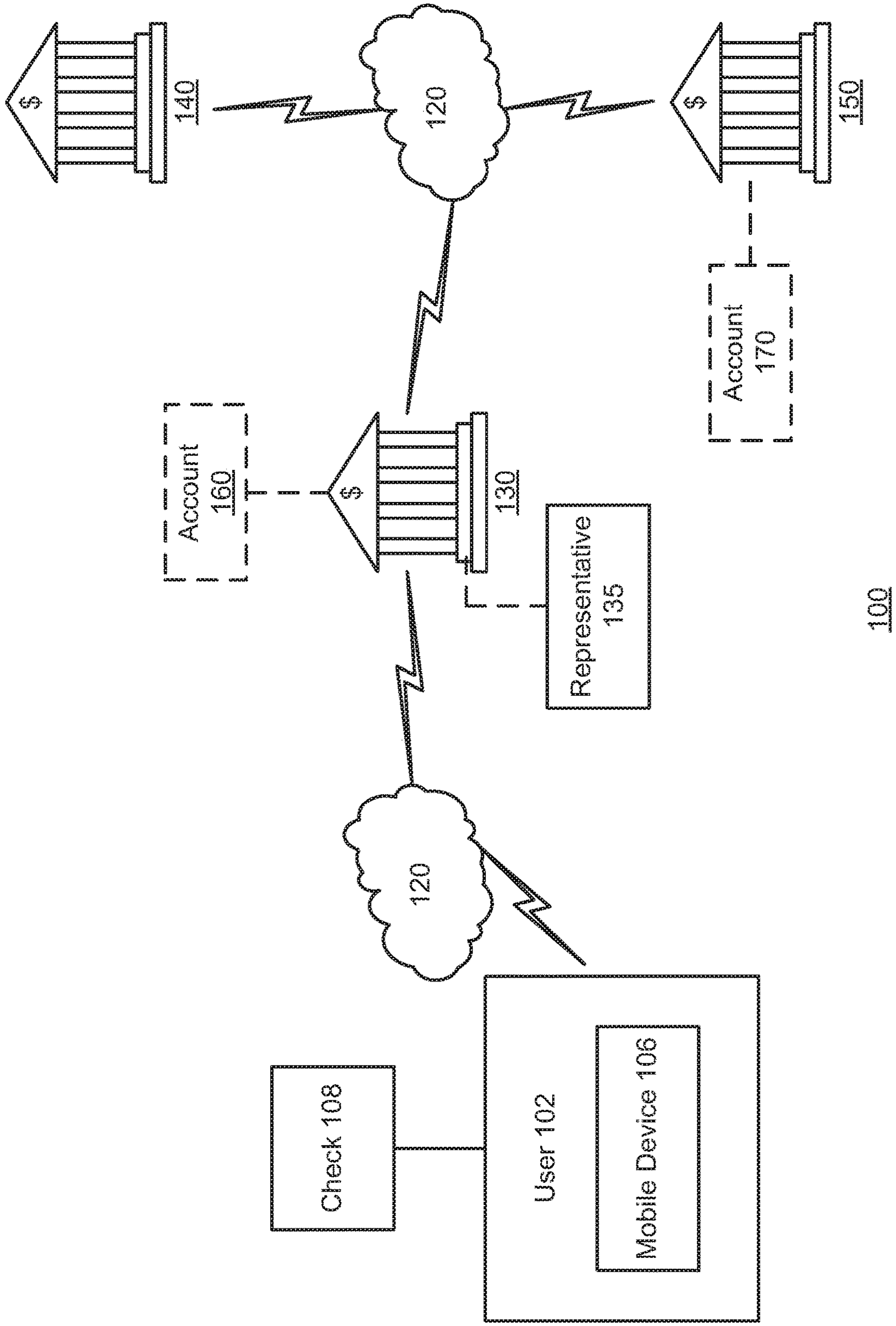
FIG. 1 is a block diagram of an implementation of a system in which example embodiments and aspects may be implemented.

FIG. 1 is a block diagram of an implementation of a system 100 in which example embodiments and aspects may be implemented. System 100 may include an account owner, referred to herein as a user 102, and financial institutions 130, 140, and 150, which may be any type of entity capable of processing a transaction involving a negotiable instrument. For example, financial institutions 130, 140, and 150 may be a retail bank, an investment bank, an investment company, a regional branch of the Federal Reserve, a clearinghouse bank and/or a correspondent bank.

A negotiable instrument typically includes a type of contract that obligates one party to pay a specified sum of money to another party. Negotiable instrument as used herein is an unconditioned writing that promises or orders payment of a fixed amount of money. One example of a negotiable instrument is a check. The check may be presented from a first person to a second person to affect the transfer of money from the first person to the second person. It may also include a check that is presented from a company or business to a person. In either case, the check may be taken by the receiving party and deposited into an account at a financial institution of the receiving party. This has required that the receiving party endorse the check and then present it for deposit at a bank branch. However, recent innovations have taken place that have enabled the receiving party to deposit the funds without visiting the bank branch, such as via automated teller machines (ATM). In addition to a check, negotiable instruments may include a draft, a bill of exchange, a promissory note, and the like.

The user 102 may be an individual who owns account 160 that may be held at financial institution 130. Account 160 may be any type of account for depositing funds, such as a savings account, a checking account, a brokerage account, and the like. The user 102 may communicate with financial institution 130 by way of communications network 120 such as an intranet, the Internet, a local area network (LAN), a wide area network (WAN), a public switched telephone network (PSTN), a cellular network, a voice over Internet protocol (VoIP) network, and the like. The user 102 may communicate with financial institution 130 by phone, email, instant messaging, facsimile, and the like. Financial institutions 130, 140, and 150 also may communicate with each other by way of communications network 120.

In an implementation, the user 102 may receive payment from another individual such as a payor in the form of a check 108 or other negotiable instrument that is drawn from account 170 at financial institution 150. The user 102 may endorse the check 108 (e.g., sign the back of the check 108) and indicate an account number on the check 108 for depositing the funds. It is noted that although examples described herein may refer to a check, the techniques and systems described herein are contemplated for, and may be used for, deposit of any negotiable instrument.

As described further herein, a digital image of a check or other negotiable instrument may be provided from a user to a financial institution, and the digital image may be processed and funds associated with the check or negotiable instrument in the digital image may be deposited in a user's bank account. The user 102 may deposit the check 108 into account 160 by making a digital image of the check 108 and sending the image file containing the digital image to financial institution 130. For example, after endorsing the check 108, the user 102 may use a mobile device 106 that comprises a camera to convert the check 108 into a digital image by taking a picture of the front and/or back of the check 108. The mobile device 106 may be a mobile phone (also known as a wireless phone or a cellular phone), a personal digital assistant (PDA), or any handheld computing device, for example.

In an implementation, the user 102 may send the digital image(s) to financial institution 130 using the mobile device 106. Any technique for sending a digital image to financial institution 130 may be used, such as providing a digital image to a website associated with financial institution 130 from storage, emailing a digital image to financial institution 130, or sending a digital image in a text message or instant message, for example.

Financial institution 130 may receive a digital image representing the check 108 and may use any known image processing software or other application(s) to obtain the relevant data of the check 108 from the digital image. Financial institution 130 may determine whether the financial information associated therewith may be valid. For example, financial institution 130 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may process the financial information and may receive the digital image from the user 102.

The electronic devices may receive the digital image and may perform an initial analysis on the quality of the digital image, the readability of the data contained therein, or the like. For example, the electronic devices may determine whether the account number, amount payable, and the like may be readable such that it may be parsed or otherwise obtained and processed by the financial institution to credit an account 160 associated with the user 102 and debit an account associated with the payor. In an implementation, a representative 135 of financial institution 130 may provide assistance to the user 102 and may provide assistance in determining whether the financial information may be readable and/or of a good enough quality to be processed, as described further herein.

Upon receipt and approval of the digital image, financial institution 130 may credit the funds to account 160. Financial institution 130 may clear the check 108 by presenting a digital image of the check 108 captured from the digital image to an intermediary bank, such as a regional branch of the Federal Reserve, a correspondent bank and/or a clearinghouse bank. For example, the check 108 may be cleared by presenting the digital image to financial institution 140, which may be a regional branch of the Federal Reserve, along with a request for payment. Financial institutions 130 and 150 may have accounts at the regional branch of the Federal Reserve. Financial institution 130 may create a substitute check using the image provided by the user 102 and present the substitute check to financial institution 140 for further processing. Upon receiving the substitute check, financial institution 140 may identify financial institution 150 as the paying bank (e.g., the bank from which the check 108 is drawn). This may be accomplished using a nine-digit routing number located on the bottom left hand corner of the check. A unique routing number is typically assigned to every financial institution in the United States. Financial institution 140 may present the substitute check to financial institution 150 and request that the check be paid. If financial institution 150 verifies the check (i.e., agrees to honor the check), financial institution 140 may then settle the check by debiting funds from financial institution 150 and crediting funds to financial institution 130. Financial institution 150 may then debit funds from account 170.

It will be appreciated that the preceding examples are for purposes of illustration and explanation only, and that an embodiment is not limited to such examples. For example, financial institution 150 may be a correspondent bank (i.e., engaged in a partnership with financial institution 130). Thus, financial institution 130 may bypass the regional branch of the Federal Reserve and clear the check directly with financial institution 150. In addition, account 160 and account 170 may both be held at financial institution 130, in which case the check 108 may be cleared internally.

Figure 2:
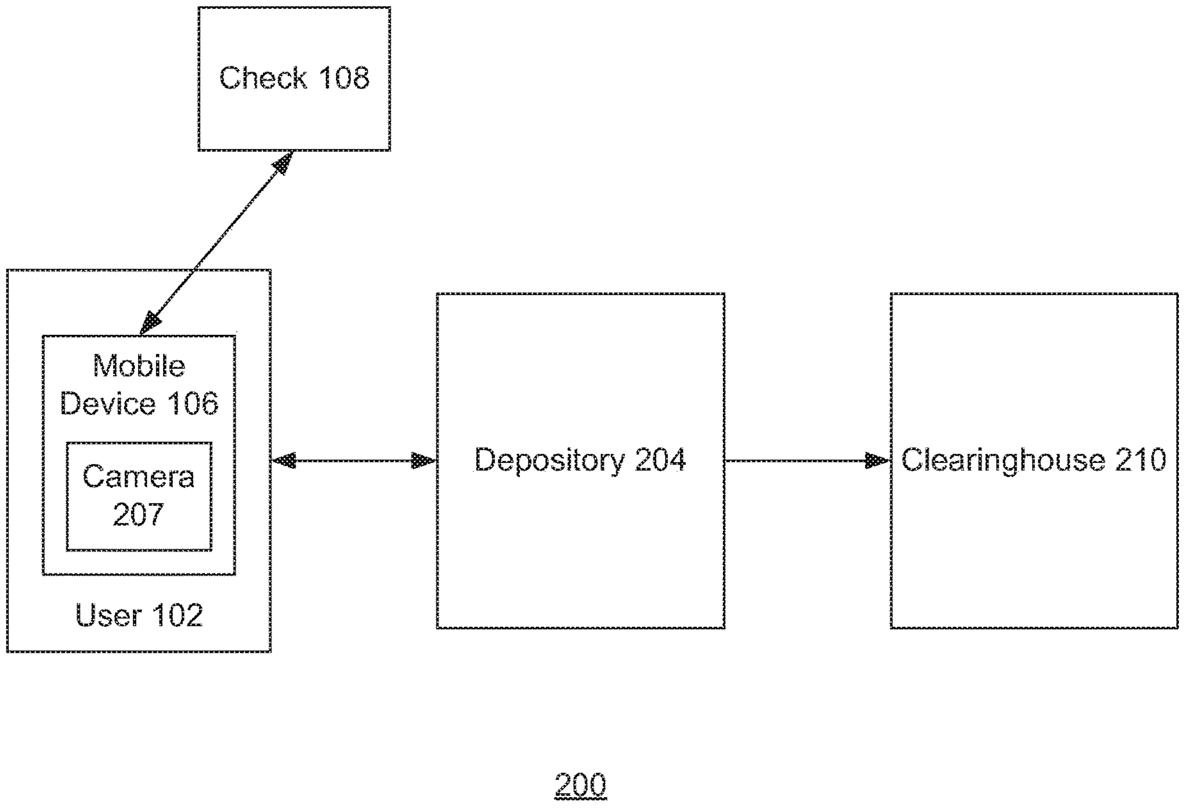
FIG. 2 shows a high-level block diagram of an implementation of a system that may be used for the deposit of a negotiable instrument.

FIG. 2 shows a high-level block diagram of an implementation of a system 200 that may be used for the deposit of a negotiable instrument. As described further herein, the user 102 may deposit the funds of the negotiable instrument using the camera functionality in the mobile device 106. In the example of one person giving a check to another person, this would enable the receiving party to deposit the funds at that time, without physically visiting an ATM or a bank branch.

In an implementation, the system 200 may include the user 102 and a depository 204. The mobile device 106 may comprise a camera 207, such as a digital camera. Such a mobile device may be called a camera phone. The mobile device 106, through the camera 207, has the ability to take or capture a picture or digital image of the check 108 or other negotiable instrument.

In an implementation, the camera 207 may take an image of the front of the check 108. Alternatively, the camera 207 may take an image of both the front and the back of the check 108. The back of the check may provide endorsement verification, such as the signature of the person or party the check is made out to. This may also include stamps, such as checks received at a merchant.

The depository 204 may include a bank in which the user 102 has a deposit account; however, the present disclosure is not limited to just banks. Alternatively, a third party may act as the depository 204 providing functionality to a plurality of users without regard to the bank at which they have deposit accounts, or whether their individual bank allows for the methods and systems described herein.

The depository 204, in an implementation, after receiving the image(s) of the check 108 from the user 102, may use a clearinghouse 210 to perform the check clearing operations. As described with respect to the system 100 of FIG. 1, check clearing operations are used by banks to do the final settlement of the check 108, such as removing funds from the account of the payor and transferring those funds to the user's bank. The user's bank may choose to make the funds available to the user 102 immediately and take on the risk that the check 108 does not clear. However, for various reasons, the bank may only make those funds available to the user 102 after the check 108 finally clears.

Figure 3:
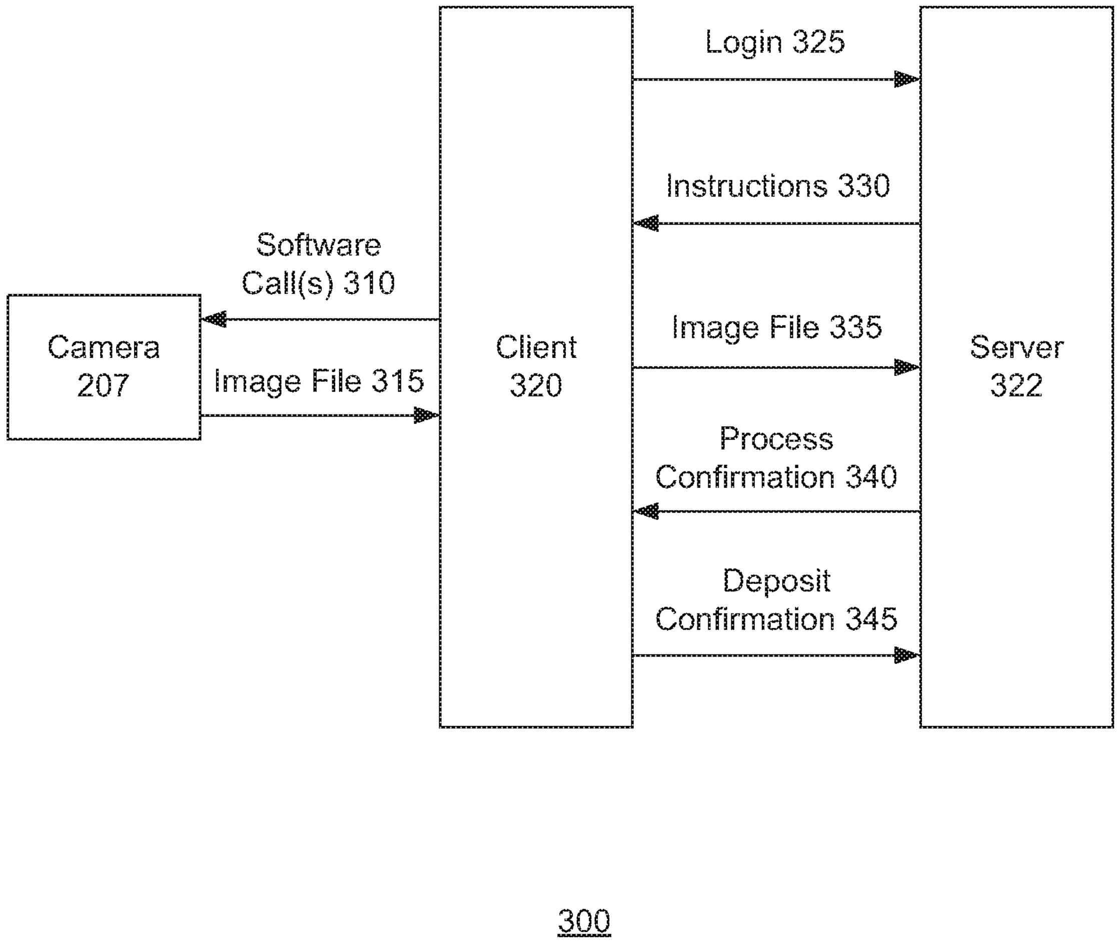
FIG. 3 shows a data-flow diagram of a system for the deposit of a negotiable instrument, in accordance with an example embodiment.

FIG. 3 shows a data-flow diagram of a system 300 for the deposit of a negotiable instrument, in accordance with an example embodiment. In the data-flow diagram of FIG. 3, a client 320 is one example of the mobile device 106 of the user 102 described with respect to the systems 100 and 200 of FIGS. 1 and 2, respectively. In an implementation, a server 322 may be a software component operable by the depository 204 of FIG. 2. The client 320 may log in to a remote deposit system executed on the server 322. The login 325 may serve to authenticate the user 102 as an authorized consumer of the depository 204. The server 322, in one example, may send instructions 330 to the client 320 that execute an application on the client 320. This may include instructions that cause a software object, which may have been previously downloaded and installed on the client 320, to be executed on the client 320.

In another example, the instructions 330 may include a wholly self-contained application that when delivered to the client 320 will execute and perform one or more operations described herein. In either example, the software object may be configured to make one or more software calls 310 to a digital camera, such as the camera 207 associated with the mobile device 106. This may be through specific software instructions to the camera. In other words, the camera's functionality may not be abstracted through any software library. In such an example, software code may be written and delivered to every different camera-equipped mobile phone.

In an alternate example, the software object may operate through a software abstraction layer, such as an application programming interface (API). The software object developer may only insert code into the software object to call one or more APIs exposed by the software operating the mobile device. One example of such software is Windows Mobile by Microsoft Corporation. In the context of a Windows Mobile device, the Windows Mobile operating system (OS) has one or more APIs exposed to application developers that will translate instructions from applications into instructions operable by the camera 207 on the mobile device 106. A mobile operating system, also known as a mobile platform or a handheld operating system, is the operating system that controls a mobile device. Other mobiles OSs include Symbian OS, iPhone OS, Palm OS, BlackBerry OS, and Android.

The software object may cause the camera 207 to take a picture or capture one or more images of the check 108 being deposited. These images may be captured sequentially, e.g., pursuant to the user 102 flipping the check 108 over after an image of the front of the check 108 has been captured. However, each side of the check 108 may be captured by the camera 207 using similar API calls. The images may be stored in an image file 315. Once the images of one or both sides of the check 108 are captured by the camera 207, the image file 315 may be operated on by the software object of the client 320. These operations may include any of the following: deskewing, dewarping, magnetic ink character recognition (MICR), cropping (either automatically, or having the user 102 manually identify the corners and/or edges of the check 108 for example), reducing the resolution of the image, number detection, character recognition, and the like.

With respect to number and character recognition, commercial check scanners have used characteristics of the MICR encoding to detect information about the check, such as the bank's routing number and the account number. However, the characteristics that these scanners have used are the magnetic characteristic of the ink itself and these scanners have used methods similar to those of magnetic audio tape readers. In an implementation, a software object of the client 320 may optically recognize the characters on the MICR line, as a consumer mobile device such as the mobile device 106 will lack the magnetic reading ability of a commercial check scanner.

The image may be also down converted into a grayscale or black and white image, such as either in Joint Photographic Experts Group (JPEG) compliant format or in tabbed image file format (TIFF) for example. In an alternate example, the image may be formatted as a Scalable Vector Graphics (SVG) image. One of the benefits of an SVG file is a large size advantage over JPEG. In the former example, the image at some point before entry into the clearing system may be converted to TIFF format. This may be performed at the mobile device 106, wherein the camera 207 captures the image in TIFF format. However, the camera 207 of the mobile device 106 may capture the image in JPEG format, which may then be converted into TIFF either at the mobile device 106 or at the server 322. In the latter example, this may use the transmission of the TIFF image across a communications network which may be more advantageous as TIFF images are typically smaller in file size for the same size of picture as a JPEG formatted image.

The software object on the client 320 may operate by performing one or more of the operations described herein and then transmitting an image file 335 (e.g., based on image file 315 that has been processed) to the server 322 after the user 102 confirms that they do wish to deposit the check 108. Alternately, the software object may capture the image of the check 108 and transmit that image to the server 322 that in turn may perform those operations, verifies that the image quality is within acceptable thresholds, and communicates that verification back to the client 320, which can then instruct the user 102 to take a picture of the other side of the check 108. In this example, the image transmitted to the server 322 may be in any format, such as JPEG or TIFF, insofar as the server software has the ability to convert that image into a Check 21 compliant format. Alternately, the bank may output an X9.37 file to the clearing system. The Check Clearing for the 21st Century Act (or Check 21 Act) is a United States federal law that allows the recipient of a paper check to create a digital version, thereby eliminating the need for further handling of the physical document. The Check 21 standard for electronic exchange is defined in the standard DSTU X9.37-2003 ("X9.37"). It is a binary interchange format.

The server 322 may confirm (e.g., using a process confirmation 340) with the user 102 the transmission, reception, and processing of each side of the check 108 separately, or may confirm both sides at the same time. On the server side, more operations may be performed, such as signature verification. Where to perform these operations may be determined by the processing power of the mobile device 106 itself, which is typically limited in computational power. However, the present discussion is not limited in any way by discussion of where certain operations are described as operating. The operations of detecting and verifying information may be performed by the client 320 before the information is transmitted along with the image in the image file 335 to the server 322. Alternately, the software object operating on the mobile device 106 may perform no operation other then capturing images of the front and back of the check 108, receiving confirmation that the user 102 wishes to proceed, and transmitting those images to the server 322, wherein the server 322 performs those operations.

In an implementation, after the image file 335 has been received by the server 322, the server 322 may send a process confirmation 340 to the client 320. The process confirmation 340 may request instructions from the client 320 to continue proceeding with the deposit now that the server 322 has received the image file 335. In response, the client 320 may send a deposit confirmation 345 to the server 322, instructing the server 322 to process the deposit of the check based on the image file 335 that had been received by the server 322.

Figure 4:
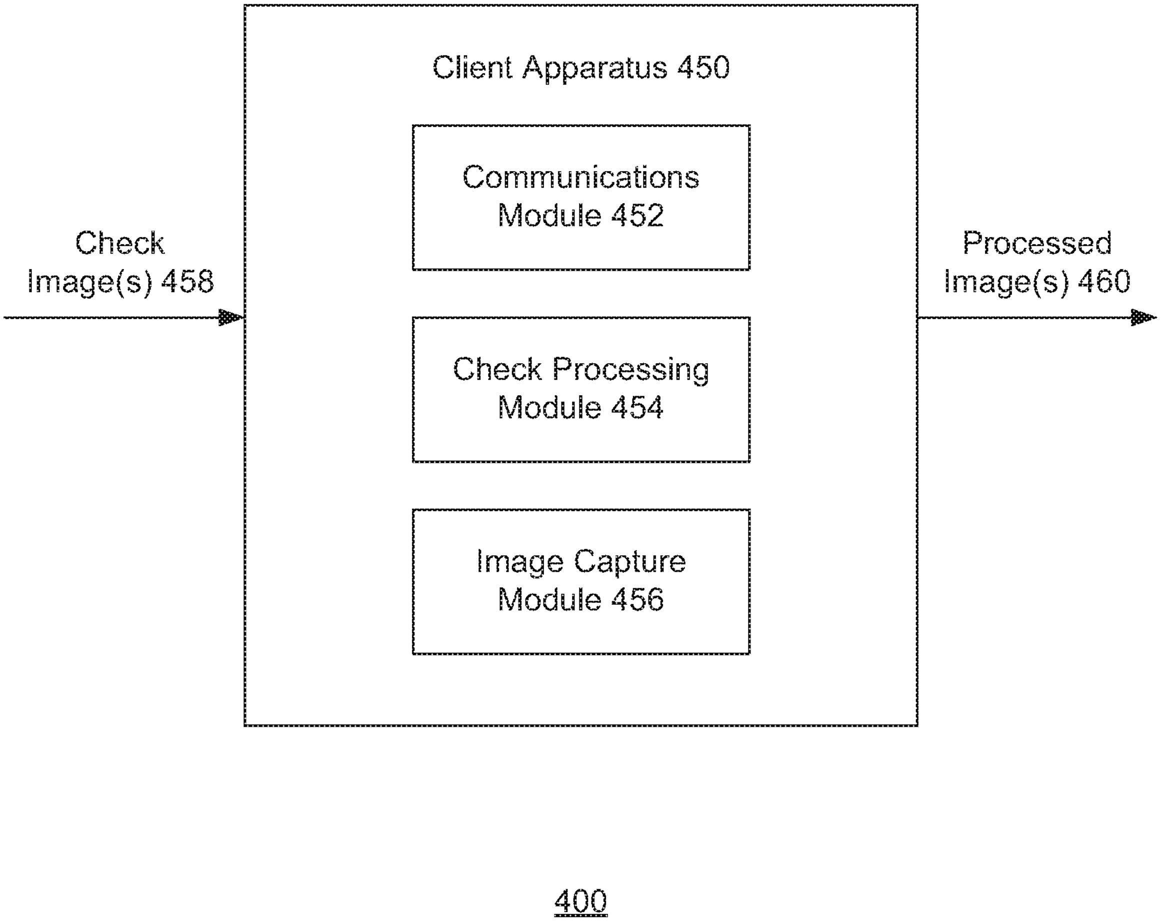
FIG. 4 shows a block diagram of a client apparatus for the deposit of a negotiable instrument, in accordance with an example embodiment.

FIG. 4 shows a block diagram of a client apparatus 450 for the deposit of a negotiable instrument, in accordance with an example embodiment. The client apparatus 450 may include one or more software objects operating on a mobile device 106, such as described above. The client apparatus 450 may include a communications module 452, a check processing module 454, and an image capture module 456. The client apparatus 450 may receive, in one example, one or more check images 458 as an input and output one or more processed images 460.

In an implementation, the check images 458 may be received following a software call from the check processing module 454 to the image capture module 456. In such an implementation, the image capture module 456 may include the camera 207 contained within the mobile device 106. Alternately, the camera 207 may be detachably coupled to the mobile device 106 such as through a secure digital (SD) slot or over any suitable communications bus, such as USB (universal serial bus).

Figure 5:
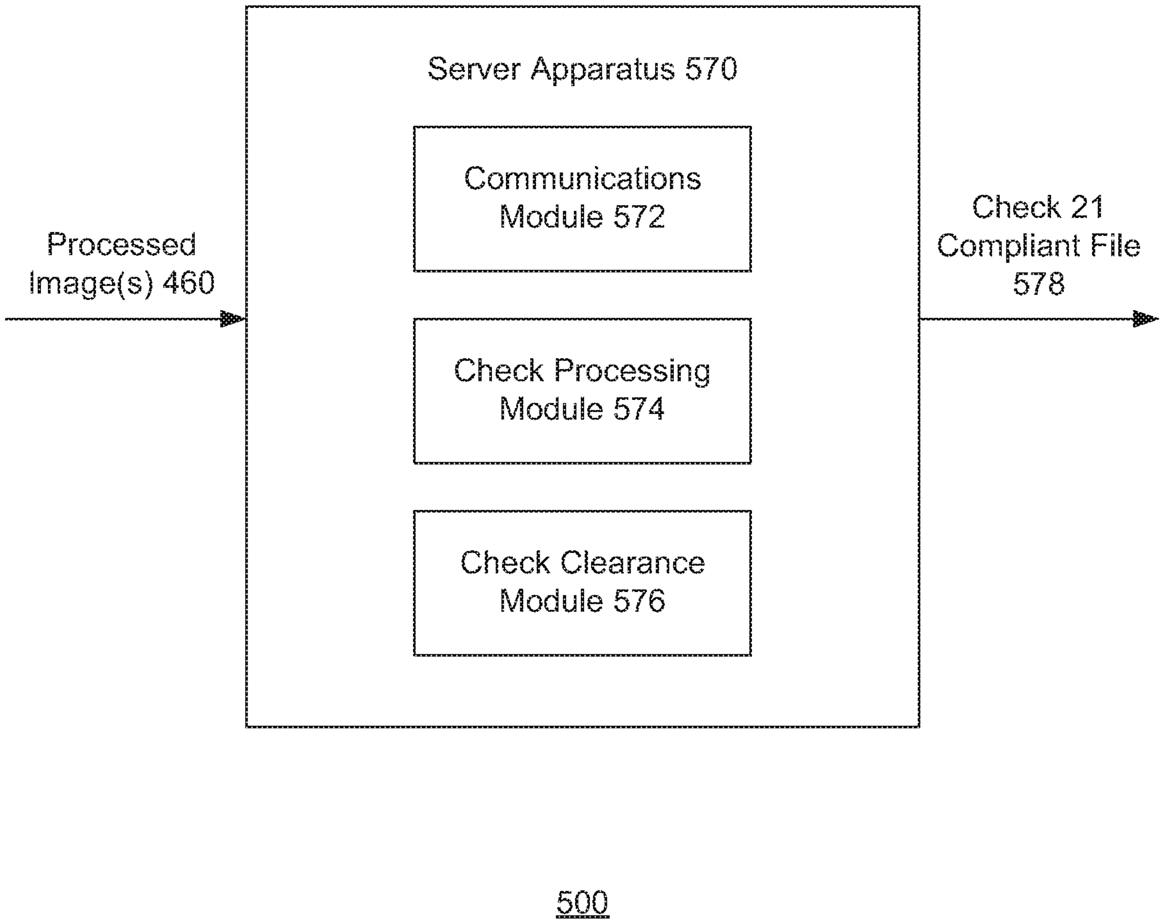
FIG. 5 shows a block diagram of a server apparatus for the deposit of a negotiable instrument, in accordance with an example embodiment.

In an implementation, the image capture module 456 may retrieve previously captured and stored image files (e.g., in local, remote, or removable storage associated with the client apparatus 450) and send the image files to a financial institution (e.g., financial institution 130, the server 322, the server apparatus 570 of FIG. 5, etc.) for processing.

In an implementation, the client apparatus 450 may comprise a browser such as a web browser, for accessing a website on the Internet or other network associated with a financial institution. The user may access the website and select a "capture image" link or similar icon, button or link, for example, displayed on the browser. Such a selection may call the image capture module 456 on the client apparatus 450.

The communications module 452 may be configured, in one example, to receive and send data signals over a suitable communications network. This may include, without limitation, GSM/GPR3, HSDPA, CDMA, TDMA, 802.11, 802.16 and the like. While the bandwidth available to the mobile device 106 may be an implementation concern such discussion is outside the scope of the present discussion and any suitable wireless communications network is considered to be within the scope of the present discussion. With respect to the present discussion, the communications module 452 may receive one or more processed check images 460 from the check processing module 454 and may transmit them over the suitable communications network to the depository 204, as described herein.

The check processing module 454 may be configured, in one example, to cause the image capture module 456 to capture a digital image of at least one side of a check. The check processing module 454 may then perform one or more cleaning operations on the image of the check. These cleaning operations, at a high level, are intended to ensure that the image of the check is suitable for one or more processing tasks. For instance, if the check is rotated 45 degrees clockwise when captured, the check processing module 454 or a software object operated on the server 322 described above may be unable to optically detect information on the check. In this example, the check processing module 454 may deskew the image such that the image was no longer rotated.

Another aspect of an image that may be cleaned is a warping of the image. Warping, as used herein, is meant to denote that the check is tilted forward or back with respect to a plane that is perpendicular to a line drawn from the camera lens to the center of the check. Warping, or tilling, of the image may also lead to incorrect optical detection of the check. In an implementation, the check processing module 454 may dewarp the check image such that, in a three-dimensional space, the check would appear to be perpendicular to an imaginary line drawn from the center of the camera lens to the center of the check itself.

The check processing module 454, in further examples, may perform one or more other cleaning or processing operations. This may include down-converting the image received from the image capture module to a suitable size, such as 200 dots per inch (DPI) resolution or in a resolution range such as 200 DPI to 400 DPI, 300 DPI to 500 DPI, etc., and/or converting the image to grayscale or black and white. Such operation(s) may reduce the file size of the check image.

Alternatively, the check processing module 454 may send instructions to the image capture module 456 to cause the image capture module 456 to capture an image of the check at a suitable resolution. The check processing module 454 may additionally perform any of the following operations, in further examples: convert from JPEG to TIFF, detect check information, perform signature detection on the image of the check, and the like. The check processing module 454 may, alternatively, send the captured check image to the server described herein for such processing, and receive confirmation that the operations were completed before further operations can proceed.

One of the issues with check processing is to detect the presence of a check against whatever background is present. While a user may be instructed to place the check on a dark or black background, such instructions may not provide a positive user experience. Alternatively or additionally, edge detection may be used to detect the check. Edge detection techniques have been described in other articles and any suitable method may be used herein. Alternative or additional methodology for check detection may use tile-cropping to detect and process the check.

As discussed above, the size of the file sent between the mobile device and the server may be small. This runs counter with respect to automatic check detection against a background. If captured in color, the contrast between check and background becomes easier. However, the processed image sent over the communications network may need to be smaller, and if the detection operation is performed by the server, it may be advantageous to convert the captured image to grayscale, or even black and white, before transmission to the server. Grayscale images are compliant with the Check 21 Act.

While "flat" is a fairly well known term to users, each user's appreciation of flat with respect to the camera lens of the camera 207 associated with the mobile device 106 may result in a problem with needing to align the check image programmatically or risk rejecting a large number of check images. As the image captured is a set of pixels, a tilted image will result in a jagged polygon rather than a perfect rectangle. Using convex hull algorithms, the check processing modules may create a smooth polygon around the boundary and remove the concavity of the check image. Alternatively, a rotating calipers algorithm may be used to determine the tightest fitting rectangle around the check boundary, which can then be used to determine the angle of it, with that angle being used to align the check properly.

The operator of the camera 207 may introduce distortions in the image due to a perspective problem, specifically an angling of the camera vertically over the check, and the top of the check is smaller than the bottom, or the reverse. A warping transformation algorithm (e.g., which may be exposed as a software call within Java advanced imaging) may be used to remove this distortion.

If user involvement is tolerated, the user may be queried to supply or identify three of the four corners of the check. In such an operation, the fourth corner may be derived, showing the perimeter of the check. This may allow a software object described herein to use less computational resources in processing the image of the check.

FIG. 5 shows a block diagram of a server apparatus 570 for the deposit of a negotiable instrument, in accordance with an example embodiment. The server apparatus 570 may include one or more software objects operating on a server operated by the depository 204 described above with respect to FIG. 2. The server apparatus 570 may include a communications module 572, a check processing module 574, and a check clearance module 576. The server apparatus 570 may receive one or more processed images 460 from a mobile device 106 or a client apparatus 450 as an input and may output a file such as a Check 21 compliant file 578. The Check 21 compliant file 578 may be a file or entry in a record set that is compliant with the clearinghouse rules set forth in the Check 21 Act and may include outputling an X9.37 file, in one example.

The communications module 572 may be configured to receive a wireless communication from the mobile device 106 over any suitable communications network, such as those described above. The communications module 572 may additionally receive a communication over a different communications network than the mobile device 106 communicated on, such as receiving the communication over a TCP/IP (Transmission Control Protocol/Internet Protocol) connection from the user's communication provider.

The check processing module 574 may be configured, in one example, to perform one or more check processing operations on the processed image(s) 460 that are received. In an implementation, these operations may include any of the operations described herein with respect to the check processing module 454 of FIG. 4. The operation of signature verification may be performed by the check processing module 574 of the server apparatus 570 as the server apparatus 570 may interface with other systems of the depository 204 that may maintain previously verified signature samples of the user 102. Performing signature verification at the client apparatus 450 may be computationally unfeasible; additionally, there may be a security risk if the signature sample is stored on the user's own device.

A cropped grayscale image may be sent to the server apparatus 570. The server apparatus 570 may perform further processing to remove distortion such as warping. The server apparatus 570 may extract information via a TIFF conversion and determine the DPI and re-scale to the proper DPI (e.g., convert to TIFF and detect the DPI that was used in the grayscale image). In an implementation, DPI detection may run on the client apparatus 450.

The check clearance module 576 may be configured, in one example, to receive a file from the check processing module 574 and may communicate with a check clearinghouse such that a Check 21 compliant file may be delivered to the check clearinghouse and funds may be received by the depository 204. The availability of the funds to the user 102 may be delayed by this operation such that the user 102 only has access to those funds when the depository 204 receives confirmation that the check has cleared.

Figure 6:
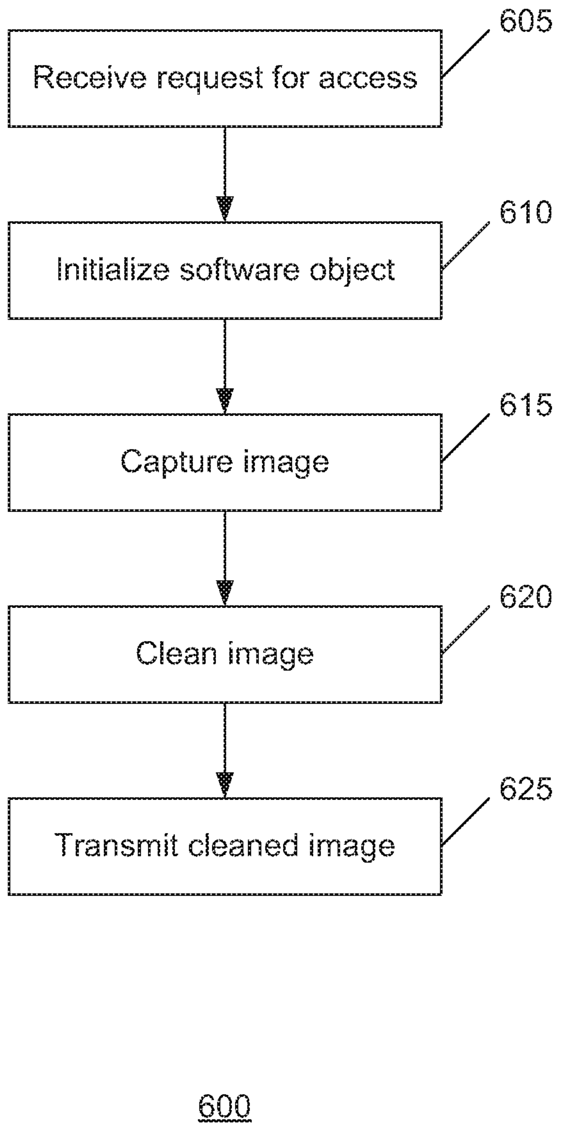
FIG. 6 is an operational flow of an implementation of a method that may be used for deposit of a negotiable instrument.

FIG. 6 is an operational flow of an implementation of a method 600 that may be used for deposit of a negotiable instrument. At 605, a request for access may be received from a user. The user may request access to a deposit system operated by a depository as described above by way of a mobile device, such a cellular phone, a PDA, a handheld computing device, etc. operated by the user. The access may be through some sort of user login, in some examples. The deposit system may be configured to receive a deposit of a negotiable instrument, such as a check, money order, cashier's check, etc. from the user and clear the negotiable instrument in a suitable clearinghouse system.

At 610, the system may initialize a software object on the mobile device. This may include sending instructions to the mobile device intended to execute a previously installed software object. Alternatively, the system may send a software object to the mobile device that may execute the software object, carry out operations described herein by use of the software object, and terminate the software object. In an implementation, the system may instruct a camera associated with the mobile device to capture an image of the negotiable instrument.

At 615, an image of the check may be captured. This may be accomplished through the software object accessing a camera associated with the mobile device (e.g., either comprised within the mobile device or separate from the mobile device). This may be done through an API exposed by the OS of the mobile device, or may be through software code customized for a specific phone and specific camera. With respect to the former, a developer of the software object may write code to the camera API(s), which may be specific to the OS and without regard to the camera on the device.

At 620, the image may be cleaned. Cleaning may include converting the image from JPEG format to TIFF format. Other cleaning operations are described herein. Cleaning operations may also be augmented by detecting operations. The operations at 620 may be carried out on the mobile device, in an implementation, though may include sending the image to the server apparatus, which may perform one or more cleaning operations and when complete may send a notification back to the mobile device of the completion. In either instance, the image may be deskewed, dewarped, and cropped for example, at block 620. Additionally, detection operations may be performed, e.g. after the cleaning operations are performed. The detection operations may include any of the following: optically read the MICR line, courtesy amount recognition (CAR), legal amount recognition (LAR), signature block, and payee. As discussed above, the detecting operations may be performed by the client, the server, or some combination thereof.

At 625, the cleaned image may be transmitted to the depository. This may include transmitting the cleaned image alone to the depository, but may also include transmitting the detected information on the check to the depository.

Figure 7:
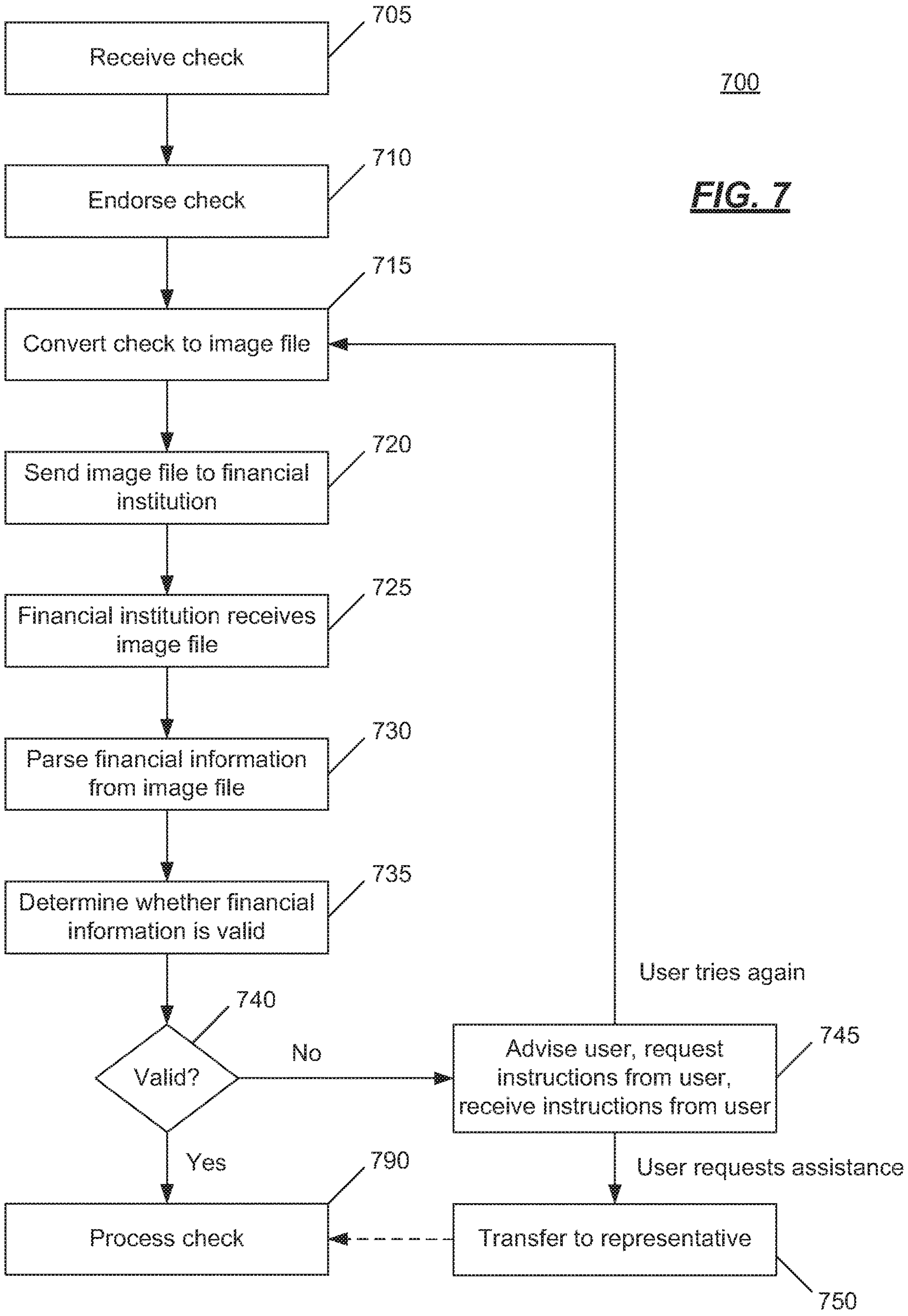
FIG. 7 is an operational flow of another implementation of a method that may be used for deposit of a negotiable instrument.

FIG. 7 is an operational flow of another implementation of a method 700 that may be used for deposit of a negotiable instrument. At 705, a user (e.g., an account owner, payee, etc.) may receive a check from a third party (i.e., a payor). At 710, the user may endorse the check by signing the back of the check in the designated field. If the user wishes to deposit the check into an account, such as a savings and/or checking account, they also may write an account number below the signature.

At 715, the user may convert the check into an image file that comprises electronic data representing an image of the check. For example, the user may create an image file comprising an image of the first side of the check, the second side of the check, or both. In an implementation, the image file may be created using a digital camera. The digital camera may be comprised within mobile device or may be separate from the mobile device and detachably connectable to the mobile device.

At 720, the user may transmit the image file to a financial institution, such as a bank, that may be associated with an account for depositing lunds. For example, the user may send the image file of the check to the financial institution by attaching the image file to an email. Alternatively, the image file may be sent using various means, including, but not limited to, an Internet connection via a website of the financial institution or a wireless cellular transmission. In an implementation, the image file may be sent to the financial institution via streaming.

Additionally, the image file may be augmented by secondary data, which may be information relating to the check, such as an account number, a deposit amount, or a routing number associated with the check, and/or relating to the account for depositing funds, such as the account number and/or the name on the account. The account number may appear on the check itself, below the signature endorsing the check. The account number and/or name on the account also may appear in an email, either with or without the image file, for example. The user may send the image file and the secondary data to the financial institution, using any technique, along with a request to deposit the check into a particular user account.

At 725, the financial institution may receive the image file pertaining to the check along with financial information pertaining to the account for depositing funds and any secondary data. In an implementation, the financial institution may determine that there are multiple user accounts in which to deposit the check. The accounts may be the same type of account, such as a checking account, or different types of accounts, such as checking, savings, or investment accounts. The user may make a selection among a list of accounts in which to deposit the check. The selection may be transmitted to the financial institution, which may process the deposit request according to the image file, the secondary data, and the selected account.

At 730, the financial institution may open the image file and parse financial information from the image file. The image file may be processed using any known technology to retrieve financial information regarding the check. Example technologies that may be used by the financial institution may include image editing, filtering to remove imagery except the check in the received image, image sharpening, and technologies to distinguish between the front and the back sides of the check.

At 735, after retrieving the financial information from the check in an electronic data representation form, the financial institution may determine whether the financial information such as the amount payable to the user, the account associated with the user to deposit funds, an account associated with a payor to debit funds, and a financial institution associated with the payor and/or the user may be valid. For example, the financial institution may include electronic devices such as computers, servers, databases, or the like that may be in communication with each other. The electronic devices may receive an electronic data representation and may perform an initial analysis on the quality of the data representation, the readability of the data representation, or the like. For example, the electronic devices may determine whether the account number, amount payable, or the like may be readable such that they may be parsed and processed by the financial institution to credit an account associated with the user and debit an account associated with the payor.

At 740, if the financial information is determined to be valid, the electronic data representation may be processed by the financial institution at 790, thereby depositing the check in the user's account. If the financial information is determined to be invalid at 740, then the user may be advised at 745. For example, the financial institution may transmit an email, a web message, an instant message, or the like to the user indicating that the financial information associated with the electronic data representation may be invalid. The user may determine how to proceed by selecting an option on the web message, replying to the email, or the like.

Thus, in an implementation, instructions on how the user would like to proceed may be requested from the user, such as whether the user would like to try the image deposit again (e.g., make another image file using the camera and send it to the financial institution) or whether the user would like assistance from a representative, for example. The user may indicate how they would like to proceed. If the user would like to try the image deposit again, processing may continue at 715 in an implementation.

If the user would like assistance, the financial information may be transferred to a representative for further review at 750. The representative, such as a customer service representative, a bank teller who may be located at a branch, a virtual bank teller who may be located remotely via an electronic device, or the like, may review the financial information associated with the electronic data representation to determine whether to allow the electronic data representation to be processed by the financial institution. For example, the initial analysis may require a certain quality requirement, a certain readability requirement, or the like, thus, leading to a high failure rate even though the electronic data representation may otherwise be valid. Thus, the representative may review the electronic data representation to determine whether the financial information may be readable and/or of a good enough quality to be processed. If so, the electronic data representation of the financial information may be processed by the financial institution at 790, thereby depositing the check in the user's account.

The user may receive a notice via email, facsimile, instant message, or mail, for example, that the check has been deposited into the selected account. In an implementation, if the check is not successfully deposited by image deposit, the financial institution may provide additional options to the user on how to redeem the check, such as mailing the check to the financial institution or the like.

In an implementation, the financial institution may receive a decision from a representative on whether to credit the funds to an account. For example, a representative such as a virtual or remote teller may make a decision such as to approve or deny processing of the electronic data representation. According to an embodiment, a virtual teller may fill in the invalid financial information. For example, the virtual teller may issue a decision to approve the electronic data representation and may fill in the financial information deemed invalid from the initial analysis based upon inspection or review by the teller. The financial institution may then receive the invalid information from the virtual bank teller such that the electronic data representation may be processed.

In an implementation, at 790, the financial institution may process the electronic data representation of the check. For example, the financial institution may credit the funds to an account associated with the individual if, based on the decision received from the representative, the financial information may be approved. Additionally, the financial institution may credit the funds to an account associated with the user if, based on the determination, the financial information may be valid. The credit may be a provisional credit, enabling the user to access the funds while the check is being cleared. A provisional credit may be voided if the bank determines that the transaction is erroneous and/or fraudulent. Additionally, to credit funds to the account, the bank may generate an Automated Clearinghouse (ACH) debit entry, substitute check, and/or electronic image. ACH transactions typically include payment instructions to debit and/or credit an account. Banks often employ ACH service providers to settle ACH transactions. Examples of ACH service providers include regional branches of the Federal Reserve and the Electronic Payments Network (EPN).

The ACH service provider may process the debit entry by identifying the account and bank from which the check may be drawn. The bank from which the check is drawn (i.e., the payor's bank) may be referred to as a receiving depository financial institution. If the payor's bank verifies the transaction, the ACH service provider may settle the transaction by debiting the payor's bank and crediting the user's bank. The payor's bank may then debit the payor's account.

Accordingly, a user, without regard to physical location, may access a system described herein, take images of a check, deposit that check into their account and have the funds immediately available (depending on the depository's clearance policies). The user would not have to wait for the mail to pick up their check, the check to get to the bank, the bank to deposit the check, and then have the funds available. The implementations described herein may be limited by the risk tolerance of the depository. If the depository is concerned with fraudulent presentment of the checks through these systems, they may restrict access to particular level of user, such as an "elite" level user. Though the term check has been used as representative of a negotiable instrument, the present discussion is not limited to checks and encompasses any negotiable instrument that a user may present to a depository.

Figure 8A:
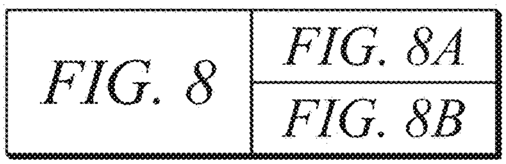
FIGS. 8A-B are a block diagram of an alternative remote deposit architecture utilizing a mobile tablet computing device.

Utilizing some or all of the remote deposit processes and algorithms of the system noted above, additional features and enhancements of the remote deposit process using mobile user devices are contemplated. For example, as illustrated in FIGS. 8A-B, an alternative system and process for capturing an image using a mobile user device is illustrated. The user device 802 may be a tablet computer, such as an iPad tablet available from Apple Inc. The tablet computer 802 may be operated by a user to sequentially capture multiple checks 804 from a location remote from the financial institution for the user. In one implementation, the user may take the tablet computer 802 and initialize a remote capture application executable on the computer for managing the information capture steps necessary to deposit the financial instrument. Upon initializing the application on the tablet computer 802, the user may then be instructed via the display 806 of the tablet computer 802 to position a camera lens integrated in tablet computer 802 over the first of any checks 804 the user wishes to deposit.

A visual guide, in the form of a box, outline, partial corners, or other visual guide on the display 806, may be presented to the user and the user instructed to hover the tablet computer camera over the first of the checks 804. Additionally, the application initiated on the tablet computer 802 will utilize a video camera function of the tablet computer to first locate the document that the user is hovering the tablet computer over as part of a hover capture routine 808. While the camera lens of the tablet computer 802 is held over one of the checks 804, the application on the tablet computer 802 uses a video camera function to image the check to provide the hover capture module 808 in the application with multiple frames of the video feed from the hovering tablet computer 802. The hover capture module 808 will identify corners of the document, verify that the document is present and capture that image in a subsequent still photograph.

The tablet computer 802 will then crop the image in an auto crop image module 810 in the application. A portion of the captured still photograph image of the document will then be transmitted, for example the bottom 25 percent of the document, to a remote server 812 to determine whether that bottom portion of the document is indeed a portion of a check. The bottom portion of the expected check is sent to a magnetic ink character recognition (MICR) adapter 814 on the remote server 812 which can process the bottom portion of the document that is expected to contain the MICR line of a check and extract information that can then be sent to a read MICR web service 816 for verification that there is indeed MICR information in the portion of the check that has been processed by the MICR adapter 814, and to verify other aspects of the transaction. For example, the readMICR Web Service may determine whether the MICR number is one that has already been processed (i.e., to check for duplicate check issues). The read MICR web service 816, which may be part of the same server 812 running the MICR adapter 814 or may be on a separate server 818, will then return the MICR data to the MICR adapter 814 which is then forwarded to the autocrop image module 810 running on the tablet computer 802. The autocrop image module 810 can then provide a cropped image of the entire check to the user for display on the display 806 of the tablet computer 802.

After the identification of the check, and subsequent verification that the check is a valid check with a valid MICR number, the application running on the tablet computer 802 may then query the user to select an account in which to deposit the check. This process of hovering over the check, capture an image of a document once a document is identified, where a portion of the document is sent to a remote server to verify that it has a MICR line and that it is there for a check, may be repeated individually for each of the checks 804 at the user location or may be embodied as a process where the data/image from all the checks 804 is first individually scanned in and then sent all at once to the servers 812, 818 for processing.

As is currently required by the Check21 rules (The Check Clearing for the 21$^{st}$ Century Act), both a front and a back of a check must be scanned in using this process. As noted in FIGS. 8A-B, the typical handwritten endorsement usually provided by depositors may be replaced with, or supplemented by, a virtual endorsement generated on the back of the check by the tablet computer 802. In one embodiment, a virtual endorsement via the virtual endorsement module 820, or the standard written endorsement may be used on the checks 804 so that the check image can be sent, along with the account information provided by the user through the tablet computer 802, to the financial institution for processing via a remote deposit application 822 associated with the user's financial institution. One suitable remote deposit capture application 822 has been described above and, is commercially known as the deposit@mobile system maintained by USAA of San Antonio, Texas. This remote deposit capture functionality then permits the amounts indicated on the checks, pursuant to any user eligibility requirements imposed by the particular financial institution, to be deposited remotely without the need to present the physical check to the financial institution.

Figure 8A:
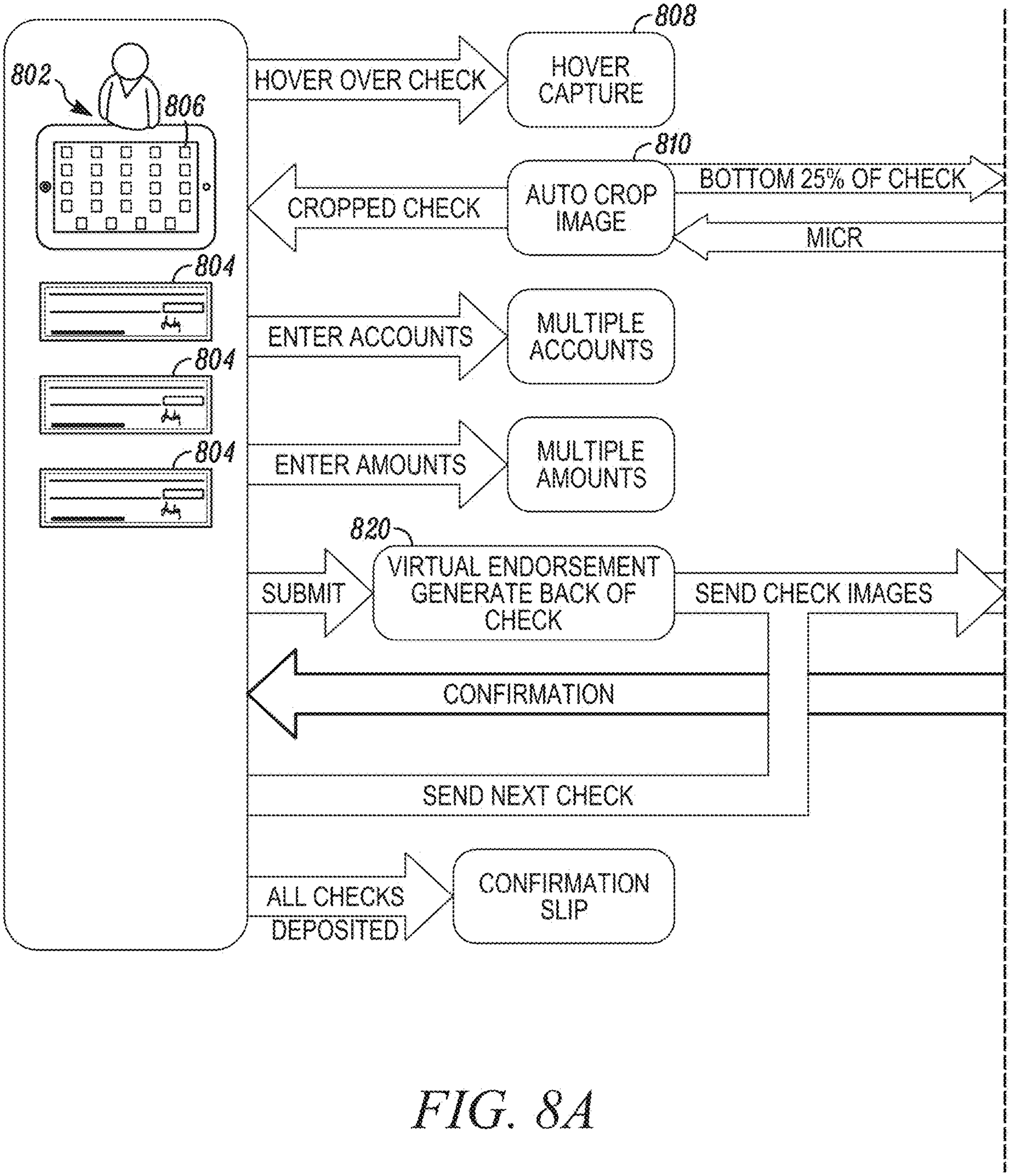
Figure 8B:
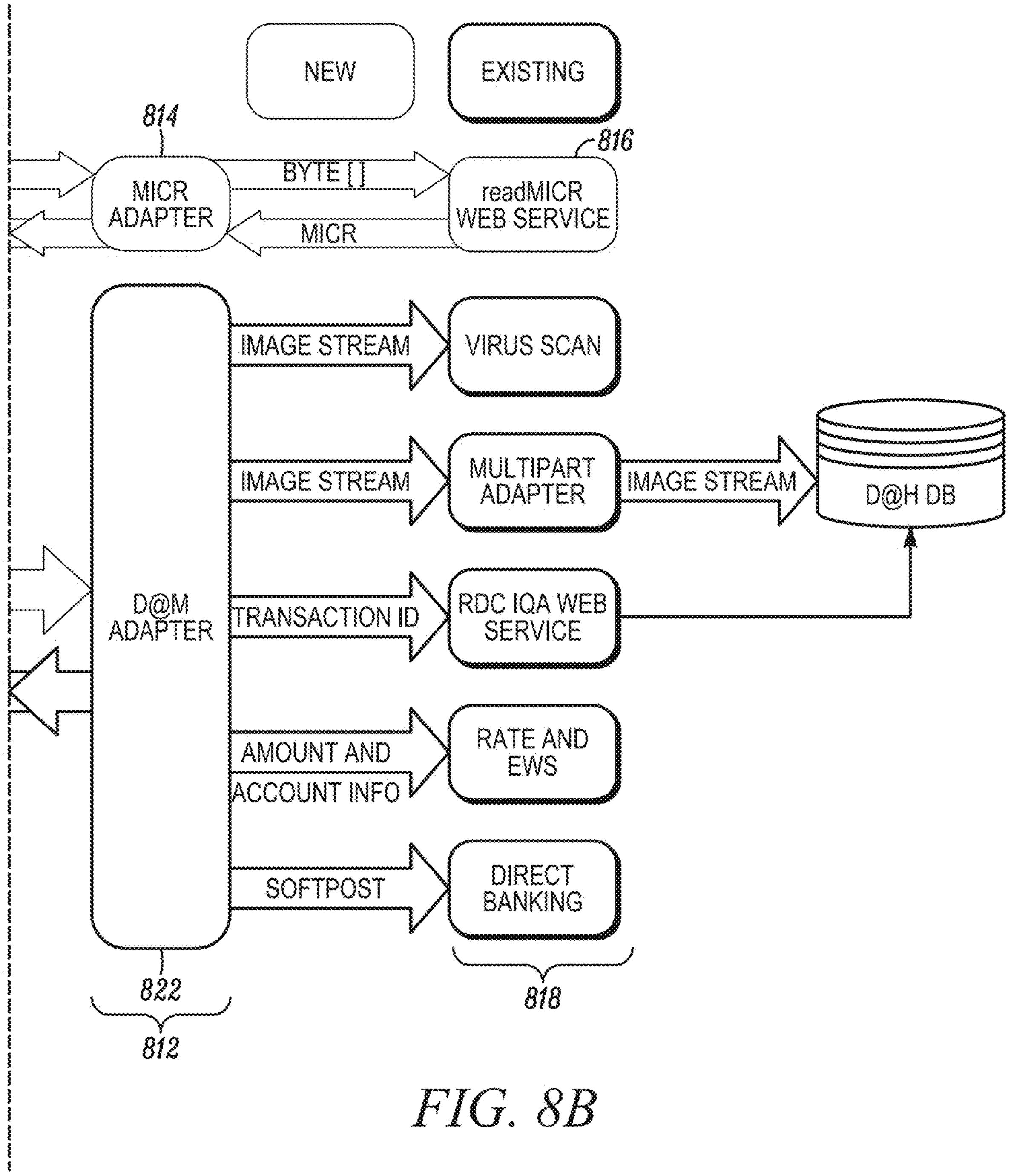
Figure 9:
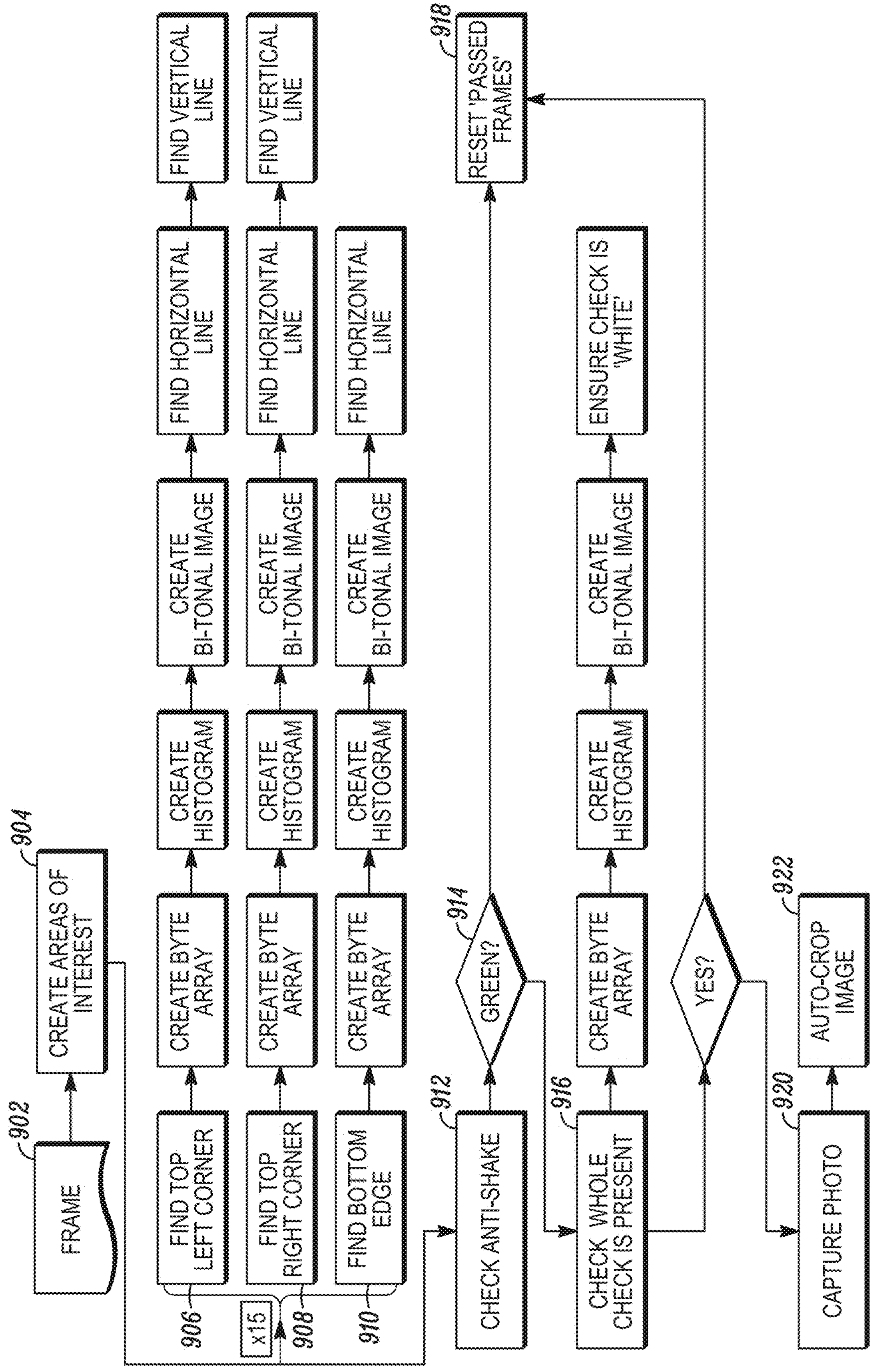
FIG. 9 is a flow diagram of the hover capture process usable in the remote deposit architecture of FIGS. 8A-B.

Referring to FIG. 9, a detailed description of one implementation of the hover capture process 808 illustrated in FIGS. 8A-B is shown. As noted above, the hover capture process may use the video capture capability of the tablet computer 802 to allow the user to frame (at 902) the document within visual guides displayed on the interface 806 of the tablet 802. The hover capture process will then automatically look at the video image frames images arriving at, for example, thirty frames per second, from the video capture apparatus integrated into the tablet computer 802, and then detect the edges of the document.

Any of a number of edge detection processes may be used, however one illustrated in FIG. 9 looks for two corners and one edge of the document. In order to look for the two corners and one edge, the hover capture application 808 on the tablet computer 802 first looks to areas of interest (at 904) and expects to find the corners and edge. These areas of interest may be pre-established areas of the framed video images sent to the hover capture application 808 that establishes what portion of the video image the tablet computer is to inspect to find the corners and edge. For example, the areas of interest might be an area X number of pixels over from an edge of the framed area in the display of the tablet computer 802 and Y pixels down from that edge. Each area of interest may be any geometric shape (e.g., a rectangle, square, circle or other area) which the hover capture application 808 will look for the corners and/or edge. This area of interest simply provides a reduced area within which the processor of the tablet computer 802 needs to manipulate data to determine whether an edge or corner exists.

In the present example of edge detection, three areas of interest are examined to find a top left corner (at 906), top right corner (at 908), and a bottom edge (at 910). For each of the corners or edges that are looked for, a byte array is created, a histogram of the array is generated, and a bitonal image is generated so that a horizontal line can be found for each of the top left corner, top right corner, and bottom edge. The additional step of finding a vertical line for the top left and right corners is also used. Again, although the specific edge detection mechanism of finding a top left corner, top right corner, and bottom edge is disclosed, any of a number of a standard edge detection processes can be used. For example, all corners of the document could be searched for, the bottom two corners and the top edge, or any combination of one or more corners or one or more edges may be used by other implementations.

During process of the edge detection, the hover capture process 808 also checks on whether a clear, sharp image is being looked at. Clarity and sharpness of the image may be determined through an anti-shake algorithm (at 912) or other algorithms such as autofocus methods may be used. Greater detail on one preferred anti-shake determination method is provided below. Assuming that the anti-shake algorithm determines that the movement of the tablet computer 802 and its image capture apparatus (e.g., video camera) is within permissible limits, a visual indicator, such as a green light, is shown on the display 806 of the tablet computer 802 to the user to let them know that the computer 802 is being held at a desired steadiness (at 914). The green indicator or other visual indicator may be part of a green (yes)/red (no) or other color combination shown on the display 806 to the user. The indicator may be integrated as part of the frame or image guide within which the user is to maintain the image, or may be shown on a different portion of the display 806. Other embodiments are contemplated such as mechanical indicators (e.g., vibration), audible indicators (e.g., tones), olfactory indicators (e.g., a particular odor), tactile indicators (e.g., Braille) and the like.

If the hover capture process determines that the anti-shake conditions have been satisfied for a predetermined amount of time, for example fifteen consecutive frames in a thirty frame per second video stream, then the hover capture process may determine, as a type of sanity check, whether the whole check is actually present (at 916). This process of checking whether a whole check is present may be accomplished by creating a byte array, a histogram, and a bitonal image to make sure that the bitonal image shows a logical "white" image indicating the presence of the whole check. If it determines that the whole check is not present, or if it is earlier determined by the anti-shake algorithm that the image was not maintained steadily enough for the desired timeframe, then the frame counter of past frames (e.g., a counter that counts up to fifteen frames or whatever threshold has been set for the device) is reset to zero and the user will be shown a visual indicator, such as a red light indicating that the image has not yet been acquired because the tablet has been moving (at 918). The corner recognition process then repeats until the anti-shake criteria are met.

In contrast, if the whole check is detected 916 then the tablet computer 802 will display the green indicator and automatically capture the entire image in a still photo (at 920). Alternatively, the video camera images may be used to capture the image. Once the image is captured in a photo, the auto-crop image module 810 as described with respect to FIGS. 8A-B, will crop the image and send the portion of the image expected to have a MICR line, such as the bottom 25 percent of the document, to determine the MICR line and the presence of an actual check (at 922). The process then proceeds as indicated in FIGS. 8A-B above.

Figure 10:
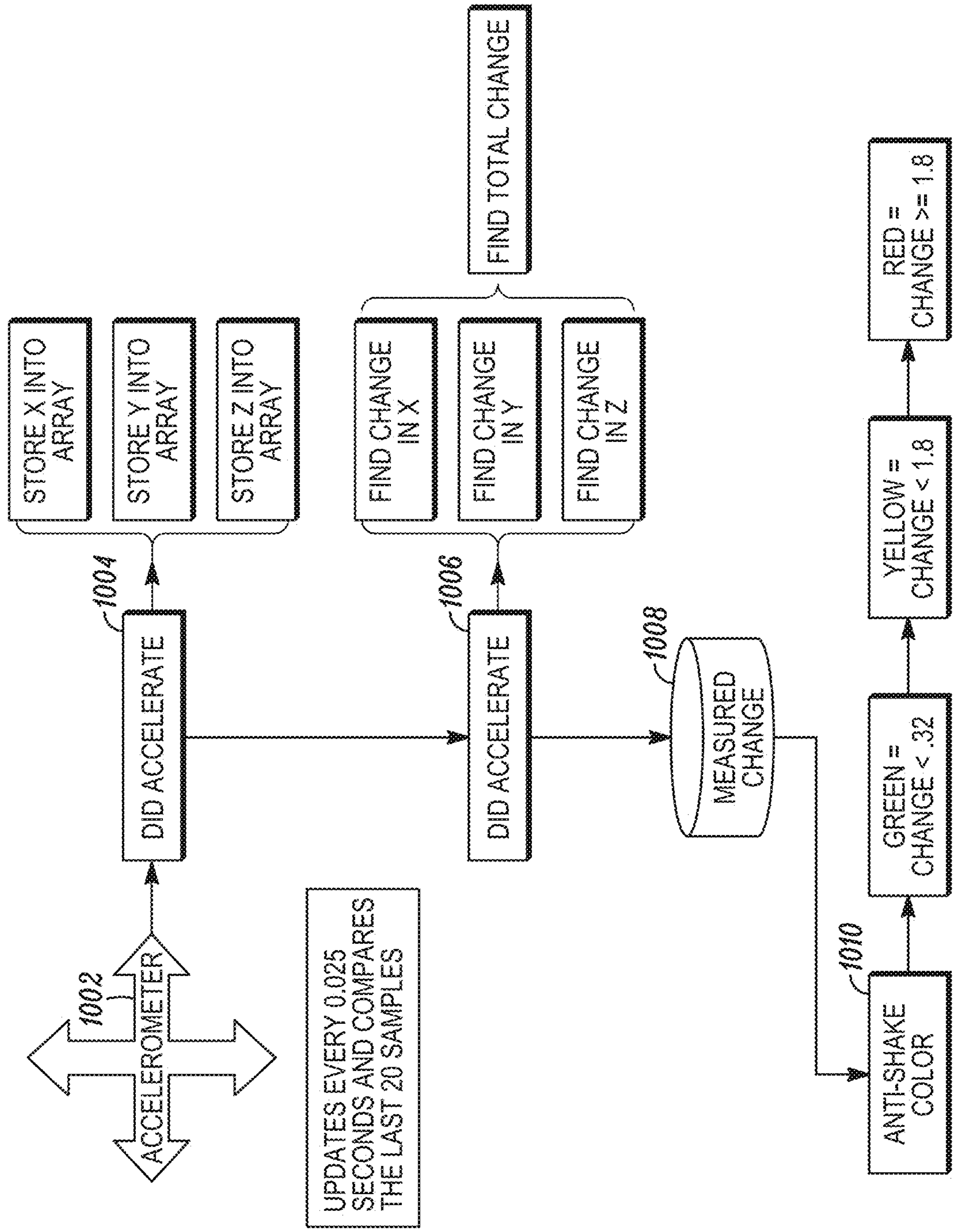
FIG. 10 is a flow diagram of anti-shake logic usable in an image capture process such as the hover capture process of FIG. 9.

Referring now to FIG. 10, one embodiment of an anti-shake algorithm (at 912) that may be used in the hover capture process is illustrated. In one implementation, an accelerometer 1002 may be built into the tablet computer 802. The accelerometer may be a three-dimensional accelerometer providing information in X and Y coordinates in a particular plane and a Z coordinate perpendicular to that plane. Other accelerometers or motion detection mechanisms, with three dimensional resolution or less than three-dimensional resolution, may also be used. In an implementation using a three-dimensional accelerometer built into the tablet computer 802, updates from the accelerometer may be sampled on a regular basis and those samples compared over an predetermined period to determine whether the tablet computer is being held within desired anti-shake parameters (e.g. if it is being held steadily enough for a clear image).

For example, in one embodiment the processor of the tablet computer 802 may sample the accelerometer every 0.025 seconds over a period of time needed to obtain twenty samples such that 0.5 second window of time is being reviewed for desired steadiness of the tablet computer 802. The hover capture module 808 implements the anti-shake algorithm as indicated in FIG. 10 by, at the various intervals within the sample period, checking whether there was an acceleration detected (at 1004), then measuring the change over the sample period (at 1006) so that the measured change can be stored (at 1008) and compared to a threshold for displaying an anti-shake color on the display 806 of the tablet computer 802 (at 1010).

The anti-shake color displayed on the display may include one color for indicating to a user that the tablet computer is being held with the desired parameters of steadiness, another color for being close to the desired range of steadiness and yet another color showing that the user is well out of the range of desired steadiness for permitting accurate capture of the financial document. With respect to determining whether the accelerometer did accelerate in a particular direction, each update during the sample period has the measured accelerometer input stored in X, Y and Z arrays for the respective X, Y and Z data it provides. To measure the change, a change between the measurements in the X axis array, a change between the data in the Y axis array and a change between the data in the Z axis array are all compared to find a total change. Assuming that the particular accelerometer 1002 outputs data in a +/− magnitude for a predetermined range, the absolute value of the total changes detected in the X, Y and Z axes may be taken and compared to predetermined thresholds of change. The thresholds for indicating a particular anti-shake color status to a user, and concurrently deciding whether to automatically capture a document (or prevent the capture of the document until a particular color is reached), may be made on the basis of whatever scale the particular accelerometer of the tablet computer 802 provides output for. The desired output level within which a green indication is shown to the user, along with the subsequent action by the tablet computer 802 to then capture the image, may be obtained experimentally for a particular model of accelerometer and tablet computer. Once that threshold is established, the setting of thresholds for turning into a yellow (intermediate movement) and red (larger movement) may be set to provide guidance to a user to adjust their movements and positioning to reach the desired green indicator of acceptable stability. The numbers for the green, yellow and red thresholds shown in FIG. 10 are simply intended as one example and will change depending the type of accelerometer and other implementation-specific factors.

Figure 11:
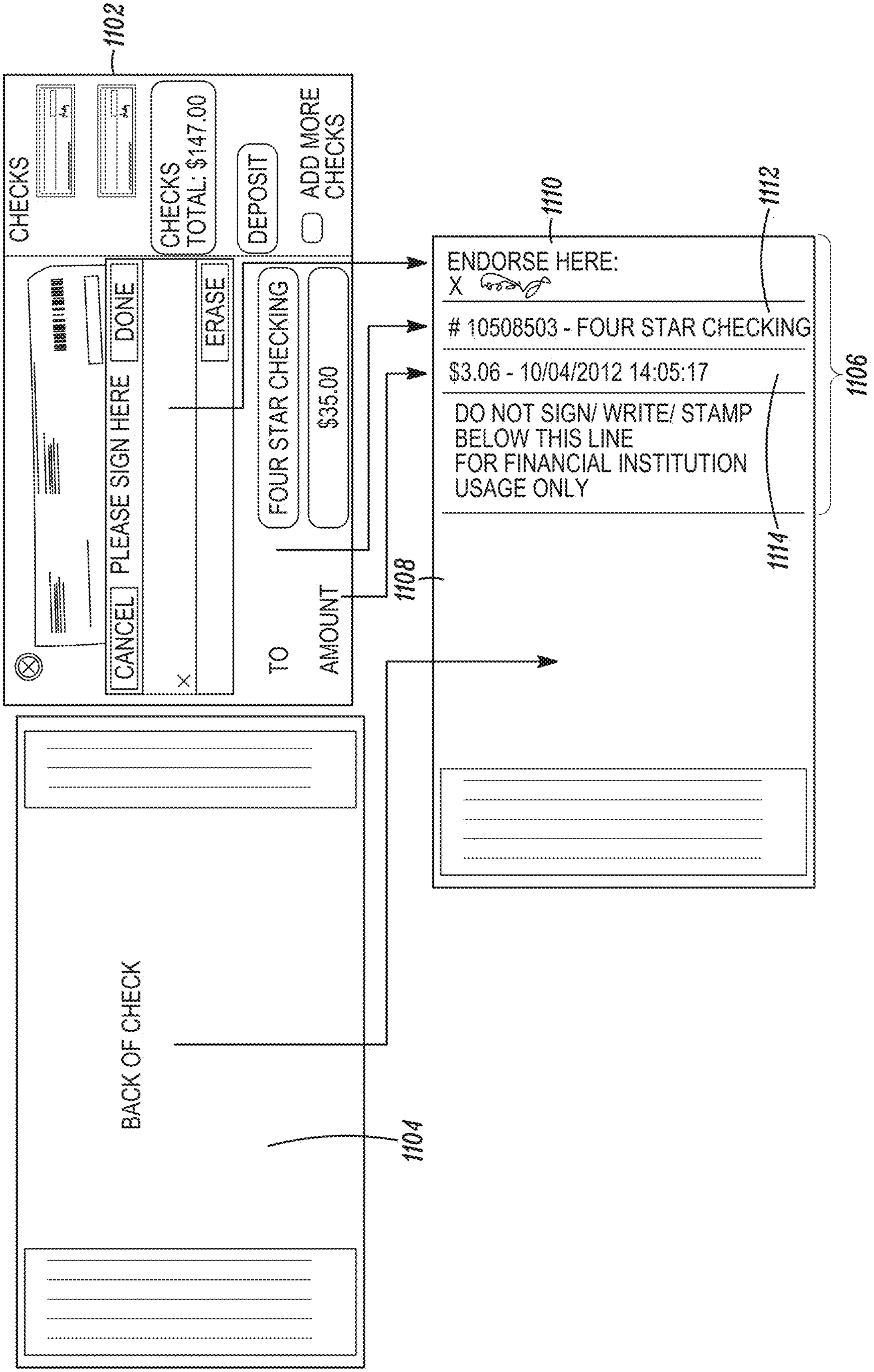
FIG. 11 illustrates an method of virtual endorsement of a check being deposited via a remote deposit process.

Referring again to the system architecture diagram of FIGS. 8A-B, a virtual endorsement module 820 for providing a virtual endorsement to the back of a check is illustrated as part of the feature set available on the tablet computer application. FIG. 11 provides one example of a virtual endorsement process. The virtual endorsement module 820 may work with images already captured through the hover capture process described above and present the user, via the display 806 of the tablet computer 802, with an endorsement screen 1102. The endorsement screen 1102 that may provide a space to accept a stylus input, touch input, or other input in a signature block to then take a scanned back of a check 1104 and overlay that scanned back of a check 1104 with an electronic version of the signature for the user that is either stored on the tablet computer 802 (and retrieved via use of a stylus or other input into the signature area), or that is actually translated from the input area on the screen 1102 to an endorsement template 1106 associated with the back of the check 1104 to result in a virtually endorsed check 1108. Other methods of virtual endorsement can include biometric based endorsements (e.g., fingerprint, retinal scan, voice, etc.) are contemplated. In some embodiments, a biometric-based endorsement can include voice recognition associated with a stored signature where the signature is overlaid on the check if authenticated by voice, fingerprint, or any other biometric-based method.

In one embodiment, the virtual endorsement added to the check may be added only as a metadata file that is kept with the back of the check and not applied as a physical change to the image of the back of the check. In other embodiments, the endorsement and associated information may be directly applied to the image to change the image of the back of the check. As a mechanism for further associating the front of the check with the back of the check, the virtual endorsement may include a signature a line 1110 including the endorsement signature of the depositor, but also an account number of the desired account into which the deposit is directed 1112, as well as a deposit amount, date of deposit, and time of deposit 1114. In other embodiments, any of a number of additional pieces of information, such as GPS location of depositor at the time of deposit, name of depositor, and so on, may be used in addition to or interchangeably with the other data noted in FIG. 11.

Although a virtual endorsement may be convenient for a user over having to individually sign the back of each check, a limit may be placed on depositors as to the dollar amount of checks for which a virtual endorsement may be accepted. For example, in one implementation if the dollar amount is less than or equal to $250, then the virtual endorsement module 820 may permit use of a virtual endorsement in place of a written signature on the check itself. For amounts greater than $250, the virtual endorsement module may prevent usage of a virtual endorsement and require that the depositor sign the checks. The $250 amount is arbitrary and any of a number of thresholds may be set based on individual or institutional parameters.

In yet another embodiment, the virtual endorsement module may, in cooperation with information from the front and back of the original check, determine if a signature has been recognized on the back of the check such that the virtual endorsement module will require a depositor to sign the check if no signature is detected. Alternatively, the virtual endorsement module 820 executed on the processor of the tablet computer 802 may alternatively detect an endorsement on a back of a check and append, in a different location, a virtual endorsement, or information such as that shown in the virtually endorsed check 1108 in FIG. 11, in another area of the check that does not obscure the handwritten signature. Preferably, the virtual endorsement module 820 executing on the tablet computer 802 will avoid overwriting a real signature with any virtual signature or virtual information. Any of a number of known handwriting recognition algorithms may be implemented by the virtual endorsement module 820 in order to either decide whether to require a signature or to avoid overwriting an existing signature.

Figure 12:
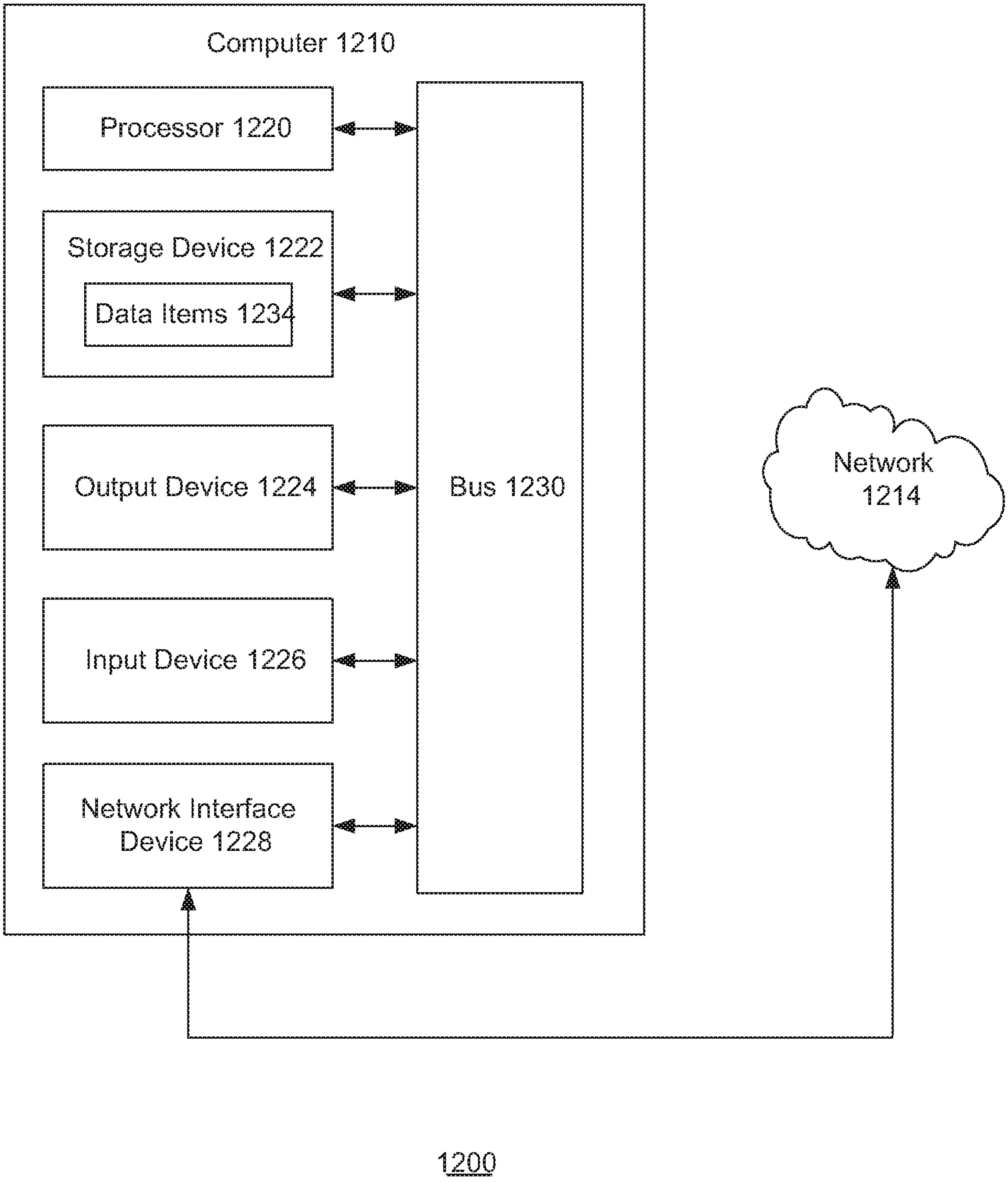
FIG. 12 is a block diagram of an example computing environment in which one or more of the remote deposit capture features disclosed herein may be accomplished.

Referring to FIG. 12, a block diagram is shown of an example computing environment in which example embodiments and aspects may be implemented. This computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, smart phones, tablet computers, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 12, a system 1200 includes a computer 1210 connected to a network 1214. The computer 1210 includes a processor 1220, a storage device 1222, an output device 1224, an input device 1226, and a network interface device 12212, all connected via a bus 1230. The processor 1220 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 1220 executes instructions and includes that portion of the computer 1210 that controls the operation of the entire computer. Although not depicted in FIG. 12, the processor 1220 typically includes a control unit that organizes data and program storage in memory and transfers data and other information between the various parts of the computer 1210. The processor 1220 receives input data from the input device 1226 and the network 1214 reads and stores code and data in the storage device 1222 and presents data to the output device 1224.

Although the computer 1210 is shown to contain only a single processor 1220 and a single bus 1230, the disclosed embodiment applies equally to computers that may have multiple processors and to computers that may have multiple busses with some or all performing different functions in different ways.

The storage device 1222 represents one or more mechanisms for storing data. For example, the storage device 1222 may include read-only memory (ROM), RAM, magnetic disk storage media, optical storage media, flash memory devices, and/or other machine-readable media. In other embodiments, any appropriate type of storage device may be used. Although only one storage device 1222 is shown, multiple storage devices and multiple types of storage devices may be present. Further, although the computer 1210 is drawn to contain the storage device 1222, it may be distributed across other computers, for example on a server.

The storage device 1222 includes a controller (not shown in FIG. 12) and data items 1234. The controller includes instructions capable of being executed on the processor 1220 to carry out the functions as previously described herein with reference to FIGS. 1-11, and as described below with respect to FIGS. 13-16. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. The storage device 1222 may also contain additional software and data (not shown), which is not necessary to understand the invention. Although the controller and the data items 1234 are shown to be within the storage device 1222 in the computer 1210, some or all of them may be distributed across other systems, for example on a server and accessed via the network 1214.

The output device 1224 is that part of the computer 1210 that displays output to the user. The output device 1224 may be a liquid crystal display (LCD) well-known in the art of computer hardware. In other embodiments, the output device 1224 may be replaced with a gas or plasma-based flat-panel display or a traditional cathode-ray tube (CRT) display. In still other embodiments, any appropriate display device may be used. Although only one output device 1224 is shown, in other embodiments any number of output devices of different types, or of the same type, may be present. In an embodiment, the output device 1224 displays a user interface.

The input device 1226 may be a keyboard, mouse or other pointing device, trackball, touchpad, touch screen, keypad, microphone, voice recognition device, or any other appropriate mechanism for the user to input data to the computer 1210 and manipulate the user interface previously discussed.

Although only one input device 1226 is shown, in another embodiment any number and type of input devices may be present.

The network interface device 1228 provides connectivity from the computer 1210 to the network 1214 through any suitable communications protocol. The network interface device 1228 sends and receives data items from the network 1214.

The bus 1230 may represent one or more busses, e.g., USB, PCI, ISA (Industry Standard Architecture), X-Bus, EISA (Extended Industry Standard Architecture), or any other appropriate bus and/or bridge (also called a bus controller).

The computer 1210 may be implemented using any suitable hardware and/or software, such as a personal computer or other electronic computing device. Portable computers, laptop, tablet or notebook computers, PDAs, pocket computers, appliances, telephones, and mainframe computers are examples of other possible configurations of the computer 1210. The network 1214 may be any suitable network and may support any appropriate protocol suitable for communication to the computer 1210. In an embodiment, the network 1214 may support wireless communications. In another embodiment, the network 1214 may support hard-wired communications, such as a telephone line or cable. In another embodiment, the network 1214 may support the Ethernet IEEE (Institute of Electrical and Electronics Engineers) 802.3x specification. In another embodiment, the network 1214 may be the Internet and may support IP (Internet Protocol). In another embodiment, the network 1214 may be a LAN or a WAN. In another embodiment, the network 1214 may be a hotspot service provider network. In another embodiment, the network 1214 may be an intranet. In another embodiment, the network 1214 may be a GPRS (General Packet Radio Service) network. In another embodiment, the network 1214 may be any appropriate cellular data network or cell-based radio network technology. In another embodiment, the network 1214 may be an IEEE 802.11 wireless network. In still another embodiment, the network 1214 may be any suitable network or combination of networks. Although one network 1214 is shown, in other embodiments any number of networks (of the same or different types) may be present.

Il should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or use the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to using aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

In an alternative embodiment, and in combination with one or more of the processes discussed above, a visual feedback mechanism, also referred to herein as "augmented reality," for providing a mobile deposit system user with feedback indicative of whether the user's mobile device is actually detecting a check is provided. Advantages of this visual feedback mechanism may include possible increase in image quality of captured check images as well as helping to reduce the time it takes to align a check in the viewfinder of the mobile device and capture an adequate image for processing.

Figure 13:
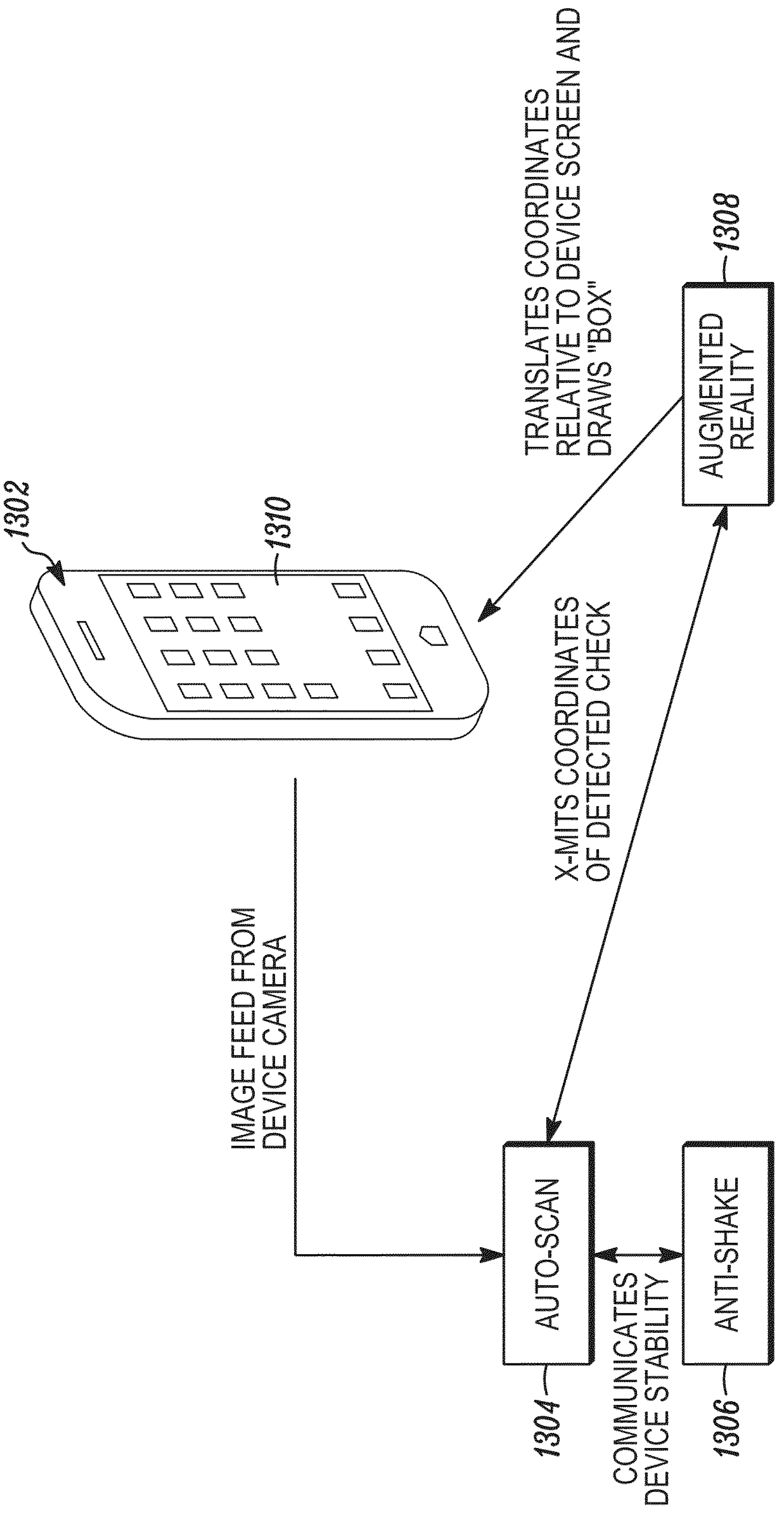
FIG. 13 illustrates an alternative embodiment showing a mobile device configured to display a visual guide to the user indicating a check is being properly tracked.

FIGS. 13-16 Illustrate a mobile device 1302 configured for making remote deposits of financial instruments using a visual feedback mechanism. In FIG. 13 the mobile device 1302 includes an auto-scan module 1304 and an anti-shake module 1306 configured to scan checks and account for device shake. These modules may be configured to perform the same functions as described above, for example the same functions discussed with respect to FIGS. 8-11 above. In addition, an augmented reality module 1308 may be integrated into the programming on the mobile device 1302 to provide a visual feedback mechanism for the user of the mobile device 1302. The image feed from the mobile device camera is processed by the auto-scan module to generate coordinates of the check. During the auto-scan process, the anti-shake module 1306 operates to determine if the mobile device is being held steadily enough. The augmented reality module 1308 may utilize the coordinate information of the check determined in the auto-scan functions (such as described above) and translate that coordinate information into a rectangular outline or box that will be displayed on the screen 1310 of the mobile device 1302 around the image of the check that is to be scanned.

Figure 14:
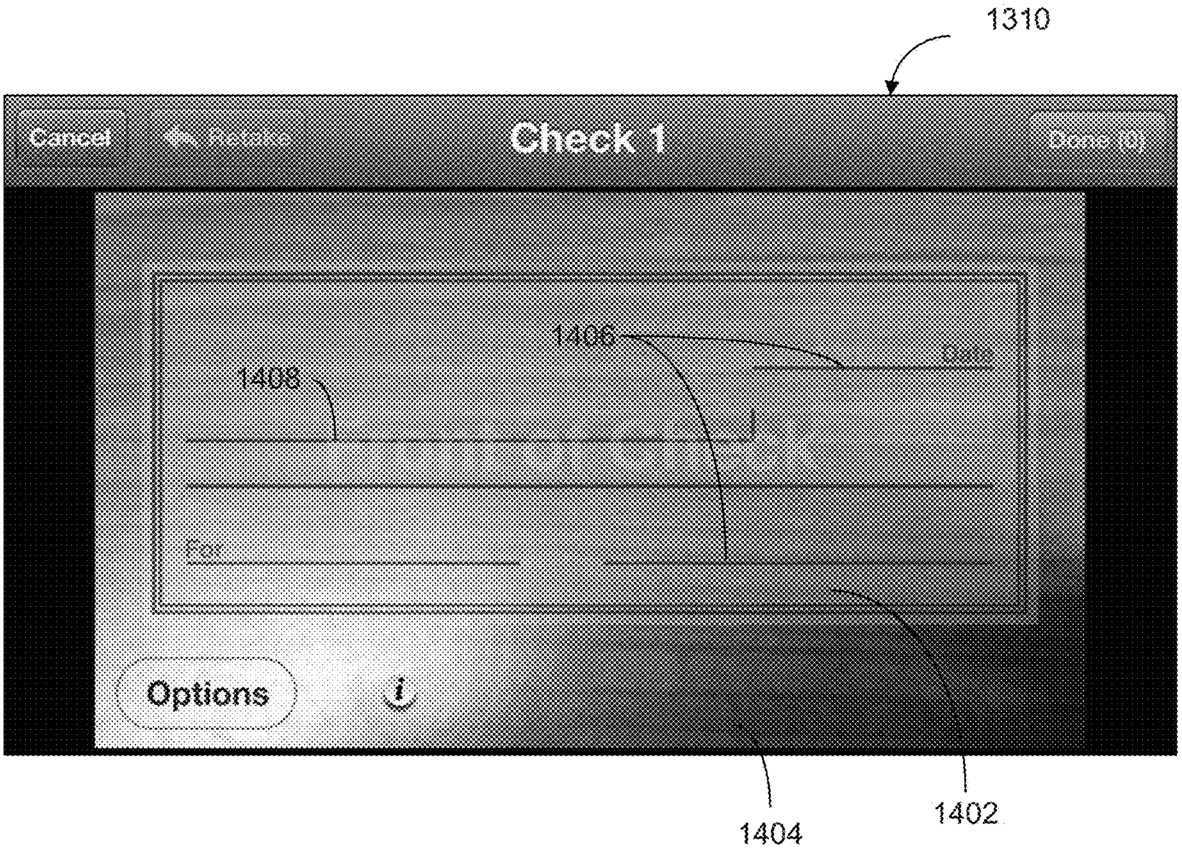
FIG. 14 illustrates an overlay display to guide a user as to where in a camera viewfinder area a check should be positioned.

As shown in FIG. 14, when a user opens the application on his/her mobile device 1302 and selects to deposit a financial instrument such as a check, the augmented reality module 1308 may provide a partially transparent overlay image 1402 in the camera viewfinder area 1404 shown on the display 1310 of the user's mobile device 1302. This overlay image 1402 may identify which side of the check is to be captured (front or back) by including general outlines 1406 of items generally found on the desired side of the check (e.g. date line, signature line, etc.) and/or text 1408 expressly identifying which side the user needs to face up in front of the camera (e.g. "front of check"). The general outlines 1406 or text 1408 may be displayed in a semi-transparent manner so that the check a user is trying to capture with the camera of the mobile device 1302 is not obscured. The overlay 1402 image may act as a guide to the user as to where the check should be positioned and sized within the camera viewfinder area 1404. After automatically capturing a still image of the front side of the check when the mobile device determines the appropriate image criteria have been met, the augmented reality module may display an overlay image 1402 inviting the user to scan the back side of the check.

Figure 15:
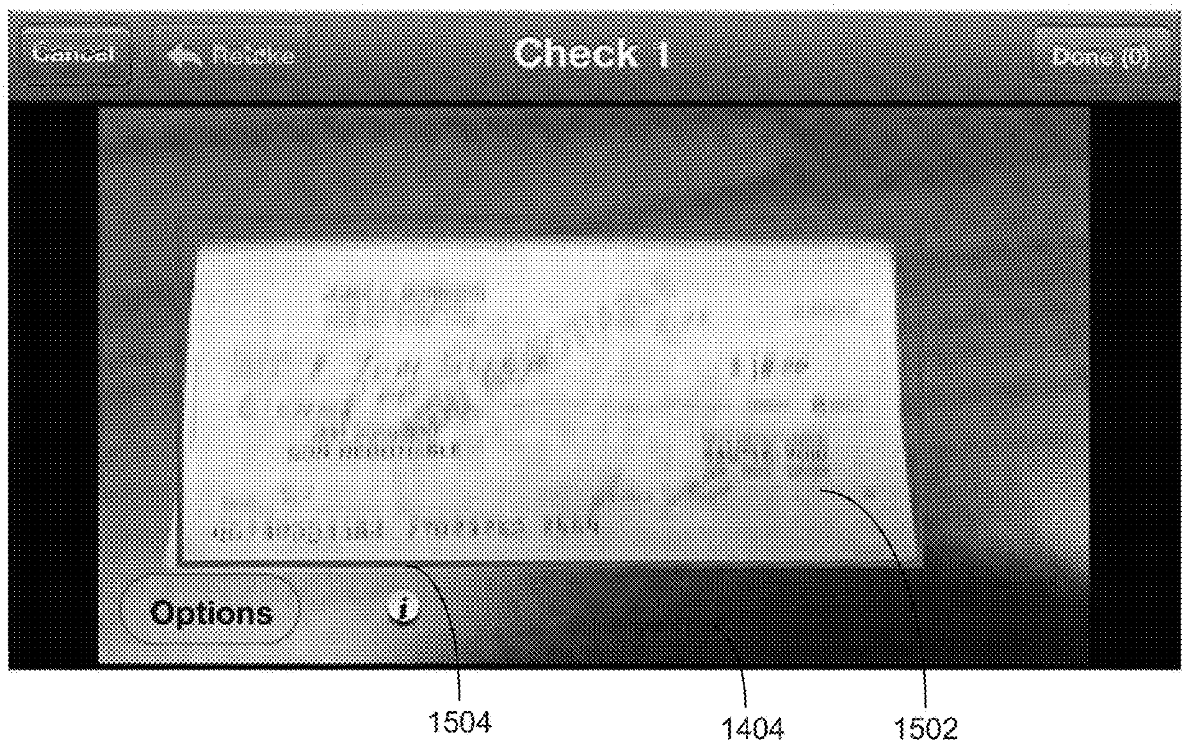
FIG. 15 shows a frame generated around the check while the mobile device is actively tracking the location of the check.

Referring to FIG. 15, once a check 1502 is identified by the mobile device 1302, the semi-transparent overlay image 1402 is removed and replaced by a frame 1504 that will then track the check within the camera viewfinder area 1404 as long as it can be detected. The frame may be lines or other indicia that make up a full or partial border of the check. The frame may be displayed in one or more colors. The phrase "track the check" used above is intended to mean that the frame will move around in the camera viewfinder area 1404 with the check if the check is moved within the camera viewfinder area 1404 and the mobile device still detects the check. If the mobile device 1302 can no longer detect the check, the frame 1504 is removed and then replaced by the semi-transparent overlay 1402. If the check is detected for a given number of video frames the auto-capture, and anti-shake code work in tandem to automatically capture the image. The given number of frames may be the number acquired in approximately 3% of a second in one embodiment, however this may be adjusted dynamically for different hardware to account for varying frames per second video output.

Figure 16:
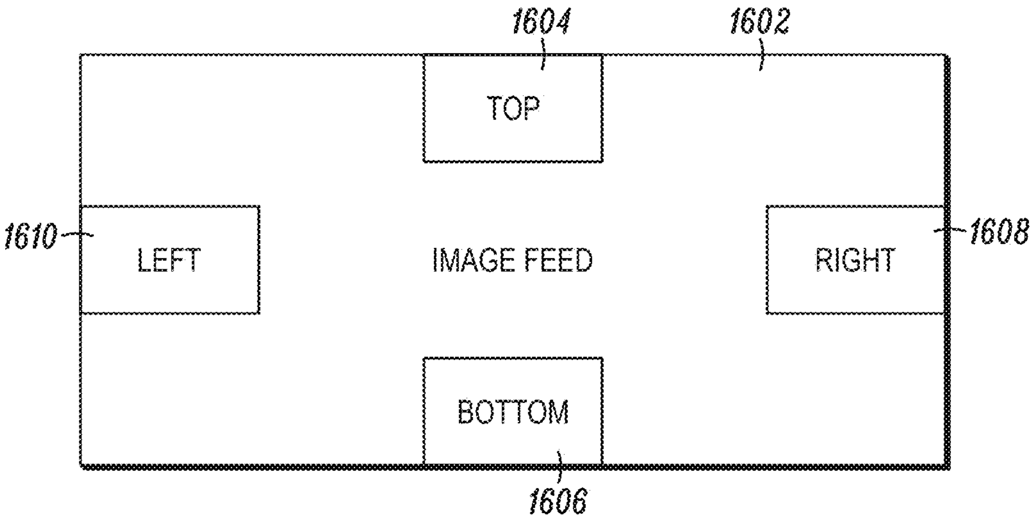
FIG. 16 illustrates an embodiment of the cropping areas of a grayscale version of the camera image used to identify the edges of a check.

Thus, in embodiments incorporating the augmented reality module 1308 where visual feedback is provided by a check tracking frame in the camera viewfinder area as long as the mobile device is currently identifying the check in the viewfinder area, the process of image capture of the check may be as follows. The image feed from the mobile devices camera is converted to grayscale, and the auto-scan module focuses the camera and communicates with the anti-shake module concerning mobile device stability. The auto-scan module detects a dark back ground and determines if there is enough light in the image to proceed. Then, the auto-scan module crops four sections out of the entire grayscale image. As shown in FIG. 16, the grayscale image 1602 includes top, 1604, bottom 1606, right 1608 and left 1610 sections. These sections are cropped out of the entire image and a histogram is generated for each of the four cropped images. Each of the four images is contrast stretched and a new histogram is found for the images. The process then converts a normalized image to black and white based off of the new histogram. Line detection is utilized for horizontal and vertical lines by adding up white area in each corresponding horizontal or vertical row and determining where the image transitions from black to white (indicating the edge of a check).

All of these points indicating the edges of the check are marked and sent to the augmented reality module. The augmented reality module converts the received points so that they correlate to the view presented to the user in the camera viewfinder area. The mobile device then draws four separate lines in the camera viewfinder area that the user sees on the mobile device's display. These four lines visually form the frame (box) around the image of the check. This box may be updated every video frame. The number of frames received depends upon device hardware and configuration, although typically ranges between 15 and 30 frames per second.

Referring again to FIG. 13, and as noted in the discussion with respect to FIGS. 8-10, the anti-shake module communicates with the auto-scan module so that the auto-scan module can make intelligent decisions about when the mobile device is steady enough to capture an image. The anti-shake module looks at the maximum and minimum amount of movement over the last 2 seconds and reports results as the auto-scan module periodically asks for them.

A single check image example has been discussed with respect to the visual feedback mechanism provided by the augmented reality module. In other embodiments, the visual feedback may be adapted to tracking multiple checks at the same time in the camera viewfinder area. In this alternative embodiment, the mobile device may be configured to operate in a concurrent scan mode where the auto-scan and augmented reality are set to look for and frame more than one check at a time, or look for one check at a time in a viewing area that contains multiple checks. In any of the embodiments, the frame placed partially or fully around each check may provide a user with feedback that can be used to adjust the camera position or check position when the frame disappears. As long as the frame tracks a check, the user can know that the check capture function is working and that the check is being recognized.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As has been disclosed above, a system and method for an improved remote deposit capture process has been disclosed where, using a user device such as a tablet computer or other smartphone capable of capturing video and/or photographic still images, may be used to identify and automatically capture images via a combination of video feed information and still photo information. For example, the mobile device may be used by a depositor to hover over one or more checks in sequence and a software or firmware application residing on the tablet computer will identify, for example using video feed information, the location and existence of a document, and once that information has been processed, and edges detected, the software will automatically release the shutter and capture the image in a digital photo that is taken without manual input by the user. To provide visual feedback to the user that the mobile device is seeing the check and working toward capturing the image, a visual frame may be displayed around the check that tracks the check in the viewfinder display. The frame may be displayed continuously as long as the mobile device can identify the location of the check, and may disappear from view when the check is not being identified so that the user can know to make adjustments to the mobile device or check position.

The live feed detection sees a document exists, the image is captured automatically by the software, automatically cropped and a small portion of the cropped image sent off to a server, for example wirelessly, to verify that a MICR line exists in that small portion. Once the MICR line is identified as existing such that a check or other financial document is recognized, the complete image taken by the tablet computer that was stored on the tablet computer prior to sending off the portion for verification, is then processed to acquire the user's desired account destination and associated information required as part of the deposit process. All the information in the image may be sent in a single file, or in individual files for each check. The check image or images, along with any real or virtual endorsements on the back of the check, may be then forwarded to the remote deposit processing server associated with the desired financial institution and a deposit made according to standard deposit procedures noted above. A confirmation may be received from the remote deposit server and confirmation slip displayed to the user on the display 1224 of the tablet computer 1202.

Also disclosed in the above system and method are modified mechanisms for detecting steadiness of the tablet computer through an anti-shake algorithm as well as the process of providing an optional virtual endorsement to add to a physical endorsement or replace the need for a physical endorsement on certain checks.

What is claimed is:

1. A method, comprising:

downloading, onto a mobile device, an executable application for remote deposit of financial instruments; and executing the executable application, by a processor of the mobile device, wherein the executable application causes the processor to:

display, on a display of the mobile device, an overlay image of an outline of a financial instrument;

detect whether an image of the financial instrument is in a field of view of a camera lens of the mobile device;

detect whether the mobile device is being held in a stable position;

in response to detecting the image of the financial instrument in the field of view:

replace the overlay image in the display with border indicia aligned with at least one border of the image of the financial instrument in the field of view; and move the border indicia to track the image of the financial instrument while the image of the financial instrument remains in the field of view of the camera lens; and in response to detecting both that the financial instrument is in the field of view and that the mobile device is being held in a stable position:

automatically capture the image of the financial instrument; and transmit the captured image of the financial instrument to an electronic deposit system.

2. The method of claim 1, further comprising the processor only displaying the border indicia while the mobile device is detecting the image of the financial instrument in the field of view.

3. The method of claim 1, wherein the mobile device comprises a movement sensor integrated into the mobile device, and wherein to detect whether the mobile device is being held in a stable position, the processor compares information received from the movement sensor with a predetermined set of movement parameters.

4. The method of claim 3, wherein the movement sensor comprises an accelerometer, and wherein the processor detects whether the mobile device is being held in a stable position by sampling measurements from the accelerometer over a predetermined time period and comparing a magnitude change of the sampled measurements to a predetermined threshold.

5. The method of claim 4, wherein the predetermined time period is 0.5 seconds.

6. The method of claim 1, wherein the mobile device comprises a movement sensor configured to provide movement information in three dimensions and wherein to detect whether the mobile device is being held in a stable position, the processor compares three dimensional movement information from the movement sensor to a predetermined set of parameters.

7. The method of claim 1, wherein the executable application further causes the processor to:

generate and display on the mobile device a stability indicator; and wherein the stability indicator is displayed in a first state in response to detecting that the mobile device is being held in a stable position, and in a second state in response to detecting that the mobile device is not in a stable position.

8. The method of claim 1, further comprising:

generating, by the processor, a metadata file associated with the captured image of the financial instrument, wherein the metadata file includes an electronic depositor signature; and transmitting the metadata file along with the captured image to the electronic deposit system.

9. The method of claim 1, wherein the mobile device is a cellular phone.

10. A non-transitory computer readable medium, comprising processor executable instructions for capturing and transmitting an image, with a camera of a mobile device, of a financial instrument, the instructions configured to cause a processor of the mobile device:

display, on a display of the mobile device, an overlay image of a financial instrument outline;

detect whether an image of the financial instrument is in a field of view of a camera lens of the mobile device;

detect whether the mobile device is being held in a stable position;

in response to detecting the image of the financial instrument in the field of view:

replace the overlay image in the display with border indicia aligned with at least one border of the image of the financial instrument in the field of view; and move the border indicia to track the image of the financial instrument while the image of the financial instrument remains in the field of view of the camera lens; and in response to detecting both that the financial instrument is in the field of view and that the mobile device is being held in a stable position:

automatically capture the image of the financial instrument; and transmit the captured image of the financial instrument to an electronic deposit system.

11. The non-transitory computer readable medium of claim 10, further comprising instructions configured to cause the processor of the mobile device to display the border indicia only while the mobile device is detecting the image of the financial instrument in the field of view.

12. The non-transitory computer readable medium of claim 10, further comprising instructions configured to cause the processor of the mobile device to detect whether the mobile device is being held in a stable position by comparing information received from a movement sensor integrated into the mobile device with a predetermined set of movement parameters.

13. The non-transitory computer readable medium of claim 10, further comprising instructions configured to cause the processor of the mobile device to receive movement information in three dimensions from a movement sensor integrated into the mobile device and to compare the received three dimensional movement information from the movement sensor to a predetermined set of parameters.

14. The non-transitory computer readable medium of claim 10, further comprising instructions configured to cause the processor of the mobile device to:

receive movement information from an accelerometer in the mobile device; and detect whether the mobile device is being held in a stable position by sampling measurements from the accelerometer over a predetermined time period and comparing a magnitude change of the sampled measurements to a predetermined threshold.

15. The non-transitory computer readable medium of claim 14, wherein the predetermined time period is 0.5 seconds.

16. The non-transitory computer readable medium of claim 10, further comprising instructions configured to cause the processor of the mobile device to:

generate and display on the mobile device a stability indicator; and wherein the stability indicator is displayed in a first state in response to detecting that the mobile device is being held in a stable position, and in a second state in response to detecting that the mobile device is not in a stable position.

17. The non-transitory computer readable medium of claim 10, further comprising instructions configured to cause the processor of the mobile device to:

generate a metadata file associated with the captured image of the financial instrument, wherein the metadata file includes an electronic depositor signature; and transmit the metadata file along with the captured image to the electronic deposit system.

18. The non-transitory computer readable medium of claim 10, wherein the mobile device is a cellular phone.

19. An electronic system for capturing data from a financial instrument for remote deposit, comprising a mobile device having a:

a memory;

a display; and a processor in communication in with the memory and display, the processor configured to:

download, to the memory of the mobile device, an executable application for remote deposit of financial instruments; and execute the executable application, by a processor of the mobile device, wherein the executable application is configured to cause the processor to:

display, on a display of the mobile device, an overlay image of an outline of a financial instrument;

detect whether an image of the financial instrument is in a field of view of a camera lens of the mobile device;

detect whether the mobile device is being held in a stable position;

in response to detecting the image of the financial instrument in the field of view:

replace the overlay image in the display with border indicia aligned with at least one border of the image of the financial instrument in the field of view; and move the border indicia to track the image of the financial instrument while the image of the financial instrument remains in the field of view of the camera lens; and in response to detecting both that the financial instrument is in the field of view and that the mobile device is being held in a stable position:

automatically capture the image of the financial instrument; and transmit the captured image of the financial instrument to an electronic deposit system.

20. The electronic system of claim 19, further comprising the processor only displaying the border indicia while the mobile device is detecting the image of the financial instrument in the field of view.

21. The electronic system of claim 19, further comprising an accelerometer positioned in the mobile device, and wherein the processor detects whether the mobile device is being held in a stable position by sampling measurements from the accelerometer over a predetermined time period and comparing a magnitude change of the sampled measurements to a predetermined threshold.

22. The electronic system of claim 21, wherein the executable application further causes the processor to:

generate and display on the mobile device a stability indicator; and wherein the stability indicator is displayed in a first state in response to detecting that the mobile device is being held in the stable position, and in a second state in response to detecting that the mobile device is not in a stable position.

23. The electronic system of claim 19, wherein the mobile device is a cellular phone.

* * * * *